(12) United States Patent
Obayashi et al.

(10) Patent No.: US 7,138,185 B2
(45) Date of Patent: Nov. 21, 2006

(54) ANTI-REFLECTION FILM, POLARIZING PLATE AND DISPLAY DEVICE

(75) Inventors: Tatsuhiko Obayashi, Minami-ashigara (JP); Takahiro Ishizuka, Minami-ashigara (JP); Shuntaro Ibuki, Minami-ashigara (JP); Yuuzou Muramatsu, Minami-ashigara (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 84 days.

(21) Appl. No.: 10/612,022

(22) Filed: Jul. 3, 2003

(65) Prior Publication Data

US 2004/0070041 A1   Apr. 15, 2004

(30) Foreign Application Priority Data

Jul. 5, 2002   (JP)   ............................. 2002-197958
Jul. 19, 2002  (JP)   ............................. 2002-211815
Nov. 1, 2002   (JP)   ............................. 2002-320326

(51) Int. Cl.
*B32B 27/06*   (2006.01)
*B32B 33/00*   (2006.01)

(52) U.S. Cl. ...................... 428/447; 428/448
(58) Field of Classification Search ............... 428/428, 428/429, 446, 447, 448, 450
See application file for complete search history.

(56) References Cited

U.S. PATENT DOCUMENTS

| 5,902,847 | A  |   | 5/1999  | Yanagi et al. |
| 6,051,665 | A  | * | 4/2000  | Yamada et al. ............. 525/477 |
| 6,129,980 | A  | * | 10/2000 | Tsukada et al. ............ 428/327 |
| 6,852,367 | B1 | * | 2/2005  | You et al. .................... 427/387 |

FOREIGN PATENT DOCUMENTS

JP        9-40909 A       2/1997

* cited by examiner

*Primary Examiner*—Michael J. Feely
(74) *Attorney, Agent, or Firm*—Buchanan Ingersoll & Rooney PC

(57) ABSTRACT

An anti-reflection film that is an optical film, at least has a hard coat layer, and a low-refractive-index layer containing a binder polymer, on a transparent support, wherein said hard coat layer and/or said low-refractive-index layer contains: (a) a hydrolysate of an organosilane in which a hydroxyl group or a hydrolysable group is directly bonded to silicon, and/or a partial condensation product thereof; and (b) at least one metal chelate compound of an alkylalcohol, and a compound of $R^4COCH_2COR^5$, in which $R^4$ is an alkyl group, and $R^5$ is an alkyl or alkoxy group, as ligands, and a metal selected from Zr, Ti and Al, as a central metal.

14 Claims, 3 Drawing Sheets

ANTI-REFLECTION FILM, POLARIZING PLATE AND DISPLAY DEVICE

FIELD OF THE INVENTION

The present invention relates to an anti-reflection film, a polarizing plate, and a display device using the anti-reflection film and/or a polarizing plate.

BACKGROUND OF THE INVENTION

In the use of such as adhesives, external paints (coating materials), a hard coat, and an anti-reflection film (membrane), various studies have been made to improve scratch resistance, mechanical strength of the hardened materials, adherence of a certain material with other materials it contacts, and the like, by means of blending an organic material and an inorganic material. In particular, in the combination of an inorganic material and a polymerization-curing organic material, an alkoxysilane having a polymerizing group, and/or a hydrolyzed condensation product thereof, attracts attention in the arts. For example, JP-A-9-169847 ("JP-A" means unexamined published Japanese patent application) proposes a combination of a particular polyalkoxypolysiloxane and a polymerizing silane-coupling agent. However, the scratch resistance and the mechanical strength of the thus-obtained hardened materials are unsatisfactory, because the polyalkoxy polysiloxane and the polymerizing silane-coupling agent do not react well, and the resultant introduction rate of the polymerizing group is low. JP-A-9-40909 reports a partially co-hydrolyzed condensation product of an alkoxysilane having an organic functional group and a tetraalkoxysilane. However, the storage stability of a liquid of the partially co-hydrolyzed condensation product is not satisfactory.

In a display device such as a cathode ray tube display device (CRT), a plasma display (PDP), an electroluminescence display (ELD) or a liquid crystal display device (LCD), an anti-reflection film is generally arranged on the outermost face of the display device to decrease the reflectivity through the principle of optical interference to prevent a drop in the contrast based on the reflection of external light or prevent reflection of undesired images in its screen.

Such an anti-reflection film can be produced by forming a high refractive index layer on a support and further forming a low-refractive-index layer having an appropriate thickness thereon. To realize low reflectivity, the low-refractive-index layer is desirably made of a material whose refractive index is as low as possible. High scratch resistance is required for the anti-reflection film, since it is used as the outermost surface of a display. To realize high resistance to scratch (abrasion) in a thin film of about 100 nm in thickness, it is important to enhance both the mechanical strength of the film and the adhesive property to a subbing layer.

To lower the refractive index of material, it is possible to adopt the method (1) of introducing a fluorine atom into the material, or the method (2) of lowering the density of the material (introducing pores into the material). However, with both of the methods, a tendency is generated for the film strength and adhesive property to be damaged and the scratch resistance to deteriorate. Thus, it is difficult to achieve both a low refractive index and high scratch resistance.

For example, JP-A-11-189621, JP-A-11-228631 and JP-A-2000-313709 describe means to improve scratch resistance by introducing a polysiloxane structure into a fluorine-containing polymer thereby reducing the coefficient of friction of the film surface. Though these means are effective for improving scratch resistance to some degree, it is difficult to obtain a satisfactory scratch resistance by a single use of the said means on the occasions that the film lacks essential film strength and interface adhesion property.

One effective means to increase film strength is to introduce an inorganic filler into a low-refractive-index layer. The use of inorganic particles of a low refractive index as a filler enables increasing film strength without increasing the refractive index of the layer itself.

However, it is difficult to improve the adhesion property to the under layer by introducing an inorganic filler, so that satisfactory scratch resistance has not yet been obtained.

SUMMARY OF THE INVENTION

The present invention resides in an anti-reflection film that is an optical film, comprising, at least, a hard coat layer, and a low-refractive-index layer containing a binder polymer, on a transparent support, wherein said hard coat layer and/or said low-refractive-index layer contains: (a) a hydrolysate of an organosilane in which a hydroxyl group or a hydrolysable group is directly bonded to silicon and/or a partial condensation product thereof; and (b) at least one metal chelate compound of an alcohol represented by formula $R^3OH$, in which $R^3$ represents an alkyl group having 1 to 10 carbon atoms, and a compound represented by formula $R^4COCH_2COR^5$, in which $R^4$ represents an alkyl group having 1 to 10 carbon atoms, and $R^5$ represents an alkyl group having 1 to 10 carbon atoms or an alkoxy group having 1 to 10 carbon atoms, as ligands, and a metal selected from the group consisting of Zr, Ti and Al, as a central metal.

Further, the present invention resides in a method of producing the anti-reflection film described above, comprising: at least, coating a hard coat layer and a low-refractive-index layer containing a binder polymer, on a transparent support, wherein a coating solution of said hard coat layer and/or a coating solution of said low-refractive-index layer comprises: the hydrolysate of said organosilane and/or the partial condensation product thereof represented by (a); the metal chelate compound represented by (b); and (c) a β-diketone compound and/or a β-ketoester compound represented by formula $R^4COCH_2COR^5$, in which $R^4$ and $R^5$ each have the same meanings as those in the (b).

Further, the present invention resides in a polarizing plate, comprising a polarizing layer and two sheets of protective films of the polarizing layer, wherein at least one of said protective films comprises the anti-reflection film described above or the anti-reflection film produced by the production method described above.

Further, the present invention resides in a display device, having the anti-reflection film described above, the anti-reflection film produced by the production method described above, or the polarizing plate described above, wherein the low-refractive-index layer is arranged on the viewer side.

Further, the present invention resides in a hardening composition, comprising a hydrolysate of an organosilane represented by formula (1), which is produced in the presence of an acid catalyst, and/or a partial condensation product thereof:

$$(R^{10})_m—Si(X)_{4-m} \qquad \text{Formula (1)}$$

wherein, in formula (1), $R^{10}$ represents a substituted or unsubstituted alkyl group, or a substituted or unsubstituted aryl group; X represents a hydroxyl group or a hydrolysable group; and m represents an integer of 1 to 3.; wherein a component having a molecular weight of 1,000 to 20,000 accounts for 80% by mass or more of components having a molecular weight of 300 or more among the hydrolysate of said organosilane and/or the partial condensation product thereof:

Further, the present invention resides in a hardened film, which is obtained by hardening the hardening composition described above, wherein a degree of condensation of the hydrolysate of said organosilane and/or the partial condensation product thereof according to $^{29}$Si-NMR analysis is in the range of 0.5 to 3.5.

Further, the present invention resides in an anti-reflection film, comprising, at least, a hard coat layer and a low-refractive-index layer on a transparent support, wherein said hard coat layer and/or said low-refractive-index layer comprises the hardened film described above; wherein said acid catalyst is an organic acid having 4.5 or less of an acid dissociation constant, pKa value at 25° C., in water; and wherein the hydrolysate of said organosilane and/or the partial condensation product thereof, which is produced by using an alcohol with substantially no addition of water as a solvent, is employed.

Other and further features and advantages of the invention will appear more fully from the following description, taken in connection with the accompanying drawings.

DETAILED DESCRIPTION OF THE INVENTION

Figure 1:
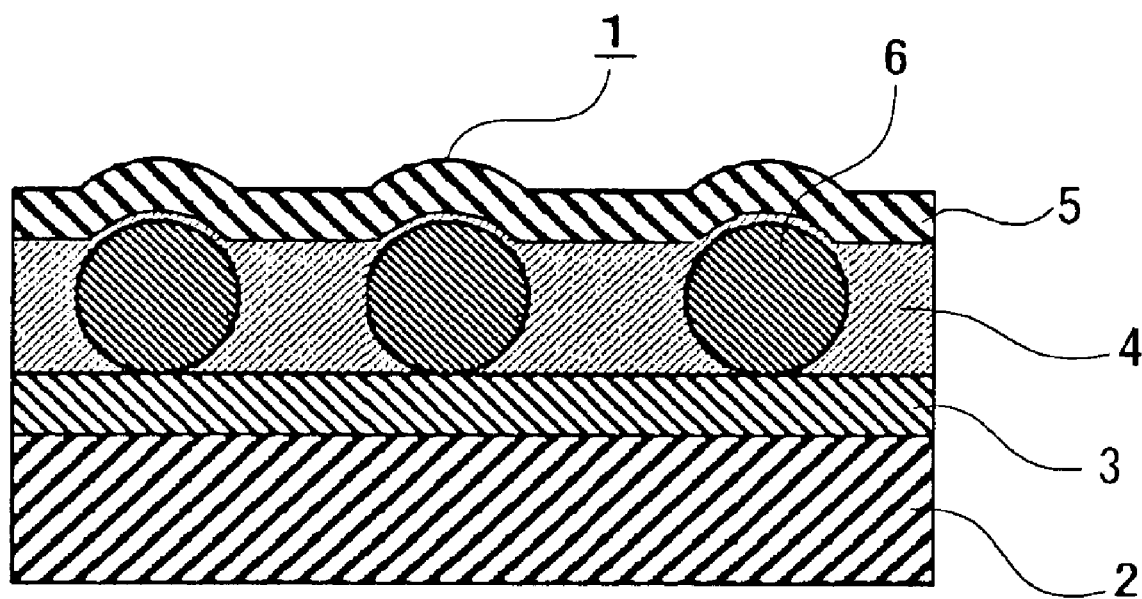
FIG. 1 is a schematic cross-sectional view showing the layer structure of an antiglare antireflection film.

According to the present invention, there are provided the following means:

(1) An anti-reflection film that is an optical film, comprising, at least, a hard coat layer, and a low-refractive-index layer containing a binder polymer, on a transparent support, wherein said hard coat layer and/or said low-refractive-index layer contains: (a) a hydrolysate of an organosilane in which a hydroxyl group or a hydrolysable group is directly bonded to silicon, and/or a partial condensation product thereof; and (b) at least one metal chelate compound of an alcohol represented by formula $R^3OH$, in which $R^3$ represents an alkyl group having 1 to 10 carbon atoms, and a compound represented by formula $R^4COCH_2COR^5$, in which $R^4$ represents an alkyl group having 1 to 10 carbon atoms, and $R^5$ represents an alkyl group having 1 to 10 carbon atoms or an alkoxy group having 1 to 10 carbon atoms, as ligands, and a metal selected from the group consisting of Zr, Ti and Al, as a central metal.

(2) The anti-reflection film according to the above item (1), wherein at least one of said hard coat layer is an anti-glare hard coat layer.

(3) The anti-reflection film according to the above item (2), further comprising a hard coat layer having no anti-glare property arranged under said anti-glare hard coat layer.

(4) The anti-reflection film according to the above item (2) or (3), wherein said anti-glare hard coat layer is composed of a binder having a refractive index of 1.48 to 2.00, and matt particles having an average particle size of 1.0 to 10.0 μm.

(5) The anti-reflection film according to any one of the above items (1) to (4), wherein said hard coat layer contains an inorganic filler composed of an oxide of at least one element selected from the group consisting of zirconium, titanium, aluminum, indium, zinc, tin, antimony and silicon.

(6) The anti-reflection film according to any one of the above items (1) to (5), wherein said low-refractive-index layer contains an inorganic filler selected from silica and magnesium fluoride.

(7) The anti-reflection film according to any one of the above items (3) to (6), wherein an inorganic filler selected from silica and alumina is contained in the hard coat layer having no anti-glare property arranged under said anti-glare hard coat layer.

(8) The anti-reflection film according to any one of the above items (1) to (7), wherein inorganic filler particles are contained in all of the hard coat layer and the low-refractive-index layer.

(9) The anti-reflection film according to any one of the above items (5) to (8), wherein an average particle size of said inorganic filler is in the range of 0.001 to 0.2 μm.

(10) The anti-reflection film according to any one of the above items (1) to (9), wherein at the surface on said low-refractive-index layer side, a coefficient of dynamic friction is in the range of 0.03 to 0.15, and a contact angle to water is in the range of 90 to 120°.

(11) The anti-reflection film according to any one of the above items (1) to (10), wherein a surface energy of said hard coat layer is in the range of 25 mN·m$^{-1}$ to 70 mN·m$^{-1}$.

(12) The anti-reflection film according to any one of the above items (2) to (11), wherein said anti-glare hard coat layer contains a fluorine-series surface active agent and/or a silicone-series surface active agent.

(13) The anti-reflection film according to any one of the above items (2) to (12), wherein said anti-glare hard coat layer has a ratio of a peak originated from a fluorine atom to a peak originated from a carbon atom, i.e. F/C of 0.40 or less, and/or a ratio of a peak originated from a silicon atom to a peak originated from a carbon atom, i.e. Si/C of 0.30 or less, measured according to an X-ray photoelectron spectroscopy, respectively.

(14) The anti-reflection film according to any one of the above items (1) to (13), wherein said binder polymer in the low-refractive-index layer is a fluorine-containing polymer.

(15) The anti-reflection film according to any one of the above items (1) to (14), wherein said organosilane of (a) the hydrolysate of an organosilane, in which a hydroxyl group or a hydrolysable group is directly bonded to silicon, and/or the partial condensation product thereof, is an organosilane represented by formula (A):

$$(R^{10})_{m1}\text{—SiX}_{n1} \qquad \text{Formula (A)}$$

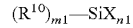

in which $R^{10}$ represents a substituted or unsubstituted alkyl or aryl group; X represents a hydroxyl group or a hydrolysable group; m1 represents an integer of 0 to 3; and n1 represents an integer of 1 to 4, in which the total of m1 and n1 is 4.

(16) The anti-reflection film according to any one of the above items (1) to (15), which has a haze of 3.0 to 50.0%, and which has an average reflectance to light in the wavelength region of 450 to 650 nm of 2.2% or less.

(17) The anti-reflection film according to any one of the above items (1) to (16), wherein said transparent support is triacetyl cellulose, polyethylene terephthalate or polyethylene naphthalate.

(18) The anti-reflection film according to any one of the above items (1) to (17), wherein a contact angle to water at the surface of the transparent support opposite to the side of said low-refractive-index layer is 40° or less.

(19) The anti-reflection film according to any one of the above items (1) to (18), wherein the group $R^{10}$ of said organosilane in formula (A) is a group containing an epoxy group, or a (meth)acryloyl group.

(20) The anti-reflection film according to any one of the above items (1) to (19), wherein said binder polymer in the low-refractive-index layer is a fluorine-containing polymer that is a perfluoroolefin copolymer.

(21) The anti-reflection film according to any one of the above items (1) to (20), wherein said binder polymer in the low-refractive-index layer is a fluorine-containing polymer that has a recurring unit containing a radical polymerizing group or a cation ring-opening polymerizing group at a side chain of said fluorine-containing polymer.

(22) A method of producing the anti-reflection film according to any one of the above items (1) to (21), comprising: at least, coating a hard coat layer and a low-refractive-index layer containing a binder polymer, on a transparent support, wherein a coating solution of said hard coat layer and/or a coating solution of said low-refractive-index layer comprises: the hydrolysate of said organosilane and/or the partial condensation product thereof represented by (a); the metal chelate compound represented by (b); and (c) a β-diketone compound and/or a β-ketoester compound represented by formula $R^4COCH_2COR^5$. in which $R^4$ and $R^5$ each have the same meanings as those in the (b).

(23) The method of producing the anti-reflection film according to the above item (22), wherein the metal chelate compound represented by (b) is contained in an amount of 0.01 to 50% by mass to the amount of the hydrolysate of said organosilane and/or the partial condensation product thereof represented by (a), and the β-diketone compound and/or the β-ketoester compound (c) is contained in an amount of 2 moles or more per mole of the metal chelate compound (b).

(24) The method of producing the anti-reflection film according to the above item (22) or (23), wherein after formation of the low-refractive-index layer on the transparent support, a saponification processing is applied thereto.

(25) The method of producing the anti-reflection film according to any one of the above items (22) to (24), wherein the low-refractive-index layer is formed by a coating process, and a solvent of the coating solution of said low-refractive-index layer is composed of at least one solvent, 50 to 100% by mass of said solvent being occupied by a solvent having a boiling point of 100° C. or less.

(26) The method of producing the anti-reflection film according to any one of the above items (22) to (25), wherein the solvent of the coating solution of said low-refractive-index layer is a ketone compound and/or an ester compound.

(27) The method of producing the anti-reflection film according to any one of the above items (22) to (26), wherein the transparent support in a roll-like form is unwound continuously, and on one side of said unrolled support, at least said hard coat layer and/or said low-refractive-index layer is coated by a micro-gravure coating method.

(28) A polarizing plate, comprising a polarizing layer and two sheets of protective films of the polarizing layer, wherein at least one of said protective films comprises the anti-reflection film according to any one of the above items (1) to (21) or the anti-reflection film produced by the production method according to any one of the above items (22) to (27).

(29) A display device, having the anti-reflection film according to any one of the above items (1) to (21), the anti-reflection film produced by the production method according to any one of the above items (22) to (27), or the polarizing plate according to the above item (28), wherein the low-refractive-index layer is arranged on the view (eye) side.

(30) A resin composition for an optical film, comprising a hydrolysate of an organosilane and/or a partial condensation product thereof (which is preferably one in the (a)), at least one metal chelate compound (which is preferably one in the (b)), and a binder resin (the binder polymer).

(31) A hardening (curable) composition, comprising a hydrolysate of an organosilane represented by formula (1) and/or a partial condensation product thereof, each of which is produced in the presence of an acid catalyst:

$(R^{10})_m$—$Si(X)_{4-m}$   Formula (1)

wherein, in formula (1), $R^{10}$ represents a substituted or unsubstituted alkyl group, or a substituted or unsubstituted aryl group; X represents a hydroxyl group or a hydrolysable group; and m represents an integer of 1 to 3.

(32) The hardening composition described in the above item (31), wherein $R^{10}$ contains a polymerizing substituent.

(33) The hardening composition described in the above item (32), wherein said polymerizing substituent is a radical polymerizing group.

(34) The hardening composition described in the above item (33), wherein the organosilane containing said polymerizing substituent is represented by formula (2):

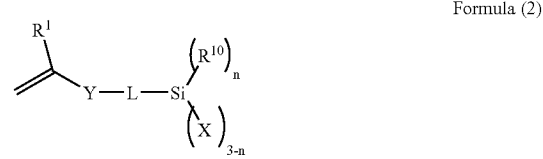

Formula (2)

wherein, in formula (2), $R^1$ represents a hydrogen atom, a methyl group, a methoxy group, an alkoxycarbonyl group, a cyano group, a fluorine atom or a chlorine atom; Y represents a single bond, an ester group, an amido group, an ether group, or a ureido group; L represents a divalent linking chain; n represents 0 or 1; $R^{10}$ represents a substituted or unsubstituted alkyl group, or a substituted or unsubstituted aryl group; and X represents a hydroxyl group or a hydrolysable group.

(35) The hardening composition according to any one of the above items (31) to (34), wherein a component having a molecular weight of 1,000 to 20,000 accounts for 80% by mass or more of components having a molecular weight of 300 or more among the hydrolysate of said organosilane and/or the partial condensation product thereof.

(36) The hardening composition according to any one of the above items (31) to (35), wherein said acid catalyst to be used is an organic acid.

(37) A hardening composition, comprising (a) a hydrolysate of an organosilane, in which a hydroxyl group or a hydrolysable group is directly bonded to silicon, and which is preferably represented by the above formula (1), and/or a partial condensation product thereof; and (b) at least one metal chelate compound of an alcohol represented by formula $R^3OH$, wherein $R^3$ represents an alkyl group having 1 to 10 carbon atoms, and a compound represented by formula $R^4COCH_2COR^5$, wherein $R^4$ represents an alkyl group having 1 to 10 carbon atoms, and $R^5$ represents an alkyl group having 1 to 10 carbon atoms or an alkoxy group having 1 to 10 carbon atoms, as ligands, and a metal selected from the group consisting of Zr, Ti and Al, as a central metal.

(38) A hardened film obtained by hardening the hardening composition according to any one of the above items (31) to (37).

(39) A hardened film obtained by hardening the hardening composition which comprises the hydrolysate of said organosilane and/or the partial condensation product thereof according to any one of the above items (31) to (37), and a binder polymer.

(40) The hardened film according to the above item (39), wherein said binder polymer contains a fluorine-containing polymer.

(41) The hardened film according to any one of the above items (38) to (40), wherein a degree of condensation of the hydrolysate of said organosilane and/or the partial condensation product thereof according to $^{29}$Si-NMR analysis is in the range of 0.5 to 3.5.

(42) An anti-reflection film, comprising, at least, a hard coat layer and a low-refractive-index layer on a transparent support, said hard coat layer and/or said low-refractive-index layer comprising the hardened film according to any one of the above items (38) to (41).

(43) The anti-reflection film according to the above item (42), wherein a binder polymer in the low-refractive-index layer contains a fluorine-containing polymer.

(44) The anti-reflection film according to the above item (42) or (43), wherein a part or all of said organosilane has at least one group $R^{10}$ that is a group containing an epoxy group or a (meth)acryloyl group.

(45) The anti-reflection film according to any one of the above items (42) to (44), wherein said acid catalyst is an organic acid having 4.5 or less of an acid dissociation constant (pKa value (25° C.)) in water.

(46) The anti-reflection film according to the above item (45), wherein the hydrolysate of said organosilane and/or the partial condensation product thereof, each of which is produced by using an alcohol as a solvent, is employed.

(47) The anti-reflection film according to the above item (45), wherein the hydrolysate of said organosilane and/or the partial condensation product thereof, which is produced by using an alcohol with substantially no addition of water as a solvent, is employed.

(48) The anti-reflection film according to any one of the above items (42) to (47), wherein an amount to be used of the hydrolysate of said organosilane and/or the partial condensation product thereof to the fluorine-containing polymer in the low-refractive-index layer is in the range of 5 to 100% by mass.

(49) The anti-reflection film according to any one of the above items (42) to (48), wherein at least one of said hard coat layer is an anti-glare hard coat layer.

(50) The anti-reflection film according to the above item (49), further comprising a hard coat layer having no anti-glare property arranged under said anti-glare hard coat layer.

(51) The anti-reflection film according to the above item (49) or (50), wherein said anti-glare hard coat layer is composed of a binder having a refractive index of 1.48 to 2.00 and matt particles having an average particle size of 1.0 to 10.0 μm.

(52) The anti-reflection film according to the above item (51), wherein said matt particles are composed of 2 or more kinds of particles having a different particle size from each other.

(53) The anti-reflection film according to the above item (51) or (52), wherein the number of particles having a particle size larger by 20% or greater than the average particle size of said matt particles accounts for 1% or less of the number of total matt particles.

(54) The anti-reflection film according to any one of the above items (42) to (53), wherein said hard coat layer contains an inorganic filler composed of an oxide of at least one element selected from the group consisting of zirconium, titanium, aluminum, indium, zinc, tin, antimony and silicon.

(55) The anti-reflection film according to any one of the above items (42) to (54), wherein said low-refractive-index layer contains an inorganic filler selected from silica and magnesium fluoride.

(56) The anti-reflection film according to the above item (55), wherein said low-refractive-index layer contains inorganic filler particles having a different particle size.

(57) The anti-reflection film according to any one of the above items (50) to (54), wherein an inorganic filler selected from silica and alumina is contained in the hard coat layer having no anti-glare property arranged under said anti-glare hard coat layer.

(58) The anti-reflection film according to any one of the above items (42) to (57), wherein inorganic filler particles are contained in all of the hard coat layer and the low-refractive-index layer.

(59) The anti-reflection film according to any one of the above items (54) to (58), wherein an average particle size of said inorganic filler is in the range of 0.001 to 0.2 μm.

(60) The anti-reflection film according to any one of the above items (42) to (59), wherein a coefficient of dynamic friction at the surface on said low-refractive-index layer side is in the range of 0.03 to 0.15, and a contact angle to water is in the range of 90 to 120°.

(61) The anti-reflection film according to any one of the above items (42) to (60), wherein a surface energy of said hard coat layer is in the range of 25 mN·m$^{-1}$ to 70 mN·m$^{-1}$.

(62) The anti-reflection film according to any one of the above items (49) to (61), wherein said anti-glare hard coat layer contains a fluorine-series surface active agent and/or a silicone-series surface active agent.

(63) The anti-reflection film according to any one of the above items (49) to (62), wherein said anti-glare hard coat layer has a ratio of a peak originated from a fluorine atom to a peak originated from a carbon atom, i.e. F/C of 0.40 or less, and/or a ratio of a peak originated from a silicon atom to a peak originated from a carbon atom, i.e. Si/C of 0.30 or less, measured according to an X-ray photoelectron spectroscopy, respectively.

(64) The anti-reflection film according to any one of the above items (42) to (63), which has a haze of 3.0 to 60.0% (preferably 3.0 to 50.0%), and which has an average reflectance to light in the wavelength region of 450 to 650 nm of 3.0% or less (preferably 2.0% or less).

(65) The anti-reflection film according to any one of the above items (42) to (64), wherein said transparent support is triacetyl cellulose, polyethylene terephthalate or polyethylene naphthalate.

(66) The anti-reflection film according to any one of the above items (42) to (65), wherein a contact angle to water at the surface of the transparent support opposite to the side of said low-refractive-index layer is 40° or less.

(67) The anti-reflection film according to any one of the above items (42) to (66), wherein said fluorine-containing polymer is a perfluoroolefin copolymer.

(68) The anti-reflection film according to any one of the above items (42) to (67), wherein said fluorine-containing polymer is a polymer comprising a recurring unit having a radical polymerizing group or a cation ring-opening polymerizing group at a side chain thereof.

(69) The anti-reflection film according to any one of the above items (42) to (68), wherein a part or all of the substituents represented by $R^{10}$ of said organosilane is a group containing a (meth)acryloyl group or an epoxy group, and wherein the hydrolysate of said organosilane and/or the partial condensation product thereof, each of which is produced in the presence of an organic acid, is employed.

(70) The anti-reflection film according to any one of the above items (42) to (69), further comprising at least one forward scattering layer arranged between said anti-reflection layer and said transparent support.

(71) A method of producing an anti-reflection film, comprising at least coating a hard coat layer and a low-refractive-index layer on a transparent support, wherein a coating solution of said hard coat layer and/or a coating solution of said low-refractive-index layer comprises the hardening composition according to any one of the above items (31) to (37).

(72) A method of producing the anti-reflection film according to any one of the above items (42) to (70), comprising at least coating a hard coat layer and a low-refractive-index layer containing a binder polymer, on a transparent support, wherein a coating solution of said hard coat layer and/or a coating solution of said low-refractive-index layer comprises the hydrolysate of said organosilane and/or the partial condensation product thereof represented by (a), and the metal chelate compound represented by (b), and a β-diketone compound and/or a β-ketoester compound represented by formula $R^4COCH_2COR^5$ wherein $R^4$ represents an alkyl group having 1 to 10 carbon atoms, and $R^5$ represents an alkyl group having 1 to 10 carbon atoms or an alkoxy group having 1 to 10 carbon atoms.

(73) The method of producing the anti-reflection film according to the above item (72), wherein the metal chelate compound represented by (b) is contained in an amount of 0.01 to 50% by mass to the amount of the hydrolysate of said organosilane and/or the partial condensation product thereof represented by (a), and the β-diketone compound and/or the β-ketoester compound represented by (c) is contained in an amount of 2 moles or more per mole of the metal chelate compound represented by (b).

(74) The method of producing the anti-reflection film according to any one of the above items (71) to (73), wherein after formation of a low-refractive-index layer on the transparent support, a saponification processing is applied thereto.

(75) The method of producing the anti-reflection film according to any one of the above items (71) to (74), wherein the low-refractive-index layer is formed by a coating process, and a solvent of the coating solution of said low-refractive-index layer is composed of at least one solvent, 50 to 100% by mass of said solvent being occupied by a solvent having a boiling point of 100° C. or less.

(76) The method of producing the anti-reflection film according to any one of the above items (71) to (75), wherein the solvent of the coating solution of said low-refractive-index layer is a ketone compound and/or an ester compound.

(77) The method of producing the anti-reflection film according to any one of the above items (71) to (76), wherein the transparent support in a roll-like form is unwound continuously, and on one side of said unrolled support, at least said hard coat layer and/or said low-refractive-index layer is coated by a micro-gravure coating method.

(78) A polarizing plate, comprising a polarizing layer and two sheets of protective films thereof, wherein at least one of said protective films comprises the anti-reflection film according to any one of the above items (42) to (70) or the anti-reflection film produced by the production method according to any one of the above items (71) to (77).

(79) A display device, having the anti-reflection film according to any one of the above items (42) to (70), the anti-reflection film produced by the production method according to any one of the above items (71) to (77), or the polarizing plate according to the above item (78), wherein the low-refractive-index layer is arranged on the view (eye) side.

(80) A polarizing plate, comprising a light polarizer and two sheets of surface protective films attached to a surface and a back surface of the polarizer, wherein at least one of said surface protective films comprises the anti-reflection film according to any one of the above items (42) to (70), or the anti-reflection film according to the above item (74) produced by forming the anti-reflection film (an anti-reflection layer thereof) and then soaking it in an alkaline solution at least one time, thereby subjecting the back surface of said film to a saponification processing.

(81) A polarizing plate, comprising a light polarizer and two sheets of surface protective films attached to a surface and a back surface of the polarizer, wherein at least one of said surface protective films comprises an anti-reflection film produced by a method in which before or after the formation of an anti-reflection layer of the anti-reflection film according to any one of the above items (42) to (70), an alkaline solution is coated on the surface opposite to the side of forming the anti-reflection layer of said anti-reflection film, and then subjected to heating, washing and/or neutralization, thereby only the back surface of said film being subjected to a saponification processing.

(82) The polarizing plate according to the above item (80) or (81), wherein the film other than the anti-reflection film of the surface protective films is an optical compensation film having an optical compensation layer including an optical anisotropy layer arranged on the side of the polarizer opposite to said surface protective film, in which said optical anisotropy layer is a layer having a negative birefringence and containing a compound having a discotic structure unit and a disc face of said discotic structure unit is out of upright to the face of said surface protective film, and an angle of said disc face of discotic structure unit to said face of the surface protective film is changed in the depth direction of the optical anisotropy layer.

(83) A transmission-, reflection- or semi-transmission-type liquid crystal display device of TN, STN, VA, IPS or OCB mode, comprising at least one polarizing plate according to any one of the above items (80) to (82).

(84) A transmission- or semi-transmission-type liquid crystal display device, having at least one polarizing plate according to any one of the above items (80) to (82), wherein a polarized light separation film having a polarized light-selecting layer is arranged between the polarizing plate of the side opposite to the view side, and a back light.

(85) A surface protecting plate for an organic EL display, comprising a λ/4 plate disposed at the transparent protective film of the side opposite to the anti-reflection film of the polarizing plate according to the above item (80) or (81).

The present inventors have found that addition of a silane-coupling agent, which has been previously subjected to hydrolysis/dehydration condensation, provides stable performance even at a reduced addition amount, and it also provides a greater effect compared with an untreated silane-coupling agent. However, there is a problem that the stability of the hydrolysis/dehydration condensation product (sol) is affected by, for example, the kind of catalyst used in the production of the sol, and occasionally, the pot life of a coating solution becomes poor, depending on the conditions of the production, so that satisfactory performance is not constantly obtained. As the result of intensive studies to solve the problem, the present inventors have found a specific material that also provides a good pot life. The present invention was completed based on these findings.

A basic structure of the anti-reflection film that is preferable as one form to carry out the present invention is explained with reference to the drawings.

The embodiment schematically shown in FIG. 1 is a sectional view showing an example of the anti-reflection film of the present invention. In this embodiment, the anti-reflection film 1 has a layer structure of a transparent support 2, a hard coat layer 3, an anti-glare hard coat layer 4, and a low-refractive-index layer 5 with the lowest refractive index, arranged in this order. Fine particles (matt particles) 6 are dispersed in the anti-glare hard coat layer 4. The refractive index of a material in the anti-glare hard coat layer 4 in the portion other than said fine particles 6 dispersed therein is preferably in the range of 1.48 to 2.00, more preferably 1.57 to 2.00, and it is preferable that a refractive index of the low-refractive-index layer 5 is in the range of 1.38 to 1.49. In the present invention, the hard coat layer may have an anti-glare property as described above, or may not have it, and may be composed of a single layer or plural layers such as 2, 3 or 4 layers. Accordingly, the hard coat layer 3 shown in FIG. 1 is not essential, but it is preferably provided by coating to give film strength. Similarly the low-refractive-index layer also may be composed of a single layer or plural layers.

At least one of the hard coat layer and the low-refractive-index layer according to the present invention contains a hydrolysate of an organosilane compound and/or a partial condensation product thereof, that is so-called a sol component (occasionally this term is also used hereinafter, or alternatively referred to as an organosilan sol).

In the present invention, at least one layer of the hard coat layer and the low-refractive-index layer preferably contains (a) the hydrolysate of said organosilane and/or the partial condensation product thereof, and (b) the metal chelate compound. Further, it is preferable to contain (c) the β-diketone compound and/or the β-ketoester compound, in addition to the above (a) and (b), to the coating solution for forming the hard coat layer and/or the low-refractive-index layer, thereby pot life of the coating solution can be prolonged.

(a) Organosilan Compound

The organosilane compound is represented by formula (A) described below:

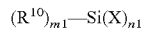 Formula (A)

In formula (A), $R^{10}$ represents a substituted or unsubstituted alkyl group, or a substituted or unsubstituted aryl group. Examples of the alkyl group include methyl, ethyl, propyl, isopropyl, hexyl, t-butyl, sec-butyl, hexyl, decyl, and hexadecyl groups. The alkyl group has preferably 1 to 30 carbon atoms, more preferably 1 to 16 carbon atoms, and especially preferably 1 to 6 carbon atoms. Examples of the aryl group include phenyl and naphthyl groups. The aryl group is preferably a phenyl group.

X represents a hydroxyl group, or a hydrolysable group. Examples of the hydrolysable group include an alkoxy group (those having preferably 1 to 5 carbon atoms, such as a methoxy group and an ethoxy group), a halogen atom (such as Cl, Br and I), and $R^2COO$ ($R^2$ is preferably a hydrogen atom or an alkyl group having 1 to 5 carbon atoms, such as $CH_3COO$ and $C_2H_5COO$). X is preferably an alkoxy group, especially preferably a methoxy group or an ethoxy group.

m1 represents an integer of 0 to 3. n1 represents an integer of 1 to 4. The sum of m1 and n1 is 4. When there are a plurality of $R^{10}$ and X, $R^{10}$s and X's may be the same or different from each other, respectively. m1 is preferably 0, 1, or 2, more preferably 1 or 2, and especially preferably 1.

The substituent contained in $R^{10}$ is not limited in particular. Examples of the substituent include a halogen atom (e.g., a fluorine, chlorine, or bromine atom), a hydroxyl group, a mercapto group, a carboxyl group, an epoxy group, an alkyl group (e.g., methyl, ethyl, i-propyl, propyl, t-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an alkoxysilyl group (e.g. trimethoxysilyl, triethoxysilyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl), and an acylamino group (e.g., acetylamino, benzoylamino, acrylamino, methacrylamino). These substituents may be further substituted with another substituent.

Among these, the substituent in $R^{10}$ is preferably a hydroxyl group, a mercapto group, a carboxyl group, an epoxy group, an alkyl group, an alkoxysilyl group, an acyloxy group, or an acylamino group, and more preferably an epoxy group, a (meth)acryloyloxy group, or a (meth)acrylamino group.

In the present invention, among the organosilane compounds represented by formula (A), an organosilane compound represented by formula (1) having at least one group $R^{10}$ is preferable:

 Formula (1)

In formula (1), $R^{10}$ and X have the same meanings as those in formula (A), and specific examples and examples of preferable groups are also the same as those in formula (A).

m represents an integer of 1 to 3. When there are a plurality of $R^{10}$ s and X's, $R^{10}$s and X's may be the same or different from each other, respectively. m is preferably 1 or 2, especially preferably 1.

When $R^{10}$ is present in plurality, at least one of them is preferably a substituted alkyl group or a substituted aryl group. Among them, an organosilane compound having a vinyl polymerizing group, and being represented by formula (2) is preferable.

Formula (2)

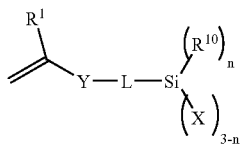

In formula (2), $R^1$ represents a hydrogen atom, a methyl group, a methoxy group, an alkoxycarbonyl group, a cyano group, a fluorine atom, or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom; more preferably a hydrogen atom, a methyl group, a methoxycarbonyl group, a fluorine atom or a chlorine atom; and particularly preferably a hydrogen atom or a methyl group.

Y represents a single bond, an ester group, an amido group, an ether group, or a ureido group. Y is preferably a single bond, an ester group or an amido group; more preferably a single bond or an ester group; and particularly preferably an ester group.

L represents a divalent linking chain. Examples of the divalent linking chain include a substituted or unsubstituted alkylene group, a substituted or unsubstituted arylene group, a substituted or unsubstituted alkylene group having a linking group (such as ether, ester or amido, the same meaning is applied hereinafter) inside the group, and a substituted or unsubstituted arylene group having a linking group inside the group. L is preferably a substituted or unsubstituted alkylene group having 2 to 10 carbon atoms, a substituted or unsubstituted arylene group having 6 to 20 carbon atoms, or an alkylene group having a linking group inside the group and having 3 to 10 carbon atoms; more preferably an unsubstituted alkylene group, an unsubstituted arylene group, or an alkylene group having an ether- or ester-linking group inside the group; and particularly preferably an unsubstituted alkylene group or an alkylene group having an ether- or ester-linking group inside the group. Examples of the substituent include a halogen atom, a hydroxyl group, a mercapto group, a carboxyl group, an epoxy group, an alkyl group and an aryl group. These substituents may be further substituted with another substituent.

n represents 0 or 1. When there are a plurality of X, X's each are the same or different from each other. n is preferably 0.

$R^{10}$ has the same meaning as $R^{10}$ in formula (A). $R^{10}$ is preferably a substituted or unsubstituted alkyl group, or an unsubstituted aryl group; and more preferably an unsubstituted alkyl group or an unsubstituted aryl group.

X has the same meaning as X in formula (A). X is preferably a halogen atom, a hydroxyl group or an unsubstituted alkoxy group; more preferably a chlorine atom, a hydroxyl group or an unsubstituted alkoxy group having 1 to 6 carbon atoms; furthermore preferably a hydroxyl group or an unsubstituted alkoxy group having 1 to 3 carbon atoms; and especially preferably a methoxy group.

In the present invention, the compounds represented by formula (A), formula (1) or formula (2) may be used in a combination of 2 or more kinds. Specific examples of the compounds represented by formula (A), formula (1) or formula (2) are shown below. However, the present invention is not limited to these compounds.

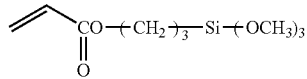
M-1

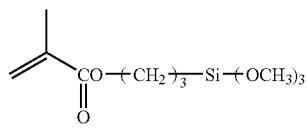
M-2

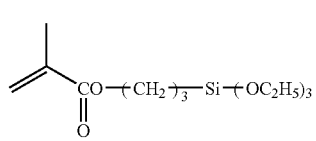
M-3

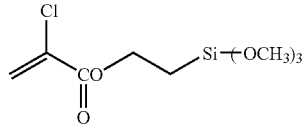
M-4

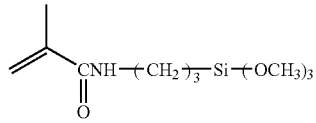
M-5

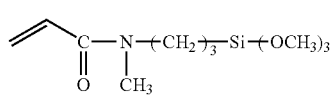
M-6

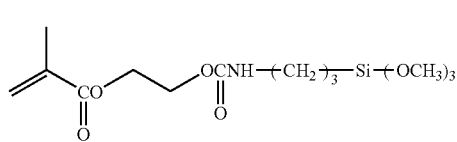
M-7

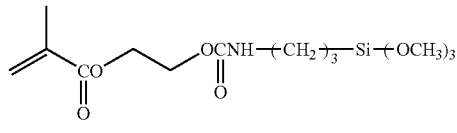
M-8

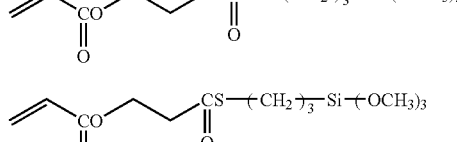
M-9

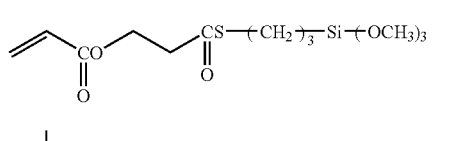
M-10

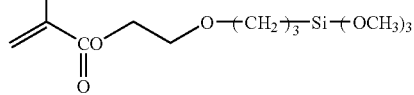
M-11

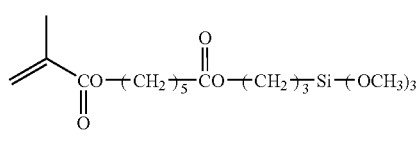
M-12

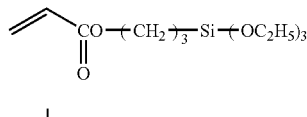
M-13

-continued
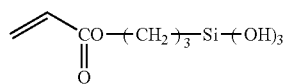
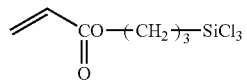
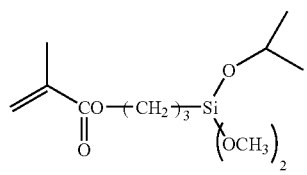
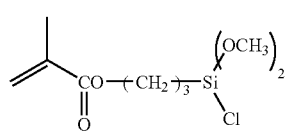
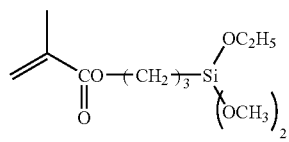
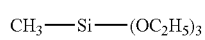 M-19
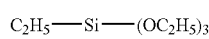 M-20
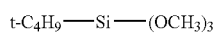 M-21
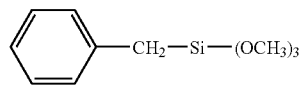 M-22
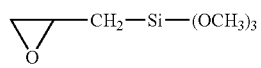 M-23
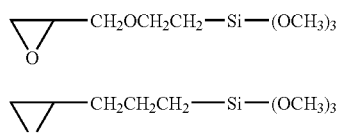 M-24
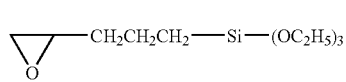 M-25
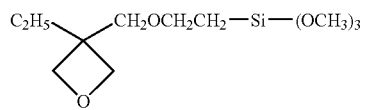 M-26
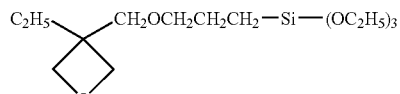 M-27
 M-28
 M-29
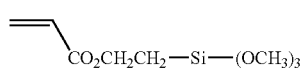 M-30
M-31
-continued
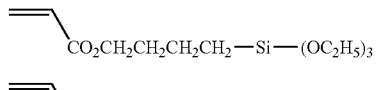 M-32
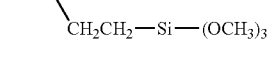 M-33
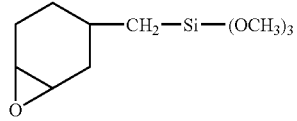 M-34
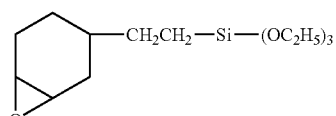 M-35
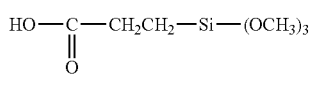 M-36
$NH_2CH_2CH_2CH_2-Si-(OCH_3)_3$  M-37
$HS-CH_2CH_2CH_2-Si-(OCH_3)_3$  M-38
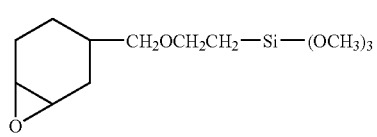 M-39
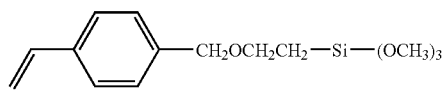 M-40
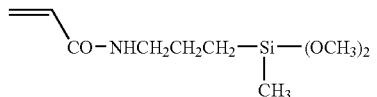 M-41
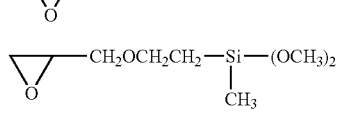 M-42
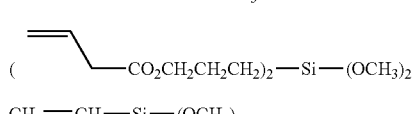 M-43
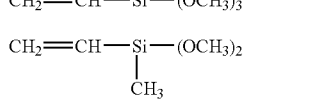 M-44
$CH_2=CH-Si-(OCH_3)_3$  M-45
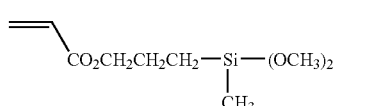 M-46
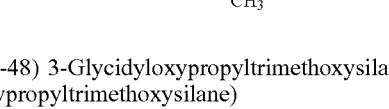 M-47
(M-48) 3-Glycidyloxypropyltrimethoxysilane (3-Glycidoxypropyltrimethoxysilane)
(M-49) 3-Acetoxypropyltrimethoxysilane
(M-50) Tetraethoxysilane
(M-51) Tetrapropoxysilane
(M-52) Tetraisopropoxysilane
(M-53) Tetraacetoxysilane
(M-54) Diacetoxydiethoxysilane (M-55) $(CH_3O)_3-Si-(CH_2)_4-Si-(OCH_3)_3$
(M-56) $(CH_3O)_3-Si-(CH_2)_6-Si-(OCH_3)_3$
(M-57) $(CH_3O)_2-Si(CH_3)-(CH_2)_4-Si(CH_3)-(OCH_3)_2$
(M-58) $H_2C=CH-CONH(CH_2)_3-Si-(OCH_3)_3$
(M-59) $H_2C=CH-CONH(CH_2)_4-Si-(OCH_3)_3$

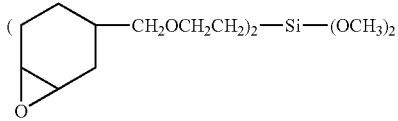
(M-60)

(M-61) $HOOC-(CH_2)_3-Si(CH_3)-(OCH_3)_2$
(M-62) Methyltrimethoxysilane

Among these specific examples, for example, (M-1), (M-2), (M-25), (M-48), (M-49) and (M-50) are especially preferable.

In order to obtain the effects of the present invention, a content of an organosilane having the afore mentioned vinyl polymerizing group in the hydrolysate of said organosilane and/or the partial condensation product thereof to be used in the present invention, is preferably in the range of 30 to 100% by mass, more preferably in the range of 50 to 100% by mass, furthermore preferably in the range of 70 to 100% by mass, and especially preferably in the range of 90 to 100% by mass. If the content of the organosilane having the vinyl polymerizing group is too small, a solid matter is formed, or a liquid becomes turbid, or a pot life deteriorates, or a control of the molecular weight is difficult (increase of molecular weight), or a content of the polymerizing group is so small that it is difficult to attain improvement of performance (for example, scratch resistance of the anti-reflection film) which may be attained when polymerization is conducted. Accordingly, a too small content of the organosilane is not preferable.

The above-mentioned (a) component for use in the present invention can be prepared by hydrolysis of the above-mentioned organosilane and/or partial condensation thereof.

A hydrolysis reaction and/or condensation reaction are performed, for example, by adding water of generally 0.3 to 2.0 mole, preferably 0.5 to 1.0 mole per mole of a hydrolysable group (X), with stirring at 25 to 100° C., in the presence of the above-mentioned (b) metal chelate compound for use in the present invention.

In the hydrolysate of said organosilane and/or the partial condensation product thereof to be used in the present invention, a mass-average molecular weight of the hydrolysate of said organosilane containing an organosilane having a vinyl polymerizing group and/or the partial condensation product thereof, in which a component having a molecular weight of less than 300 is excluded, is preferably in the range of 1,000 to 20,000, more preferably in the range of 1,000 to 10,000, furthermore preferably in the range of 1,100 to 5,000, still more preferably in the range of 1,200 to 3,000, and further still more preferably in the range of 1,200 to 2,000.

To the total amount of the components having a molecular weight of 300 or more in the hydrolysate of said organosilane and/or the partial condensation product thereof to be used in the present invention, a content of the components having a molecular weight of 20,000 or more is preferably 20% by mass or less, more preferably 15% by mass or less, further preferably 10% by mass or less, furthermore preferably 6% by mass or less, and especially preferably 4% by mass or less.

To the total amount of the components having a molecular weight of 300 or more in the hydrolysate of said organosilane and/or the partial condensation product thereof to be used in the present invention, a content of the components having a molecular weight of 1,000 to 20,000 is preferably 80% by mass or more. If the content of the components having a molecular weight of 1,000 to 20,000 is too small, a hardened film obtained by hardening a hardening (curable) composition containing such a hydrolysate of said organosilane and/or said partial condensation product thereof is poor in transparency or adhesion property to a substrate in some cases.

Here, the terms "mass-average molecular weight" and "molecular weight" are referred to a molecular weight in terms of the corresponding polystyrene detected by a differential refractometer, with a solvent of THF, by means of GPC analyzer using columns of TSKgel GMHXL, TSKgel G4000HxL and TSKgel G2000HxL (each trade name, manufactured by Tosoh Corporation). The content is indicated by area % of the peak in the above-described range of a molecular weight, assuming that a peak area of the components having a molecular weight of 300 or more is 100%.

A degree of dispersion (mass-average molecular weight/number-average molecular weight) is preferably in the range of 3.0 to 1.1, more preferably in the range of 2.5 to 1.1, furthermore preferably in the range of 2.0 to 1.1, and especially preferably in the range of 1.5 to 1.1.

The state of condensation of X in formula (A), (1) in the form of —OSi can be identified by the $^{29}Si$-NMR analysis of the hydrolysate of the organosilane and/or the partial condensation product thereof to be used in the present invention.

Here, when the case in which 3 bonds of Si are condensed in the form of —OSi is referred to as (T3), while the case in which 2 bonds of Si are condensed in the form of —OSi is referred to as (T2), and a ratio of (T3)/(T2) is denoted as a degree of condensation, the degree of condensation is preferably in the range of 0.5 to 3.5, more preferably in the range of 0.5 to 3.0, and especially preferably in the range of 0.7 to 2.5.

If the degree of condensation is too small, hydrolysis and condensation are insufficient and monomer components increase, so that hardening is incomplete. On the other hand, if the degree of condensation is too large, hydrolysis and condensation excessively progress and hydrolysable groups are consumed, resulting in reduction of interaction among a binder polymer, a resin substrate and inorganic fine-particles. Accordingly, a degree of effects obtained by these materials is relatively small.

Hydrolysis and/or condensation reaction of the organosilane to be used in the present invention may be performed without using any solvent or in a solvent. By the reaction, a hardening (curable) composition of the present invention can be prepared. In the case where a solvent is used, a concentration of the hydrolysate of the organosilane and/or the partial condensation product thereof can be properly set. As the solvent, an organic solvent is preferable for uniform mixing of components. For example, any of alcohols, aromatic hydrocarbons, ethers, ketones and esters is preferably used.

A solvent capable of solving the organosilane and a catalyst is preferred. It is also preferable in view of production process that an organic solvent is used as a solvent for a coating solution or a part of the coating solution. Further, when mixed with another material, such as a fluorine-containing polymer, a solvent that does not deteriorate solubility or dispersion property of said another material is preferable.

As the alcohols, for example, monohydric alcohols and dihydric alcohols can be recited. As the monohydric alcohols among them, saturated aliphatic alcohols having 1 to 8 carbon atoms are preferable. Specific examples of these alcohols include methanol, ethanol, n-propyl alcohol, i-propyl alcohol, n-butyl alcohol, sec-butyl alcohol, tert-butyl alcohol, ethyleneglycol, diethyleneglycol, triethyleneglycol, ethyleneglycol monobutylether, and acetic ethyleneglycol monoethylether.

Specific examples of aromatic hydrocarbons include benzene, toluene and xylene. Specific examples of ethers include tetrahydrofuran and dioxane. Specific examples of ketones include acetone, methyl ethyl ketone, methyl isobutyl ketone, and diisobutyl ketone. Specific examples of esters include ethyl acetate, propyl acetate, butyl acetate and propylene carbonate.

These organic solvents may be used singly or in combination of two or more thereof. A concentration of a solid content to a solvent in this reaction is not particularly limited, but the concentration is generally in the range of 1% by mass to 90% by mass, preferably in the range of 20% by mass to 70% by mass.

Hydrolysis and/or condensation reaction of the organosilane to be used in the present invention is preferably performed in the presence of a catalyst. Examples of the catalyst include inorganic acids such as hydrochloric acid, sulfuric acid and nitric acid; organic acids such as oxalic acid, acetic acid, formic acid, methane sulfonic acid and toluene sulfonic acid; inorganic bases such as sodium hydroxide, potassium hydroxide and ammonia; organic bases such as triethylamine and pyridine; and metal alkoxides such as triisopropoxy aluminum and tetrabutoxy zirconium. In view of production stability and storage stability of the sol liquid, acid catalysts (inorganic acids and organic acids) are preferably used in the present invention. As the inorganic acids, hydrochloric acid and sulfuric acid are preferred. As the organic acids, those having an acid dissociation constant (pKa value (25° C.)) of 4.5 or less in water are preferred. Hydrochloric acid, sulfuric acid, and organic acids having an acid dissociation constant of 3.0 or less in water are more preferred. Hydrochloric acid, sulfuric acid, and organic acids having an acid dissociation constant of 2.5 or less in water are furthermore preferred. Among them, organic acids having an acid dissociation constant of 2.5 or less in water are preferred. Specifically, methane sulfonic acid, oxalic acid, phthalic acid and malonic acid are more preferred. Oxalic acid is especially preferred.

In the present invention, the hydrolysis and/or condensation reaction is generally performed by adding water of 0.3 to 2 moles, preferably 0.5 to 1 mole, per mole of the hydrolysable group of organosilane, and stirring at a temperature of 25 to 100° C., in the presence or absence of the above-mentioned solvent, and in the presence of an acid catalyst.

In the present invention, in the case where the hydrolysable group is an alkoxy group and the acid catalyst is an organic acid, the amount of water to be added can be reduced because a carboxyl group or a sulfo group of the organic acid is able to supply a proton. Specifically, the amount of water to be added is generally in the range of 0 to 2 moles, preferably in the range of 0 to 1.5 moles, more preferably in the range of 0 to 1 mole, and especially preferably in the range of 0 to 0.5 mole, per mole of the hydrolysable group (e.g. an alkoxy group) of said organosilane. When an alcohol is used as a solvent, an embodiment of substantially no addition of water is also preferable.

In the present invention, an amount of the acid catalyst to be used is generally in the range of 0.01 to 10 mole %, preferably in the range of 0.1 to 5 mole %, to the amount of the hydrolysable group in the case where the acid catalyst is an inorganic acid. On the other hand, when an organic acid is used as the acid catalyst, an optimum amount of the acid catalyst to be used varies depending on the amount of water to be added. The amount to be used of an organic acid as the acid catalyst is generally in the range of 0.01 to 10 mole %, preferably in the range of 0.1 to 5 mole %, to the amount of the hydrolysable group, when water is added. On the other hand, when substantially no water is added, the amount to be used of an organic acid as the acid catalyst is generally in the range of 1 to 500 mole %, preferably in the range of 10 to 200 mole %, more preferably in the range of 20 to 200 mole %, furthermore preferably in the range of 50 to 150 mole %, and especially preferably in the range of 50 to 120 mole %, to the amount of the hydrolysable group.

The reaction is performed with stirring at a temperature of 25 to 100° C., and it is preferred to control the reaction conditions, e.g. the reaction temperature, in accordance with reactivity of the organosilane.

In the present invention, a content of a sol of the organosilane varies depending on the layer to which the sol is added. The amount of the sol to be added to a low-refractive-index layer is preferably in the range of 0.1 to 50% by mass, more preferably in the range of 0.5 to 20% by mass, and especially preferably in the range of 1 to 10% by mass, to the total solid content of said layer containing the sol (the layer of the sol added). The amount of the sol added to a layer other than the low-refractive-index layer is preferably in the range of 0.001 to 50% by mass, more preferably in the range of 0.01 to 20% by mass, still more preferably in the range of 0.05 to 10% by mass, and especially preferably in the range of 0.1 to 5% by mass, to the total solid content of said layer containing the sol (the layer of the sol added).

In the present invention, the amount (ratio) of a sol of the organosilane to be used is preferably in the range of 5 to 100% by mass, more preferably in the range of 5 to 40% by mass, furthermore preferably in the range of 8 to 35% by mass, and especially preferably in the range of 10 to 30% by mass, to the fluorine-containing polymer in the low-refractive-index layer. If the amount to be used is too small, it becomes difficult to obtain the effects of the present invention. In contrast, if the amount to be used is too much, for example, the refractive index tends to increase, or the shape or surface state of the film (membrane) tends to deteriorate. Accordingly, such too small or much amount is not preferable.

(b) Metal Chelate Compound

The metal chelate compound can be preferably used without any particular limitation, so long as said metal chelate compound has an alcohol represented by formula $R^3OH$, in which $R^3$ represents an alkyl group having 1 to 10 carbon atoms, and a compound represented by formula $R^4COCH_2COR^5$, in which $R^4$ represents an alkyl group having 1 to 10 carbon atoms, and $R^5$ represents an alkyl group having 1 to 10 carbon atoms or an alkoxy group having 1 to 10 carbon atoms, as ligands, and it has a metal selected from the group consisting of Zr, Ti and Al, as a central metal. When each compound is within the above-defined range, 2 or more kinds of metal chelate compounds may be used in combination. The metal chelate compound that can be used in the present invention is preferably selected from compounds represented by formula $Zr(OR^3)_{p1}, (R^4COCHCOR^5)_{p2}$, $Ti(OR^3)_{q1}(R^4COCHCOR^5)_{q2}$ or $Al(OR^3)_{r1}(R^4COCHCOR^5)_{r2}$, and acts as an accelerator of the condensation reaction of the afore-mentioned component (a).

$R^3$ and $R^4$ of the metal chelate compound may be the same or different, and each represent an alkyl group having 1 to 10 carbon atoms, with specific examples being an ethyl group, a n-propyl group, an i-propyl group, a n-butyl group, a sec-butyl group, a t-butyl group, a n-pentyl group and a phenyl group. Further, $R^5$ is an alkyl group having 1 to 10 carbon atoms as mentioned above, or an alkoxy group having 1 to 10 carbon atoms, with specific examples being a methoxy group, an ethoxy group, a n-propoxy group, an i-propoxy group, a n-butoxy group, a sec-butoxy group and a t-butoxy group. Further, p1, p2, q1, q2, r1 and r2 of the metal chelate compound each represent an integer that is determined so that they become 4- or 6-coordination numbers in total.

Specific examples of these metal chelate compounds include zirconium chelate compounds, such as tri-n-butoxyethylacetoactate zirconium, di-n-butoxybis(ethylacetoacetate) zirconium, n-butoxytris(ethylacetoacetate) zirconium, tetrakis(n-propylacetoacetate) zirconium, tetrakis(acetylacetoacetate) zirconium, and tetrakis(ethylacetoacetate) zirconium; titanium chelate compounds, such as diisopropoxybis(ethylacetoacetate) titanium, diisopropoxy-bis(acetylacetato) titanium and diisopropoxy-bis(acetylacetone) titanium; and aluminum chelate compounds, such as diisopropoxyethylacetoacetate aluminum, diisopropoxyacethylacetonato aluminum, isopropoxy-bis(ethylacetoacetate) aluminum, isopropoxy-bis(acetylacetonato) aluminum, tris(ethylacetoacetate) aluminum, tris(acetylacetonato) aluminum, and monoacetylacetonato-bis(ethylacetoacetate) aluminum.

Among these metal chelate compounds, preferred are tri-n-butoxyethylacetoacetate zirconium, diisopropoxybis(acetylacetato) titanium, diisopropoxyethylacetoacetate aluminum, and tris(ethylacetoacetate) aluminum. These metal chelate compounds may be used singly or in a combination of two or more kinds. Further, as the component (b), a partial hydrolysate of any of these metal chelate compounds may also be used.

The metal chelate compound of the component (b) is used preferably in the range of 0.01 to 50% by mass, more preferably in the range of 0.1 to 50% by mass, and further preferably in the range of 0.5 to 10% by mass, to the amount of the organosilane that is a raw material of the component (a). If the amount of the component (b) to be used is too small, a condensation reaction of the component (a) is slow, and a durability of a resulting coating film might be worsened. On the other hand, if the amount is too large, a storage stability of the composition containing the component (a) and the component (b) might be worsened.

To a coating solution(s) of the hard coat layer and/or the low-refractive-index layer that are used in the present invention, in addition to the above component (a) and component (b) (e.g. in the form of a composition containing these), the afore-mentioned component (c) is also preferably added. The component (c) is further explained below.

Component (c)

The component (c) that can be used in the present invention is a β-diketone compound and/or a β-ketoester compound represented by formula $R^4COCH_2COR^5$, and acts as a stabilizer for the composition that is used in the present invention. That is, it is assumed that the compound (c) coordinates onto a metal atom of the metal chelate compound (a zirconium, titanium and/or aluminum chelate compound) in the afore-mentioned component (b), and the resultant metal chelate compound suppresses a function of the metal chelate compound (b) accelerating a condensation reaction between the component (a) and the component (b), and it acts to improve storage stability of the obtained composition. $R^4$ and $R^5$ that compose the component (c) have the same meanings as those in the metal chelate compound of the afore-mentioned component (b).

Specific examples of the β-diketone compound and/or the β-ketoester compound of said component (c) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione and 5-methyl-hexane-dione. Among these compounds, ethyl acetoacetate and acetylacetone are preferable. Particularly acetylacetone is preferable. These β-diketone compounds and/or β-ketoester compounds may be used singly or in combination of two or more kinds. In the present invention, the β-diketone compound and/or β-ketoester compound of said component (c) is used preferably in the range of 2 moles or more, more preferably in the range of 3 to 20 moles, per mole of the metal chelate compound of the afore-mentioned component (b). If the amount is too small, a storage stability of the obtained composition might be inferior.

It is preferable that the content of the afore-mentioned component (a) is small in a surface layer that is a relatively thin film, while it is large in an under layer that is a relatively thick film. Specifically, the content of the component (a) is preferably in the range of 0.1 to 50% by mass, more preferably in the range of 0.5 to 20% by mass, and particularly preferably in the range of 1 to 10% by mass, to the total solid content of the component (a)-containing layer (addition layer).

In the present invention, it is preferable that a composition containing the afore-mentioned components (a) and (b) is prepared at the first step, and then the component (c) is added to the composition, and the resulting solution is contained into a coating solution of at least one of a hard coat layer and a low-refractive-index layer to coat it.

The anti-reflection film of the present invention has, on a transparent support, a hard coat layer and a low-refractive-index layer superposed thereon in this order. In accordance with a performance to be required, an anti-reflection film in which one of said hard coat layer is an anti-glare hard coat layer may be prepared.

In order to improve a film strength of the anti-reflection film of the present invention, a hard coat layer that is not anti-glare may be provided under the anti-glare hard coat layer.

Further, it is preferable to add an inorganic filler to each layer on the support. The inorganic filler to be added may be the same or different in each layer. It is preferable to control the kind and/or the addition amount of the inorganic filler, in accordance with a required performance such as refractive index, film strength, film thickness and coating property of each layer.

The shape of the inorganic filler for use in the present invention is not particularly limited, and for example, any shape such as spherical, tabular, fibrous, stick-like, amorphous, and hollow shapes can be preferably used, with a more preferable example of a spherical shape because of excellent dispersion capability. Similarly, the kind of inorganic fillers is not particularly limited, but a non-crystalline one is preferably used. The inorganic filler composed of any of oxides, nitrides, sulfides or halides of metal are preferred, with metal oxides being especially preferred. Examples of metal include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni. In order to obtain a transparent hardened film, an average particle size (diameter) of the inorganic filler is preferably in the range of 0.001 to 0.2 μm, more preferably in the range of 0.001 to 0.1 μm, furthermore preferably in the range of 0.001 to 0.06 μm. Herein, the average particle size referred to is measured using a Coulter counter.

A method of using the inorganic filler in the present invention is not particularly limited, and for example, it may be used in the dry state or in dispersion of water or an organic solvent.

In order to suppress aggregation or precipitation of the inorganic filler, in the present invention, it is also preferable to use a dispersion-stabilizing agent in combination. As the dispersion-stabilizing agent, for example, in addition to polyvinyl alcohol, polyvinyl pyrrolidone, a cellulose derivative, polyamide, phosphoric acid ester, polyether, a surface-active agent, and the hydrolysate of the organosilane represented by formula (A) or (1) and/or the partial condensation product thereof according to the present invention, a silane-coupling agent and a titanium coupling agent can be used. Particularly, a silane-coupling agent is preferable because a hardened film (membrane) is excellent in mechanical strength. The amount of a dispersion-stabilizing agent (e.g. a silane-coupling agent) to be added is not particularly limited, but for example, it is preferred to add so as to become 1 mass part or more, to 100 mass parts of the inorganic filler. Further, the method of adding a dispersion-stabilizing agent is not particularly limited, and various methods are available. For example, a method of adding a previously hydrolyzed product, or a method in which after mixing a silane-coupling agent that is a dispersion-stabilizing agent with an inorganic filler, and further the resultant mixture is subjected to hydrolysis and condensation. The latter method is more preferable.

Further, it is preferable that the hydrolysate of the organosilane represented by the afore-mentioned formula (A) or (1) and/or the partial condensation product thereof according to the present invention is used not only as a dispersion-stabilizing agent for the inorganic filler, but also as a part of binder components of each layer or as an additive at the time when a coating solution is prepared.

The inorganic filler that is properly used for individual layer is explained later.

The anti-glare hard coat layer for use in the present invention is explained below.

The anti-glare hard coat layer is composed, for example, of a binder for providing a hard coat property, matt particles for providing an anti-glare property, and an inorganic filler for enhancement of refractive index, inhibition of cross-linking shrinkage, and enhancement of mechanical strength.

As the compound (a binder polymer) used in the anti-glare hard coat layer, a polymer having a saturated hydrocarbon chain or a polyether chain, as a main chain, is preferred. Among them, a polymer having a saturated hydrocarbon chain as a main chain is more preferred.

Further, it is preferred that the binder polymer has a cross-linking structure.

As the binder polymer having a saturated hydrocarbon chain as a main chain, polymers of ethylenically unsaturated monomers are preferred. As the binder polymer having a saturated hydrocarbon chain as a main chain and in addition a cross-linking structure, (co)polymers of monomers having at least two ethylenically unsaturated groups are preferred.

In order to produce a polymer having a high refractive index, it is preferred to incorporate an aromatic ring, or at least one atom selected from a group consisting of halogen (except for fluorine), sulfur, phosphorus and nitrogen atoms, into the structure of the foregoing monomer.

Examples of the monomer having two or more ethylenically unsaturated groups include esters of a polyhydric alcohol and a (meth)acrylic acid (e.g., ethyleneglycol di(meth)acrylate, 1,4-cyclohexane di(meth)acrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetra(meth)acrylate, polyurethane poly(meth)acrylate, polyester poly(meth)acrylate), vinyl benzene and its derivatives (e.g., 1,4-divinylbenzene, 4-vinylbenzoic acid-2-acryloylethylester, 1,4-divinylcyclohexane), vinylsulfones (e.g., divinylsulfone), acrylamides (e.g., methylene-bis-acrylamide) and methacrylamides. These monomers may be used in combination of two or more of these.

Specific examples of the high-refractive-index monomer include bis(4-methacryloylthiophenyl)sulfide, vinylnaphthalene, vinylphenylsulfide and 4-methacryloxyphenyl-4'-methoxyphenyl thioether. Two or more kinds of these monomers may be used in combination.

Polymerization of these monomers having ethylenically unsaturated groups can be conducted by irradiation of ionization radiation or heat, in the presence of a photo radical initiator or a thermal radical initiator.

Accordingly, an anti-glare hard coat layer of the anti-reflection film can be formed by the steps of: preparing a coating solution containing a monomer having ethylenically unsaturated groups, a photo radical initiator or a thermal radical initiator, matt particles, and an inorganic filler; coating said coating solution on a transparent support; and then curing the same by a polymerization reaction by ionization radiation or heat.

Examples of the photo radical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulfoniums. Examples of acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)-butanone. Examples of benzoins include benzoin benzenesulfonic acid ester, benzoin toluenesulfonic acid ester, benzoin methyl ether, benzoin ethyl ether, and benzoin isopropyl ether. Examples of benzophenones include benzophenone, 2,4-dichlorobenzophenone, 4,4-dichlorobenzophenone, and p-chlorobenzophenone. Examples of phosphine oxides include 2,4,6-trimethylbenzoyl diphenylphosphine oxide.

In Saishin UV Koka Gijutsu (Modern UV hardening technology) (P. 159, Editor; Kazuhiro Takausu, Publishers; (Kabushiki Kaisha) Gijutu Johou Kyokai (The Society of Technical Information, published in 1991), various examples that are useful in the present invention are also described.

As the photo-radical polymerization initiator of a commercially available photo-cleavage type, for example, Irgacure 651, 184 and 907 (each trade name, manufactured by Ciba-Geigy) are mentioned as preferable examples.

The photo-polymerization initiator is used preferably in the range of 0.1 to 15 mass parts, more preferably in the range of 1 to 10 mass parts, to 100 mass parts of a multi-functional monomer.

In addition to the photopolymerization initiator, a photosensitizer may be used. Specific examples of the photosensitizer include n-butyl amine, triethyl amine, tri-n-butylphosphine, Michler's ketone, and thioxanthones.

As the compound that initiates radical polymerization by the action of heat, for example, organic or inorganic peroxides, and organic azo or diazo compounds may be used.

Specific examples of the above-mentioned compounds include organic peroxides such as benzoyl peroxide, benzoyl halogenoperoxide, lauroyl peroxide, acetyl peroxide, dibutyl peroxide, cumene hydroperoxide, and butyl hydroperoxide; inorganic peroxides such as hydrogen peroxide, ammonium persulfate, and potassium persulfate; azo compounds such as 2-azo-bis(isobutylonitrile), 2-azo-bis(propionitrile), and 2-azo-bis(cyclohexanedinitrile); and diazo compounds such as diazoaminobenzene and p-nitrobenzene diazonium.

The polymer having polyethers as a main chain is preferably a ring-opening polymer of a polyfunctional epoxy compound. The ring-opening polymerization of a multi-functional epoxy compound can be performed by irradiation of ionization radiation or heat, in the presence of a light-induced acid-generating agent or a heat-induced acid-generating agent.

Accordingly, an anti-reflection film may be formed by a method comprising the steps of: preparing a coating solution containing a multi-functional epoxy compound, a light-induced acid-generating agent or a heat-induced acid-generating agent, matt particles, and an inorganic filler; coating said coating solution on a transparent support; and then hardening the resultant coating by a polymerization reaction by ionization radiation or heat.

Using a monomer having a cross-linking functional group in place of, or in addition to, the monomer having 2 or more ethylenically unsaturated groups, cross-linking functional groups may be introduced into a polymer so that a cross-linking structure can be introduced into a binder polymer by the reaction of said cross-linking functional groups.

Examples of the cross-linking functional group include an isocyanato group, an epoxy group, an aziridine group, an oxazoline group, an aldehyde group, a carbonyl group, a hydrazine group, a carboxyl group, a methylol group and an active methylene group. Vinyl sulfonic acid, acid anhydride, cyanoacrylate derivatives, melamine, etherificated methylol, ester and urethane, and also metal alkoxides such as tetramethoxysilane may be used as a monomer to introduce a cross-linking structure. It is also possible to use a functional group capable of exerting a cross-linking performance as a result of a decomposition reaction, such as a blocked isocyanate group. In other words, the term "cross-linking functional group" referred to herein embraces those exerting a cross-linking reaction as a result of decomposition even though they do not react instantly.

In a binder polymer having these cross-linking functional groups, a cross-linking structure can be formed coating the binder polymer, followed by heating.

In order to give an anti-glare performance to an anti-glare hard coat layer, matt particles (such as inorganic compound particles and resin particles) having an average particle size of 1 to 10 µm (preferably 1.5 to 7.0 µm) that is larger than the filler particle-size are contained.

Preferable specific examples of the afore-mentioned matt particles include inorganic compound particles such as silica particles and $TiO_2$ particles, and resin particles such as cross-linking acryl particles, cross-linking styrene particles, melamine resin particles, and benzoguanamine resin particles. Among them, cross-linking styrene particles are preferred.

The shape of matt particles to be used may be any of a spherical form or an amorphous form.

Further, 2 or more different kinds of the matt particles may be used in combination.

The above-said matt particles are incorporated in an anti-glare hard coat layer so that the amount of matt particles in the formed anti-glare hard coat layer becomes preferably in the range of 10 to 1000 $mg/m^2$, more preferably in the range of 30 to 100 $mg/m^2$, Further, a particularly preferable embodiment is that cross-linking styrene particles are used as matt particles, and said cross-linking styrene particles having a particle size larger than ½ of the film thickness of the anti-glare hard coat layer account for 40 to 100% of the entire cross-linking styrene particles. Here, the particle size distribution of matt particles is measured by a Coulter counter method, and the measured distribution is transformed to a particle number distribution.

Further, 2 or more kinds of the matt particles of different particle sizes may be used in combination. It is possible to give an anti-glare property by matt particles of a larger particle size, while to give another optical property by matt particles of a smaller particle size. For example, in the case that an anti-reflection film is attached to a high definition display of 133 dpi or more, an optical performance that is called glaring (glistening) is required. This is resulting from a minute irregularity present on the film surface, thereby pixels being enlarged or shrunk and an evenness of the display performance being lost. However, this can be materially improved by using anti-glare matt particles in combination with matt particles smaller by 5 to 50% in particle size as compared to said anti-glare matt particles.

The particle size distribution of the above-mentioned matt particles is preferably mono-dispersed, and it is preferable that the particle sizes of entire particles are almost same as much as possible. For example, assuming that particles having a larger particle size by 20% or more than the average particle size are designated as coarse particles, the content of said coarse particles is preferably 1% or less, more preferably 0.1% or less, and further more preferably 0.01% or less, to the entire particles. Matt particles having the above-mentioned particle size distribution can be obtained according to an ordinary synthesis reaction followed by classification. Matt particles with a more preferable particle size distribution can be obtained by increasing the number of times of the classification, or by advancing the degree of the classification.

The antiglare hard coat layer preferably contains, in addition to the above-mentioned matt particles, an inorganic filler, which is composed of an oxide of at least one metal selected from titanium, zirconium, aluminum, indium, zinc, tin and antimony, and which has an average particle diameter of 0.2 µm or less, preferably 0.1 µm or less, and more preferably 0.06 µm or less, in order to increase the refractive index of the layer.

On the contrary, in an antiglare hard coat layer containing high-refractive-index matt particles, in order to increase a difference in refractive index between the layer and the matt particles, it is preferred to use an oxide of silicon for maintaining the refractive index of the layer at low levels. A preferred particle size of the matt particles is the same as that of the above-mentioned inorganic filler.

Specific examples of the inorganic filler used in the antiglare hard coat layer include $TiO_2$, $ZrO_2$, $Al_2O_3$, $In_2O_3$, ZnO, $SnO_2$, $Sb_2O_3$, ITO (indium-tin oxide) and $SiO_2$. $TiO_2$ and $ZrO_2$ are particularly preferable in view of increasing a refractive index. It is also preferable that the surface of the inorganic filler is subjected to a silane coupling treatment or a titanium coupling treatment. For this purpose, a surface treating agent having a functional group capable of reacting with the binder species is preferably used on the surface of the filler.

The addition amount of the inorganic filler is preferably 10 to 90 mass %, more preferably 20 to 80 mass % and particularly preferably 30 to 75 mass %, to the total mass of the antiglare hard coat layer.

Note that such inorganic filler has sufficient small particle sizes as compared with the wavelength of light so that it causes no scattering of light and a dispersion of the filler dispersed in a binder polymer behaves as an optically uniform substance.

The mixture of the binder and the inorganic filler in the antiglare hard coat layer according to the present invention has a total refractive index of preferably 1.48 to 2.00, more preferably 1.50 to 1.80. Selection of the kinds of and ratios of amounts of the binder and inorganic filler, respectively, can set the refractive index of the mixture within the above-mentioned range. How to make a selection can be known by preliminary experiments.

To secure surface state uniformity by particularly suppressing surface deficiency, such as coating unevenness, drying unevenness, and spot defects, the antiglare hard coat layer according to the present invention is formed from a coating composition for forming an antiglare hard coat layer that contains a fluorine-containing surfactant or a silicone-series surfactant or both therein. In particular, the fluorine-containing surfactant is preferably used since it exhibits, even with a smaller addition amount, the effect of obviating the surface deficiency, such as coating unevenness, drying unevenness or spot defects of the antireflection film according to the present invention.

Preferred examples of the fluorine-containing surfactant include perfluoroalkyl group-containing oligomers, such as Megafac F-171, F-172, F-173 and F-176 (trade names, respectively, manufactured by Dainippon Ink and Chemicals, Inc.). The silicone-series surfactant includes, for example, polydimethylsiloxanes that are modified with various substituents, e.g., oligomers of ethylene glycol, propylene glycol or the like, at side chains or the terminals of the main chain thereof.

However, use of surfactants such as those described above causes the following problems. That is, a functional group containing fluorine atom(s) and/or a functional group containing Si atom(s) segregates on the surface of the antiglare layer, to decrease the surface energy of the antiglare layer; and when a low refractive index layer is overcoated on the antiglare layer, the capability of antiglare is degraded. This is presumed that since the wettability of the coating composition used for forming the low refractive index layer is deteriorated, it causes degradation of minute unevenness in the thickness of the low refractive index layer that cannot be visually detected. It has been found that to solve such problems, it is effective to control the surface energy of the antiglare layer to 25 $mN \cdot m^{-1}$ to 70 $mN \cdot m^{-1}$, more preferably 35 $mN \cdot m^{-1}$ to 70 $mN \cdot m^{-1}$ by adjusting the structure and addition amount of the fluorine-containing and/or silicone-based surfactant. Further, it has been found that it is also effective to use a solvent having a boiling point of 100° C. or less so as to account for 50 to 100 mass % to the total 100 mass % of the coating solvent for forming a lower refractive index layer as will be described hereinbelow. In addition, to realize the above-mentioned surface energy, F/C, which is the ratio of the peak attributed to a fluorine atom to the peak attributed to a carbon atom measured by X-ray photoelectron spectroscopy, is preferably to be 0.40 or less, and/or Si/C, which is the ratio of the peak attributed to a silicon atom to the peak attributed to a carbon atom, is preferably to be 0.30 or less.

The thickness of the antiglare hard coat layer is preferably 1 to 10 μm, more preferably 1.2 to 6 μm.

In the antireflection film of the present invention, a so-called smooth hard coat layer, which is non-antiglare, is also preferably used for the purpose of improving the film strength. This is provided by coating between the transparent support and the antiglare hard coat layer.

The materials to be used in a smooth hard coat layer are the same as those of the antiglare hard coat layer, except that no matt particle for imparting antiglare property is used. The smooth hard coat layer is composed of a binder and an inorganic filler.

In the smooth hard coat layer according to the present invention, the inorganic filler is preferably silica or alumina from the viewpoints of mechanical strength and general versatility, with silica being particularly preferred. Preferably, the surface of the inorganic filler is subjected to a silane coupling treatment. For this purpose, a surface treating agent having a functional group capable of reacting with the binder species is preferably used on the surface of the filler.

The addition amount of the inorganic filler is preferably 10 to 90 mass %, more preferably 20 to 80 mass % and particularly preferably 30 to 75 mass %, to the total mass of the hard coat layer. The thickness of the smooth hard coat layer is preferably 1 to 10 μm, more preferably 1.2 to 6 μm.

The low-refractive-index layer according to the present invention will be described hereinbelow.

The refractive index of the low-refractive-index layer in the anti-reflection film of the present invention is preferably in the range of 1.38 to 1.49, more preferably 1.38 to 1.44.

Further, the low refractive index layer preferably satisfies the following expression (I), in view of low reflectance.

$$m\lambda/4 \times 0.7 < n_1 d_1 < m\lambda/4 \times 1.3 \qquad \text{Expression (I)}$$

In the expression (I), m is a positive odd number, $n_1$ is a refractive index of the low refractive index layer, and $d_1$ is a thickness (μm) of the low refractive index layer. Further, λ is a wavelength having a value in the range of 500 to 550 nm.

Herein, the expression "satisfies the expression (I)" means that there exists m (positive odd number, generally 1) satisfying the expression (I) within the above-mentioned wavelength range.

The material that forms the low refractive index layer in the present invention will be described hereinbelow.

The low refractive index layer in the present invention preferably contains a fluorine-containing polymer, as a low refractive index binder. The fluorine-containing polymer is preferably a heat- or ionized radiation-crosslinkable (curable) fluorine-containing polymer having a dynamic friction coefficient of 0.03 to 0.15 and a contact angle of water thereon of 90 to 120°. The low refractive index layer in the present invention may contain an inorganic filler for increasing the film strength.

Examples of the fluorine-containing polymer that can be used in the low refractive index layer include hydrolysates or dehydrocondensates of a perfluoroalkyl group-containing silane compound (for example, (heptadecafluoro-1,1,2,2-tetrahydrodecyl)triethoxysilane), and in addition, fluorine-containing copolymers derived from a fluorine-containing monomer and a constitutional unit for imparting crosslinking reactivity, as constituents.

Specific examples of the fluorine-containing monomer unit include, for example, fluoroolefins (for example, fluoroethylene, vinylidene fluoride, tetrafluoroethylene, hexafluoropropylene, perfluoro-2,2-dimethyl-1,3-dioxol), partially or completely fluorinated alkyl ester derivatives of (meth)acrylic acid (for example, BISCOAT 6FM (trade name), manufactured by Osaka Organic Chemical Industry, Ltd., and M-2020 (trade name), manufactured by Daikin Industries, Ltd.), and completely or partially fluorinated vinyl ethers, or the like. A preferred fluorine-containing monomer unit includes perfluoroolefins. From the viewpoints of refractive index, solubility, transparency, and easy availability, hexafluoropropylene is particularly preferable.

The constituents for imparting crosslinking reactivity include: for example, those constituents obtained by polymerization of a monomer or monomers already having a self-crosslinking functional group in the molecule, such as glycidyl (meth)acrylate and glycidyl vinyl ether; and those constituents obtained by polymerization of a monomer or monomers having a carboxyl group, a hydroxyl group, an amino group, a sulfo group or the like (for example, (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid, etc.); those constituents comprised by the above-mentioned constituents to which a crosslinking reactive group such as (meth)acryloyl group has been introduced by a polymer reaction (for example, an acryloyl group can be introduced by a technique in which acryl chloride is allowed to act on a hydroxyl group in the above-mentioned constituent).

Further, besides the above-mentioned fluorine-containing monomer unit and constituent for imparting crosslinking reactivity, monomers containing no fluorine atom may be copolymerized therewith as appropriate, from the viewpoints of solubility in solvents, transparency of the resulting film and so forth. Monomer units that can be used in combination are not particularly limited. Examples of the monomer unit include olefins (e.g., ethylene, propylene, isoprene, vinyl chloride, vinylidene chloride), acrylic esters (e.g., methyl acrylate, ethyl acrylate, acrylic acid-2-ethylhexyl), methacrylic esters (e.g., methyl methacrylate, ethyl methacrylate, butyl methacrylate, ethyleneglycol dimethacrylate), styrenes and derivatives thereof (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides, and acrylonitrile derivatives.

A curing agent may be used in combination with the above-mentioned polymers as appropriate, as disclosed in JP-A-10-25388 and JP-A-10-147739.

The fluorine-containing polymers that are particularly useful in the present invention are random copolymers of perfluoroolefins with vinyl ethers or vinyl esters. In particular, it is preferable that the copolymers contain a group capable of crosslinking reaction by itself (a radical reactive group such as a (meth)acryloyl group; a ring-opening polymerizable group such as an epoxy group, an oxetanyl group or the like; and so forth). This crosslinking reactive group-containing polymerization unit preferably accounts for 5 to 70 mol %, particularly preferably 30 to 60 mol % of the total polymerization units in the polymer.

Further, for the purpose of imparting the fluorine-containing polymer that can be used in the present invention with resistance to dust and stain, it is preferable that a polysiloxane structure is introduced thereto. The method of introducing such a polysiloxane structure is not particularly limited. For example, preferable are a method of introducing a polysiloxane block copolymer component by using a silicone macroazo initiator, as described in, for example, JP-A-11-189621, JP-A-11-228631, and JP-A-2000-313709; and a method of introducing a polysiloxane graft copolymer component by using a silicone macromer, as described in JP-A-2-251555 and JP-A-2-308806. The polysiloxane component is used in an amount of preferably 0.5 to 10 mass %, particularly preferably 1 to 5 mass % in the polymer.

For imparting resistance to dust and stain to the fluorine-containing polymer in the present invention, besides the above-mentioned methods, means of adding reactive group-containing polysiloxanes (for example, KF-100T, X-22-169AS, KF-102, X-22-3701IE, X-22-164B, X-22-5002, X-22-173B, X-22-174D, X-22-167B, and X-22-161AS (trade names, manufactured by Shin-Etsu Chemical Co., Ltd.), AK-5, AK-30, and AK-32 (trade names, manufactured by Toagosei Co., Ltd.), Silaplane FM0725 and Silaplane FM0721 (trade names, manufactured by Chisso Corporation), and so forth) is also preferable. In this case, it is preferred that the polysiloxanes are added in the range of 0.5 to 10 mass %, particularly preferably 1 to 5 mass %, to the total mass of the solid content in the low refractive index layer.

As the inorganic filler to be used in the low refractive index layer, those having low refractive indices are preferably used. Preferable inorganic fillers are silica and magnesium fluoride, with silica being particularly preferable.

The average particle diameter of the inorganic filler is preferably 0.001 to 0.2 μm, and more preferably 0.001 to 0.05 μm. Preferably the particle diameter of the filler is as uniform (monodispersion) as possible.

The inorganic fillers may be used in combination of two fillers having different particle sizes. In particular, use of a combination of an inorganic filler having a particle size of 0.02 to 0.05 μm and an inorganic filler having a particle diameter of 0.01 μm or less can make the reflectivity compatible with the abrasion resistance of the low refractive index layer. It is possible to freely change the ratio between the addition amounts of the two kinds of inorganic fillers having different particle diameters between 0 to 1 depending on the desired balance between the reflectivity and the abrasion resistance. In the case where a decrease in the reflectivity is desired, it is preferred that the inorganic filler having a smaller particle size occupies the major part, and on the other hand, in the case where an increase in the abrasion resistance is desired, it is preferred to increase the ratio of the inorganic filler having a larger particle diameter.

The amount of the inorganic filler to be added is preferably 5 to 90% by mass, more preferably 10 to 70% by mass, and particularly preferably 10 to 50% by mass, to the total amount of the low-refractive-index layer.

Preferably the inorganic filler is subjected to surface treatment before use. Examples of the surface treatment include physical surface treatments, such as plasma discharge treatment and corona discharge treatment, and chemical surface treatments using a coupling agent. The use of a coupling agent is preferred. As the coupling agent, alkoxymetal compounds including hydrolysates of the organosilane represented by the above formula (A) or (1) and/or partial condensates thereof according to the present invention (for example, titanium coupling agents and silane coupling agents) are preferably used. When the inorganic filler is silica, silane coupling treatment is particularly effective.

The hydrolysates of the organosilane represented by the formula (A) or (1) described above and/or partial condensates thereof according to the present invention may be used as a surface treating agent for the inorganic filler of the low refractive index layer to conduct surface treatment, before the coating solution for the layer is prepared. It is preferable that the above substances are added as additives and have contained in the layer when the coating solution for the layer is prepared.

As for the solvent composition of the coating solution to be used for forming the hard coat layer and the low refractive index layer according to the present invention, such solvents may be used singly or as mixtures. In the case of mixed solvents, it is preferred that solvents having boiling points 100° C. or less account for 50 to 100 mass %, more preferably 80 to 100 mass %, still more preferably 90 to 100 mass %, and further still more preferably 100 mass % of the total mass of the solvents. If the total content of the solvents having boiling points 100° C. or less is too small, the drying speed of the coating solution becomes very slow, resulting in a poor state of the coating surface and unevenness in the thickness of the coating film so that optical characteristics including reflectivity become worse. In the present invention, use of a coating solution containing a large amount of a solvent or solvents having a boiling point 100° C. or less can solve such problems.

The solvents having boiling points 100° C. or less include: for example, hydrocarbons such as hexane (boiling point 68.7° C., hereinafter, "° C" will be omitted), heptane (98.4), cyclohexane (80.7), and benzene (80.1); halogenated hydrocarbons such as dichloromethane (39.8), chloroform (61.2), carbon tetrachloride (76.8), 1,2-dichloroethane (83.5), and trichloroethylene (87.2); ethers such as diethyl ether (34.6), diisopropyl ether (68.5), dipropyl ether (90.5), and tetrahydrofuran (66); esters such as ethyl formate (54.2), methyl acetate (57.8), ethyl acetate (77.1), and isopropyl acetate (89); ketones such as acetone (56.1), and 2-butanone (=methyl ethyl ketone, 79.6); alcohols such as methanol (64.5), ethanol (78.3), 2-propanol (82.4), and 1-propanol (97.2); cyano compounds such as acetonitrile (81.6) and propionitrile (97.4); and carbon disulfide (46.2). Among these, the solvent is preferably ketones or esters, particularly preferably ketones. Among the ketones, 2-butanone is particularly preferable.

The solvents having boiling points of 100° C. or more include, for example, octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-dimethylformamide (153), N,N-dimethylacetamide (166), and dimethyl sulfoxide (189). Cyclohexanone and 2-methyl-4-pentanone are preferred.

Dilution of components for the hard coat layer and the low refractive index layer according to the present invention with the solvent having the above-mentioned composition provides coating solutions for the respective layers. The concentrations of the coating solutions are preferably adjusted taking the viscosities of the coating solutions and specific densities of the layer materials into consideration, and are preferably in the range of 0.1 to 20 mass % and more preferably 1 to 10 mass %.

As the transparent support of the anti-reflection film of the present invention, plastic films are preferably used. Examples of a polymer which forms a plastic film include a cellulose ester (e.g., triacetyl cellulose, diacetyl cellulose; representative example: TAC-TD80U, TD80UF (trade names, manufactured by Fuji Photo Film Co., Ltd.)), a polyamide, a polycarbonate, a polyester (e.g., polyethylene terephthalate, polyethylene naphthalate), a polystyrene, a polyolefin, a norbornene-series resin (e.g., ARTON (trade name, manufactured by JSR Corporation), and an amorphous polyolefin (e.g., ZEONEX (trade name, manufactured by Nippon Zeon Co., Ltd.)). Among these polymers, preferred are triacetyl cellulose, polyethylene terephthalate, and polyethylene naphthalate. Triacetyl cellulose is particularly preferred.

Triacetylcellulose constitutes a single layer or a plurality of layers. Examples of the monolayer casting for triacetyl cellulose include drum casting and band casting, as disclosed in JP-A-7-11055, and the latter co-casting for triacetyl cellulose composed of plural layers is disclosed, for example, in JP-A-61-94725 and JP-B-62-43846 ("JP-B" means examined Japanese patent publication). The sequential casting may be carried out by repeating the monolayer casting. Each casting is a method involving the following steps. Specifically, a raw material flake is dissolved in a solvent, such as halogenated hydrocarbons (e.g., dichloromethane), alcohols (e.g., methanol, ethanol and butanol), esters (e.g., methyl formate and methyl acetate) and ethers (e.g., dioxane, dioxolan and diethyl ether), to which are then added various additives, such as a plasticizer, an ultraviolet absorber, an anti-deterioration agent, a lubricant and a releasing accelerator, according to the need, to form a solution (that is called as a dope). The dope is cast on a support constituted of a horizontal type endless metal belt or a rotating drum, by a dope supply means (called a die). At this time, a single dope is supplied by monolayer casting in the case of a single layer, whereas a low-concentration dope is co-cast on both sides of a high-concentration cellulose ester dope in the case of plural layers, and the resultant dope is dried on the support to some extent to form a film to which rigidity is imparted. The film is then peeled from the support and allowed to pass through a drying section by various carrier means, to remove the solvent.

Typical examples of the solvent to be used to dissolve triacetyl cellulose include dichloromethane. However, it is preferable to use a solvent not substantially containing a halogenated hydrocarbon such as dichloromethane, in view of environmental safeguard and working circumstance. The term "not substantially contain" means that the proportion of the halogenated hydrocarbon in the organic solvent is less than 5 mass % (preferably less than 2 mass %). When the dope of triacetyl cellulose is prepared by using a solvent which does not substantially contain halogenated hydrocarbon such as dichloromethane and the like, a specific dissolution method as will be described later is essential.

A first dissolution method is called the cooling dissolution method, which will be explained below. First, triacetyl cellulose is gradually added to the solvent with stirring at a temperature (−10 to 40° C.) close to ambient temperature. Then, the mixture is cooled to −100 to −10° C. (preferably −80 to −10° C., more preferably −50 to −20° C. and most preferably −50 to −30° C.). The cooling can be carried out, for example, in a dry ice/methanol bath (−75° C.) or in a cooled diethylene glycol solution (−30 to −20° C.). If the mixture is cooled in this manner, the mixture of the triacetyl cellulose and the solvent is solidified. Further, the cooled mixture is heated to 0 to 200° C. (preferably 0 to 150° C., more preferably 0 to 120° C. and most preferably 0 to 50° C.), thereby forming a solution in which the triacetyl cellulose is fluidized in the solvent. As to the heating, the mixture may be allowed to stand at ambient temperature or heated in a hot bath.

A second dissolution method is called the high-temperature dissolution method, which will be explained below. First, triacetyl cellulose is gradually added to the solvent with stirring at a temperature (−10 to 40° C.) close to ambient temperature. For the triacetyl cellulose solution according to the present invention, it is preferable that triacetyl cellulose is added to a mixed solvent containing various solvents to swell it in advance. In the present method, the concentration of triacetyl cellulose to be dissolved is preferably 30 mass % or less; however, it is preferably as high as possible in view of drying efficiency when the film is formed. Then, the mixed solution of organic solvent is heated to 70 to 240° C. (preferably 80 to 220° C., more preferably 100 to 200° C. and most preferably 100 to 190° C.) under a pressure of 0.2 MPa to 30 MPa. Then, it is necessary to cool the heated solution to the lowest boiling point of the solvents to be used or lower than the temperature in general, because the heated solution cannot be applied as it is. In this case, the heated solution is cooled to −10 to 50° C. and returned to normal pressure in general. The cooling may be carried out by only allowing a high-pressure and high-temperature resistant container or line containing the triacetyl cellulose solution to stand at ambient temperature, or more preferably by cooling the equipment by using a cooling medium such as cooling water. Cellulose acetate film containing substantially no halogenated hydrocarbon such as dichloromethane and the process for the production thereof are described in Japan Institute of Invention and Innovation (JII) Technical Disclosure (Technical Disclosure No. 2001-1745, published on Mar. 15, 2001, hereinafter abbreviated as "Technical Disclosure 2001-1745").

In the case where the antireflection film of the present invention is used in a liquid crystal display device, the film is, for example, provided with an adhesive layer on one side thereof and arranged on the outermost surface of the display. In the case where the transparent support of the antireflection film of the present invention is composed of triacetylcellulose, triacetylcellulose is used as a protective layer (film) for protecting the polarizing layer of the polarizing plate, so that use of the antireflection film of the present invention as it is as a protective film is preferable in view of costs.

In the case where the antireflection film of the present invention is, for example, provided with a (pressure-sensitive) adhesive layer on one side thereof and arranged on the outermost surface of a display or it is used as it is as a protective film for a polarizing plate, it is preferable for achieving sufficient adhesion that an outermost layer mainly composed of a fluorine-containing polymer is formed on a transparent support and then the outermost layer is subjected to a saponification treatment. The saponification treatment can be conducted in a known manner, for example, by immersing the film in an alkali solution for a suitable period of time. After the immersion of the film in an alkali solution, it is preferable that the film is sufficiently washed with water or immersed in a diluted acid to neutralize the alkali component, lest the alkali component should remain in the film.

The saponification treatment provides the hydrophilic surface of the transparent support on the side opposite to that having the outermost layer.

The hydrophilicized surface is particularly useful for improving adhesion with the polarizing film mainly composed of polyvinyl alcohol. Further, the hydrophilicized surface tends to make it difficult for dust in the air to attach thereon, so that the dust tends to fail to enter between the polarizing film and the antireflection film when the surface is bonded to the polarizing film. Thus, the hydrophilicized surface is effective for preventing spot defects due to dust.

The saponification treatment is preferably conducted such that the surface of the transparent support on the side opposite to the side having the outermost layer has a contact angle relative to water of 40° or less, more preferably 30° or less, and particularly preferably 20° or less.

A specific means of alkali saponification may be selected from the following two. (1) described below is excellent in that it is treated in the same step as that for general-purpose triacetylcellulose. However, the problems may arise that the antireflection film surface is also exposed to the saponification treatment so that it is alkali hydrolyzed to deteriorate the film and that the remaining saponification treatment solution, if any, causes dust and/or stain. In these cases, (2) described below, which is a special step, is excellent.

(1) After an antireflection layer is formed on a transparent support, the layer is immersed in an alkali solution at least once, to carry out the saponification treatment of the backside of the film.

(2) Before or after an antireflection layer is formed on a transparent support, an alkali solution is coated on a surface opposite to the surface of the antireflection film on which an antireflection layer is formed, and the film is heated, washed, and/or neutralized, to thereby carry out saponification of only the back side of the film.

The antireflection film of the present invention can be produced by coating respective layers on a transparent support by the following process. However, the present invention is not limited to this process.

First, coating solutions containing components for forming respective layers are prepared. Then, a coating solution for forming a hard coat layer is coated on a transparent support by a dip coating method, an air-knife coating method, a curtain coating method, a roller coating method, a wire-bar coating method, a gravure coating method, e.g., a micro gravure coating method, or an extrusion coating method (See U.S. Pat. No. 2,681,294), followed by being heated and dried. Among these methods, a micro gravure coating method is particularly preferable. Thereafter, light irradiation or heating is performed to polymerize monomers for forming an antiglare hard coat layer and cure the resultant polymer. This results in formation of a hard coat layer.

Here, if necessary, a plurality of hard coat layers are formed and coating and curing of a smooth hard coat layer can be performed in the same manner as described above before the antiglare hard coat layer is coated.

Then, a coating solution for forming a low refractive index layer is coated on the hard coat layer in the same manner as described above, and the obtained coating is irradiated with light or heated, to form a low refractive index layer. Thus, the antireflection film of the present invention is obtained.

The micro gravure coating method that can be used in the present invention is a coating method which is featured by including: providing below a support a gravure roll having a diameter of about 10 to about 100 mm, preferably about 20 to about 50 mm imprinted with a gravure pattern over the entire periphery; rotating the gravure roll in a reverse direction with respect to the direction of transferring the support; and scraping an excessive coating solution off from the surface of the gravure roll with a doctor blade, to transfer a fixed amount of the coating solution on the lower surface of the support at a position where the upper surface of the above-mentioned support is in a free state, thereby conducting coating. Thus, the transparent support in the form of a roll is continuously rewound and at least one layer from among at least a hard coat layer and a low refractive index layer containing a fluorine-containing polymer can be coated on one side of the rewound support by the micro gravure coating method.

The coating conditions for the micro gravure coating method are as follows. The line number of a gravure pattern impressed on a gravure roll is preferably 50 to 800 lines/inch and more preferably 100 to 300 lines/inch. The depth of the gravure pattern is preferably 1 to 600 μm and more preferably 5 to 200 μm. The rotation number of the gravure roll is preferably 3 to 800 rpm and more preferably 5 to 200 rpm. The conveying speed of the support is preferably 0.5 to 100 m/minute and more preferably 1 to 50 m/minute.

The antireflection film of the present invention thus formed has a haze value in the range of preferably 3 to 60%, more preferably 3 to 50%, further preferably 4 to 45%, and an average reflectivity for light having a wavelength of 450 nm to 650 nm is preferably 3.0% or less, more preferably 2.2% or less and further preferably 1.9% or less.

Due to the haze value and average reflectivity of the antireflection film of the present invention being in the above-mentioned ranges, respectively, satisfactory antiglare property and antireflection property can be obtained without deterioration of the transmission image.

The polarizing plate is mainly constituted by two protective films sandwiching the polarizing film on both sides thereof. It is preferred that the antireflection film of the present invention is used as at least one of the two protective films that sandwich the polarizing film on both ends thereof. Since the antireflection film of the present invention also serves as a protective film, the production cost of the polarizing plate can be decreased. Further, use of the antireflection film of the present invention as the outermost layer prevents mirroring of external light or the like and can provide a polarizing plate having excellent scratch resistance and excellent resistance to dust and stain.

As the polarizing film, known polarizing films and those polarizing films cut out from a continuous polarizing film whose absorption axis is neither parallel nor perpendicular to the longitudinal direction thereof may also be used. Continuous polarizing films whose absorption axis is neither parallel nor perpendicular to the longitudinal direction thereof can be fabricated, for example, by the following method.

That is, such films can be produced by a stretching method: in which a polarizing film obtained by stretching a continuously supplied polymer film by applying tension thereto while holding both two side ends of the film with each holding device, is stretched at least 1.1 to 20.0 times in the direction of the width of the film, at a speed difference between both ends of the film in the longitudinal direction of the holding device of 3% or less, with bending the direction of advancing the film in a state where both ends of the film are held, so that the direction of advancing the film at the exit of the step of holding both ends of the film is inclined with respect to the direction in which the film is substantially stretched at an angle of 20 to 70°.

The stretching method for a deflecting (polarizing) film will be described with reference to FIG. 2.

Such a stretching method for a polarizing film includes: a step shown by (a) of introducing a raw film, for example, a polyvinyl alcohol polymer film, in the direction shown by the arrow (Y); a step shown by (b) of stretching the film in the transverse direction (width-wise direction) of the film; and a step shown by (c) of advancing the stretched film to a subsequent step, i.e., in the direction shown by the arrow (Z). Hereinafter, by the term "stretching step" is meant the entire process for performing the stretching method including the steps (a) to (c).

The film is continuously introduced in the direction (Y), one side end of which is held for the first time at the point B1 by a holding means 29 located on the left hand side as seen from the upstream side. At this point in time, another film side end is not held yet, so that no tension is generated in the width-wise direction. That is, the point B1 does not amount to a point at which substantial holding starts (hereinafter, referred to as "substantial holding start point").

The substantial holding start point is defined by a point at which both side ends of the film are first held. Two points indicate substantial holding starting points. These points are a holding start point A1, at which holding by a holding means 30 starts, and a point C1, which is a point at which a line drawn from the point A1 to a center line 21 of a film 25 on the introduction side substantially perpendicularly thereto crosses a trajectory 23 of a holding means on the opposite side.

Starting from these points as starting points, holding means at both side ends of the film are conveyed at substantially the same speed. Then, A1 shifts to A2, A3, ..., An and C1 likewise shifts to C2, C3, ..., Cn, for each unit time. In other words, a line connecting the points An and Cn that the holding means, which are references, pass in the same point in time makes the stretching direction at that point in time.

Figure 2:
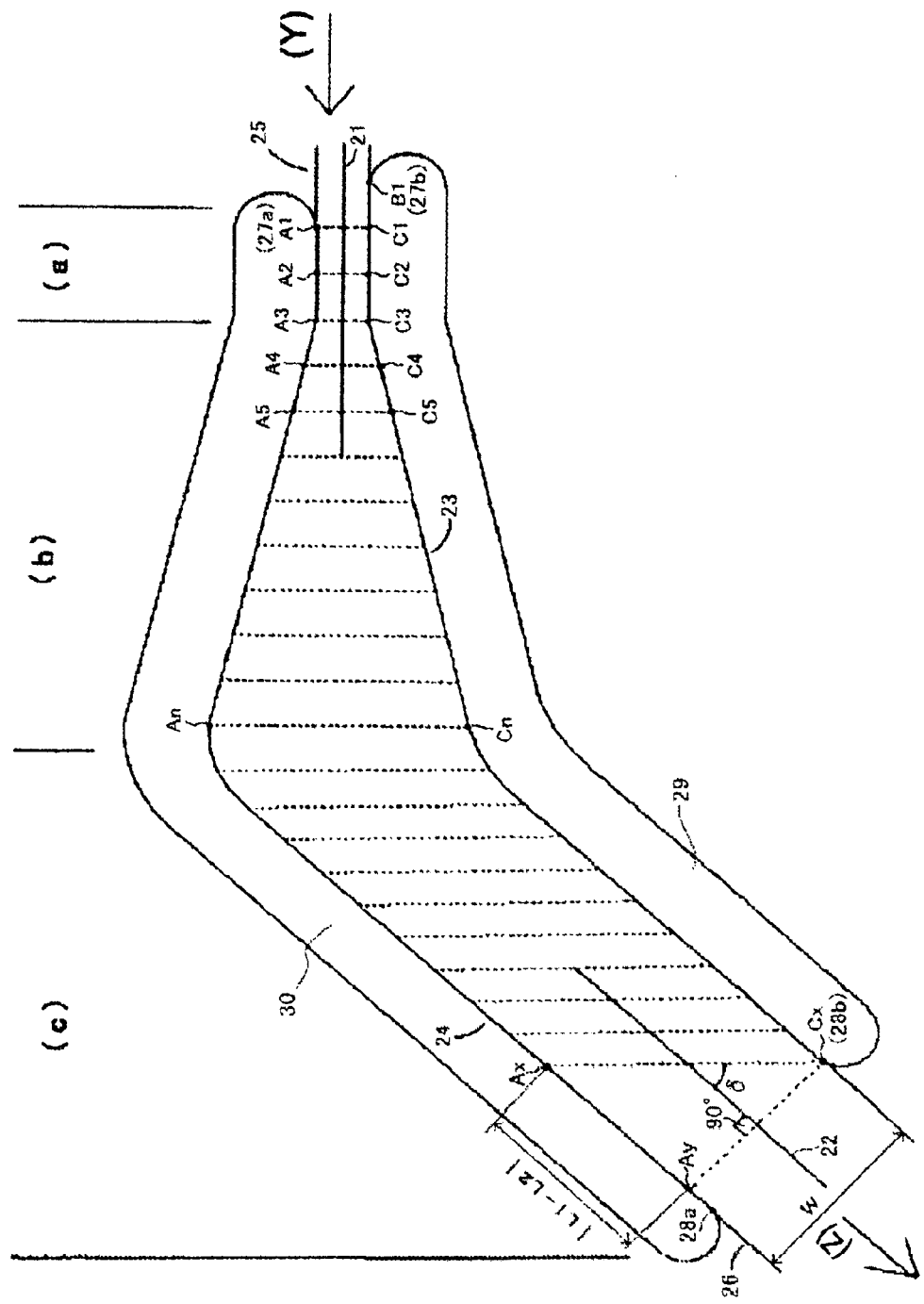
FIG. 2 is a schematic diagram showing a tenter stretching machine used in Examples 3 and 13.

In this method, as shown in FIG. 2, An is being gradually delayed as compared with Cn, resulting in gradual inclination of the stretching direction from the direction perpendicular to the transportation direction. Points at which holding of the film ends is substantially released (hereinafter, referred to as "substantial holding release points") are defined by two points, i.e., a point Cx, at which one film end leaves the holding means in more upstream, and a point Ay, at which a line drawn from the point Cx to a center line 22 of the film 26 to be sent to a subsequent step substantially perpendicular thereto crosses a trajectory 24 of holding means on the opposite side.

A final angle of the stretching direction of the film is determined by the ratio of a distance between Ay and Ax, which is a difference between path lengths of both holding means at an end point of substantial stretching step (substantial holding release points) and a distance W (distance between Cx and Ay) between the substantial holding release points. Therefore, an inclination angle δ that is formed between the stretching direction and the direction of transportation (film conveying direction) to a subsequent step is an angle that satisfies the following equation:

$$\tan \delta = W/(\text{distance between } Ay \text{ and } Ax), \text{ i.e.,}$$

$$\tan \delta = W/|L1-L2|$$

wherein L1 is the length of the trajectory of one holding means from the substantial holding start point to the substantial holding release point of one end of the film, and L2 is the length of the trajectory of the another holding means from the substantial holding start point to the substantial holding release point of the other end of the film.

The film end on the upper side of FIG. 2 is held up to a point 28a even after the point Ay, but the other end is not held so that no new stretching occurs in the width-wise direction. Hence the point 28a is not a substantial holding release point.

In other words with respect to some portions of the above explanation, in FIG. 2, A1 is a point, which is an intermeshing point of one holding means (30) for the film, and which is also a starting point for stretching the film (the substantial holding start point: right side). B1 is an intermeshing point (left side) of the other holding means (29) for the film, and C1 is a starting point for stretching the film (the substantial holding start point: left side). Cx is a point, at which the film is released, and which is a reference point for ending of the film stretching (the substantial holding release point: left side). Ay is a reference point for ending of the film stretching (the substantial holding release point: right side). W is a substantial width of the film at the end of the stretching process. 23 is a trajectory (left side) of one holding means (29), and 24 is a trajectory (right side) of the other holding means (30). 27a is a film-holding (intermeshing) start point of the right side of the film, and 27b is a film-holding (intermeshing) start point of the left side of the film. 28a is a releasing point from one holding means (30) of the right side of the film, and 28b is a releasing point from the other holding means (29) of the left side of the film.

As described above, the substantial holding start points at both ends of the film are not mere engagement (intermeshing) points with the respective two holding means. To strictly stating what is defined above, the two substantial holding start points are defined as points at which a line connecting any one of two holding points and the other point crosses a center line of a film to be introduced into the step of holding the film substantially perpendicularly thereto, and these two holding points are defined as located most upstream.

Similarly, the two substantial holding release points are defined as points at which a line connecting any one of the two holding points and the other holding point crosses a center line of a film to be sent to a subsequent step substantially perpendicularly thereto, and these two holding points are defined as located most downstream.

Here, by the term "crosses substantially perpendicularly" is meant that the center line of the film and a line connecting the two substantial holding start points or the two substantial holding release points are at an angle of 90±0.50° relative to each other.

In the case where it is attempted to make a difference in path length between the right-side and the left-side holding means by use of a stretching machine of the tenter type, it is sometimes the case that there occurs a great shift between the engagement points with the holding means and substantial holding start points or between the leaving points from the holding means and the substantial holding release points, due to mechanical constraints such as the length of rail. However, in the present invention, it is preferable that the step between the substantial holding start points and the substantial holding release points, which are defined as above, should satisfy the relationship expressed by the following formula (1) below:

$$|L2-L1|>0.4W \qquad \text{Formula (1)}$$

wherein L1, L2 and W have the same meanings as defined above.

In the above-mentioned explanation, the inclination angle of the orientation axis of the obtained stretched film can be controlled and adjusted by the ratio between the width at the exit of the step (c), W, and the absolute value of the difference in path length between the two substantial film-holding means, |L1−L2|.

To obtain an orientation angle close to 45° with respect to the longitudinal direction, it is preferable that the following formula (2) is satisfied:

$$0.9W<|L1-L2|<1.1W \qquad \text{Formula (2)}$$

More preferably, it is preferable that the following formula (3) is satisfied:

$$0.97W<|L1-L2|<1.03W \qquad \text{Formula (3)}$$

The angle formed between the film introduction direction (Y) to the stretching step and the film transportation direction to a subsequent step (Z) may assume any desired value, but from the viewpoint of minimizing the total installation area for the appliance including the steps before and after the stretching, the smaller this angle is, the better the results are. The angle is preferably 3° or less, more preferably 0.5° or less. The stretch ratio is preferably 1.1 to 10.0 times, more preferably 2 to 10 times, and the shrinkage ratio thereafter is preferably 10% or more.

Furthermore, from the viewpoint of minimizing the costs of production facilities for the stretching step, the smaller the number of bending of the trajectory of holding means and the angle of bending, the more preferable the results. From this viewpoint, it is preferable that the direction of advancing the film is bent in a state, in which both side-ends of the film are held, such that the direction of advancing the film at the exit of the step of holding both ends of the film is inclined at an angle of 20 to 70°, with respect to the direction of substantial stretching of the film, as exemplified in FIG. 2. In particular, a stretching method in which such an angle of inclination is at 45° (±0°) is preferable.

In the case of a stretching machine of the tenter type, many of structures thereof involve a chain to which a clip is fixed advancing along a rail. However, if a laterally asymmetric stretching method is adopted as in the present invention, it may eventually result as shown in FIG. 2. that the terminals of the rails become misaligned at the reflection and exit of the step and neither simultaneous engagement nor simultaneous leaving on both sides takes place. In this case, substantial path length L1 and L2 are not simple distances between the engagement and the leaving as described above, but as already described above, are strictly the path lengths of the portions of both ends of the film held by the holding means.

If there is a difference in the speed of advancement of the film between both sides of the film at the exit of the stretching step, wrinkles and slippage will occur at the exit of the stretching step. Therefore, film transportation speeds of both means for grabbing the film are required to be substantially the same. The difference in film transportation speed is preferably 1% or less, more preferably less than 0.5% and most preferably less than 0.05%. By the term speed as used herein is meant the length of the trajectory along which each of the lateral holding means advances per minute. In a general stretching machine, for example, of the tenter type, there occurs unevenness in speed on the order of second or less, depending on the pitch of the teeth of the sprocket that drives the chain, the frequency of the driving motor and so forth. It is often the case that an unevenness of several percent occurs. However, such unevenness does not correspond to a difference in speed referred to herein.

Further, as a difference occurs in the length of path between the lateral sides, there occur wrinkles, slippage, and fluctuation in the axis of stretching in the film. To solve this problem, stretching of a polymer film is carried out with maintaining the supporting property of the polymer film, and allowing a state in which the volatile content is 10% or more to exist, and then the polymer film is shrunk to lower the volatile content. By the term volatile content is meant the volume of the volatile component contained in unit volume of the film, and it is a value obtained by dividing the volume of the volatile component(S) by the volume of the film. The method of introducing the volatile component into the film includes: casting a film and allowing the film to contain a solvent or water; immersing a film in a solvent or water or coating or spraying a solvent or water onto a film before the film is stretched; coating a solvent or water onto a film during stretching the film; and so forth. The polyvinyl alcohol polymer film contains water under a high temperature and high humidity atmosphere, so that stretching the film, after moisture conditioning it in a high humidity atmosphere, or under a high humidity condition, can make the polymer contain the volatile component. Besides these methods, any means may be used so far as it can achieve a volatile content of the polymer film of 10% or more.

A preferable volatile content in the case of polyvinyl alcohol is 10 to 100%.

The shrinking of the stretched polymer film may be performed at any one of the step of stretching and steps after the stretching. It is sufficient that shrinking obviates wrinkles of the polymer film occurring at the time of orienting in an oblique direction or the fluctuation of the axis of stretching. The means for shrinking the film includes removal of the volatile component by heating. However, any means may be used so far as it can shrink the film. A preferred shrinkage ratio of the film is $1/(\sin \delta)$ time or more, in which $\delta$ is an orientation angle relative to the longitudinal direction, and it is preferable to shrink in 10% or more in numerical value.

It is sufficient that the wrinkles of the polymer film occurring at the time of orienting in an oblique direction should disappear until the substantial holding release point is reached. However, if it takes time from the occurrence to disappearance of the wrinkles, fluctuation in the stretching direction may occur so that it is desirable that wrinkles disappear in as small as possible a transfer distance from the point at which the wrinkles have occurred. To this end, there is conceivable a method in which the evaporation rate of the volatile component is made higher or the like method.

In the case where a continuous polarizing film, in particular, in the roll form is serially made from start to finish, it is necessary that there should occur no unevenness or dropout in dyeing. Unevenness in the distribution of the volatile component in the film before stretching (a difference in the amount of the volatile component depending on the position in the film surface), if any, causes unevenness or dropouts in dyeing. Therefore, the film before stretching preferably has a small volatile content distribution (volatile fraction distribution). The volatile content distribution is more preferably at most 5%. Volatile content refers to the volume of the volatile component contained in unit volume of the film, and it is a value obtained by dividing the volume of the volatile component by the volume of the film. By the term volatile content distribution is meant a fluctuation width of the volatile content per $m^2$ (a ratio of greater one of a difference between a maximum volatile content and an average volatile content and a difference between a minimum volatile content and the average volatile content). The method of decreasing the volatile content distribution of the film includes uniformly blowing air onto both surfaces of the film, uniformly squeezing with a nip roller, wiping with a wiper, and so forth. However, any method may be used so far as the distribution becomes uniform thereby.

The antireflection film of the present invention, and the polarizing plate of the present invention with the antireflection film arranged such that the low-refractive-index layer thereof is laid outermost, can be applied to display devices, for example, liquid crystal display devices (LCD), plasma display panels (PDP), electroluminescence displays (ELD), and image displaying devices such as cathode ray tube display devices (CRT). The antireflection film of the present invention has a transparent support, so that the film can be used by bonding the transparent support side to the image-displaying surface of the image displaying devices. The polarizing plate of the present invention can be used by bonding it on the display surface such that the low-refractive-index layer becomes the outermost surface of the displaying device.

When using at one side of a surface protective film of a polarizing film, the antireflection film of the present invention can be used preferably in liquid crystal display devices of the transmission, reflection or semi-transmission type in various modes such as twisted nematic (TN), super twisted nematic (STN), vertical alignment (VA), in-plane switching (IPS), optically compensated bend cell (OCB), and electrically controlled birefringence (ECB) modes.

Examples of VA-mode liquid crystal cells include: (1) a VA-mode liquid crystal cell in a strict sense, in which rod-shaped liquid crystal molecules are oriented substantially vertically when no voltage is applied and are oriented substantially horizontally when a voltage is applied (as described in JP-A-2-176625); (2) an (MVA-mode) liquid crystal cell that has a multi-domain VA mode, for broadening the view angle (SID97, Digest of tech. Papers (Lecture Preprints) 28 (1997) p. 845); (3) a liquid crystal cell (of an n-ASM mode), in which rod-shaped liquid crystal molecules are oriented substantially vertically when no voltage is applied and are oriented in a twisted multi-domain mode when a voltage is applied (cf. Japan Liquid Crystal Forum, Lecture Preprints, p. 58–59 (1998)); and (4) a survival mode liquid crystal cell (as presented in LCD International 98).

The OCB-mode liquid crystal cell is a liquid crystal display device with a bend orientation mode liquid crystal cell in which rod-shaped liquid crystal molecules are oriented substantially in opposite directions (symmetrically) in the upper and lower parts of the liquid crystal cell. Such devices are disclosed in U.S. Pat. Nos. 4,583,825 and 5,410,422. Since the rod-shaped liquid crystal molecules are oriented symmetrically in the upper and lower parts of the liquid crystal cell, the bend orientation mode liquid crystal cell has an optical self-compensation function. As a result, this liquid crystal mode is also called OCB (Optically Compensatory Bend) liquid crystal mode. The liquid crystal display device of the bend orientation mode has an advantage of high response speed.

The ECB mode liquid crystal cells, in which rod-shaped liquid crystal molecules are oriented substantially horizontally when no voltage is applied, are used mostly in color TFT liquid crystal display devices, as described in many literatures. They are described in, for example, "EL, PDP, LCD Displays" published by Toray Research Center (2001).

In particular, for TN-mode or IPS-mode liquid crystal display devices, a polarizing plate having both antireflection effect and view-angle broadening effect with the thickness of a single polarizing plate can be provided, by using an optically compensatory film having the effect of broadening the view angle as one of the two protective films for the polarizing film that is present on the side opposite to that of the antireflection film of the present invention, as described in JP-A-2001-100043 and so forth. Such a polarizing plate is particularly preferred.

The hardening (curable) composition of the present invention can form a hardened coating film excellent in transparency and adhesion property.

The antireflection film of the present invention that can be prepared, for example, from the above-mentioned composition has sufficient antireflection performance, and dust-proofing and stain-proofing properties as well as excellent scratch resistance. Further, the method for producing the antireflection film according to the present invention enables production of the above-mentioned antireflection film with a high productivity with stability.

Furthermore, the polarizing plate and display device of the present invention in which such an antireflection film is used, have sufficient antireflection performances and excellent visibilities.

Further, the hardened film of the present invention is excellent in transparency and adhesion property.

The present invention will be described in more detail based on the following examples, but the present invention is not limited thereto.

EXAMPLES (Synthesis of Perfluoroolefin Copolymer (1))

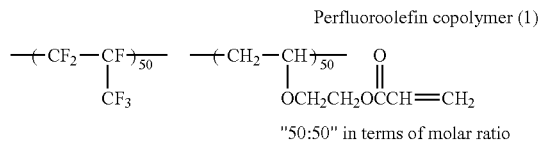

Perfluoroolefin copolymer (1)

"50:50" in terms of molar ratio

In an autoclave, whose inner volume was 100 ml, equipped with a stainless steel stirrer, ethyl acetate (40 ml), hydroxyethyl vinyl ether (14.7 g), and dilauroyl peroxide (0.55 g) were placed. The interior of autoclave was degassed and substituted with a nitrogen gas. Further, hexafluoropropylene (HFP) (25 g) was introduced into the autoclave and heated up to 65° C. The pressure at the time when the inner temperature of the autoclave was elevated to 65° C. was 5.4 kg/cm². After continuation of reaction for 8 hours while keeping 65° C., heating was stopped at the time when the pressure was reduced to 3.2 kg/cm², so that the inner temperature was allowed to fall. Then, at the time when the inner temperature fell to room temperature, remaining unreacted monomers were expelled, and then the autoclave was opened, to take out the reaction solution from there. The resultant reaction solution was poured into a very excessive amount of hexane. The solvent was removed by decantation, to take out a precipitated polymer. Then, this polymer was dissolved into a small amount of ethyl acetate and reprecipitated from hexane two times, so as to remove remaining monomers completely. After the resultant reprecipitation was dried, 28 g of a polymer was yielded. Then, 20 g of the polymer was dissolved into 100 mL of N,N-dimethylacetoamide, and then 11.4 g of acrylic acid chloride was dropwise added to the solution while the solution was cooled with ice. Thereafter, the resultant solution was stirred at room temperature for 10 hours. Ethyl acetate was added to the reaction solution, and the resultant solution was washed with water. The organic phase was extracted and concentrated. The resultant polymer was reprecipitated from hexane, to yield 19 g of Perfluoroolefin copolymer (1). The refractive index of the thus-obtained polymer was 1.421.

(Synthesis of Perfluoroolefin Copolymer (2))

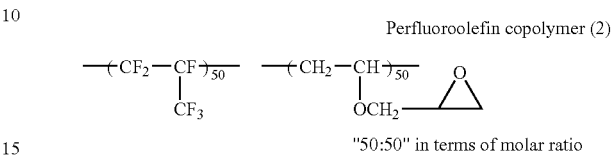

Perfluoroolefin copolymer (2)

"50:50" in terms of molar ratio

In an autoclave, whose inner volume was 100 ml, equipped with a stainless steel stirrer, ethyl acetate (30 ml), glycidyl vinyl ether (11.5 g), and dilauroyl peroxide (0.42 g) were placed. The interior of autoclave was degassed and substituted with a nitrogen gas. Further, hexafluoropropylene (HFP) (21 g) was introduced into the autoclave and heated up to 65° C. The pressure at the time when the inner temperature of the autoclave was elevated to 65° C. was 6.2 kg/cm². After continuation of reaction for 8 hours while keeping 65° C., heating was stopped at the time when the pressure was reduced to 3.6 kg/cm², so that the inner temperature was allowed to fall. Then, at the time when the inner temperature fell to room temperature, remaining unreacted monomers were expelled, and then the autoclave was opened, to take out the reaction solution from there. The resultant reaction solution was poured into a very excessive amount of hexane. The solvent was removed by decantation, to take out a precipitated polymer. Then, this polymer was dissolved into a small amount of ethyl acetate and reprecipitated from hexane two times, so as to remove remaining monomers completely. After the resultant reprecipitation was dried, to give 21 g Perfluoroolefin copolymer (2). The refractive index of the thus-obtained polymer was 1.424.

(Preparation of Sol Solution a-1)

In a reactor equipped with a stirrer and a reflux condenser, 161 mass parts of 3-acryloyloxypropyltrimethoxysilane (KBM 5103 (trade name), manufactured by Shin-Etsu Chemical Co., Ltd.), 123 mass parts of oxalic acid, and 415 mass parts of ethanol were charged, mixed and allowed to react at 70° C. for 4 hours. Thereafter, the reaction mixture was cooled to room temperature, to obtain a transparent sol solution a-1 as a curable composition of the present invention. This had a mass average molecular weight of 1,600. Of the components consisting oligomers or higher components (polymers), those components each having a molecular weight of 1,000 to 20,000 accounted for 100%. Further, gas chromatographic analysis of the product revealed that there remained therein no 3-acryloyloxypropyltrimethoxysilane that was used as a raw material.

(Preparation of Sol Solution a-2)

In a reactor equipped with a stirrer and a reflux condenser, 29.5 mass parts of 3-acryloyloxypropyltrimethoxysilane, 62.5 mass parts of ethanol, 3.4 mass parts of ion-exchanged water, and 3 mass parts of 2 mol/l hydrochloric acid were charged, mixed and allowed to react at 40° C. for 3 hours. Thereafter, the reaction mixture was cooled to room temperature, and 30 mass parts of ethanol was added thereto, to obtain a transparent sol solution a-2 as a curable composition of the present invention. This had a mass average molecular weight of 1,300. Of the components consisting oligomers or higher components (polymers), those components each having a molecular weight of 1,000 to 20,000 accounted for 100%. Further, gas chromatographic analysis of the product revealed that there remained therein no 3-acryloyloxypropyltrimethoxysilane that was used as a raw material.

(Preparation of Sol Solution a-3)

In a reactor equipped with a stirrer and a reflux condenser, 29.5 mass parts of 3-methacryloyloxypropyltrimethoxysilane, 62.5 mass parts of methyl ethyl ketone (MEK), 6.3 mass parts of ion-exchanged water, and 6 mass parts of 2 mol/l hydrochloric acid were charged, mixed and allowed to react at 40° C. for 3 hours. Thereafter, the reaction mixture was cooled to room temperature, and 24 mass parts of MEK was added thereto, to obtain a transparent sol solution a-3 as a curable composition of the present invention. This had a mass average molecular weight of 1,100. Of the components consisting oligomers or higher components (polymers), those components each having a molecular weight of 1,000 to 20,000 accounted for 100%. Further, gas chromatographic analysis of the product revealed that there remained therein no 3-methacryloyloxypropyltrimethoxysilane that was used as a raw material.

(Preparation of Sol Solution a-4)

By the same procedures as in the preparation of the organosilane sol composition a-2, except that 29.5 mass parts of 3-acryloyloxypropyltrimethoxysilane was replaced by a mixture of 19.5 mass parts of 3-acryloyloxypropyltrimethoxysilane and 10.0 mass parts of 3-glycidoxypropyltrimethoxysilane, a transparent sol solution a-4 was obtained as a curable composition of the present invention. This had a mass average molecular weight of 1,400. Of the components consisting oligomers or higher components (polymers), those components having a molecular weight of 1,000 to 20,000 accounted for 100%. Further, gas chromatographic analysis of the product revealed that there remained therein no organosilane that was used as a raw material.

(Preparation of Sol Solution a-5)

In a reactor equipped with a stirrer and a reflux condenser, 161 mass parts of 3-methacryloyloxypropyltrimethoxysilane, 80 mass parts of oxalic acid, and 415 mass parts of ethanol were charged, mixed and allowed to react at 70° C. for 4 hours. Thereafter, the reaction mixture was cooled to room temperature, and 43 mass parts of ethanol was added thereto, to obtain a transparent sol solution a-5 as a curable composition of the present invention. This had a mass average molecular weight of 1,400. Of the components consisting oligomers or higher components (polymers), those components each having a molecular weight of 1,000 to 20,000 accounted for 100%. Further, gas chromatographic analysis of the product revealed that there remained therein no 3-methacryloyloxypropyltrimethoxysilane that was used as a raw material.

(Preparation of Sol Solution a-6)

In the same manner as in the preparation of the sol solution a-5, except that oxalic acid was replaced by malonic acid, a transparent sol solution a-6 was obtained as a curable composition of the present invention. This had a mass average molecular weight of 1,300. Of the components consisting oligomers or higher components (polymers), those components having a molecular weight of 1,000 to 20,000 accounted for 100%. Further, gas chromatographic analysis of the product revealed that there remained therein no 3-methacryloyloxypropyltrimethoxysilane that was used as a raw material.

(Preparation of Sol Solution a-7)

In the same manner as in the preparation of the sol solution a-1, except that 161 mass parts of 3-acryloyloxypropyltrimethoxysilane was replaced by 46 mass parts of 3-methacryloyloxypropyltrimethoxysilane and 115 mass parts of 3-acetoxypropyltrimethoxysilane, a transparent sol solution a-7 was obtained as a curable composition of the present invention. This had a mass average molecular weight of 1,300. Of the components consisting oligomers or higher components (polymers), those components having a molecular weight of 1,000 to 20,000 accounted for 100%. Further, gas chromatographic analysis of the product revealed that there remained therein neither 3-methacryloyloxypropyltrimethoxysilane nor 3-acetoxypropyltrimethoxysilane that were used as raw materials.

(Preparation of Sol Solution a-8)

In a reactor equipped with a stirrer and a reflux condenser, 29.5 mass parts of 3-acryloyloxypropyltrimethoxysilane, 62.5 mass parts of methyl ethyl ketone (MEK), 6.3 mass parts of ion-exchanged water, and 6 mass parts of 2 mol/l hydrochloric-acid were charged, mixed and allowed to react at 40° C. for 3 hours. Thereafter, the reaction mixture was cooled to room temperature, and 24 mass parts of MEK was added thereto, to obtain a transparent sol solution a-8 as a curable composition of the present invention. This had a mass average molecular weight of 1,100. Of the components consisting oligomers or higher components (polymers), those components each having a molecular weight of 1,000 to 20,000 accounted for 100%. Further, gas chromatographic analysis of the product revealed that there remained therein no 3-acryloyloxypropyltrimethoxysilane that was used as a raw material.

(Preparation of Sol Solution b-1)

In the same manner as in the preparation of the sol solution a-1, except that 3-acryloyloxypropyltrimethoxysilane was replaced by methyltrimethoxysilane, a white cloudy sol solution b-1 that contained a gel portion was obtained. Since this contained a gel portion, GPC analysis could not be performed.

(Preparation of Sol Solution b-2)

In the same manner as in the preparation of the sol solution a-1, except that 3-acryloyloxypropyltrimethoxysilane was replaced by 3-acetoxypropyltrimethoxysilane, a transparent sol solution b-2 was obtained. This had a mass average molecular weight of 1,400. Of the components consisting oligomers or higher components (polymers), those components each having a molecular weight of 1,000 to 20,000 accounted for 100%. Further, gas chromatographic analysis of the product revealed that there remained therein no 3-acetoxypropyltrimethoxysilane that was used as a raw material.

(Preparation of Sol Solution c-1)

In a reactor equipped with a stirrer and a reflux condenser, 100 mass parts of 3-acryloyloxypropyltrimethoxysilane, 6 mass parts of diisopropoxyaluminum ethyl acetoacetate and 12 mass parts of i-propanol were charged and mixed. Then, 30 mass parts of ion-exchanged water was added thereto, and the mixture was allowed to react at 60° C. for 4 hours. Thereafter, the reaction mixture was cooled to room temperature, and 6 mass parts of acetylacetone was added thereto, to obtain a sol solution c-1.

(Preparation of Sol Solution c-2)

In the same manner as in the preparation of the sol solution c-1, except that 3-acryloyloxypropyltrimethoxysilane was replaced by 3-glycidoxypropyltrimethoxysilane, a sol solution c-2 was obtained.

(Preparation of Sol Solution c-3)

In the same manner as in the preparation of the sol solution c-1, except that 3-acryloyloxypropyltrimethoxysilane was replaced by 3-methacryloyloxypropyltrimethoxysilane, a sol solution c-3 was obtained.

(Preparation of Coating Solution A For a Hardcoat Layer)

150 g of a mixture of dipentaerythritol pentaacrylate and dipentaerythritol hexaacrylate (trade name: DPHA, manufactured by Nippon Kayaku Co., Ltd.) was dissolved in 206 g of a mixed solvent of methyl ethyl ketone/cyclohexanone (50/50%). To the resulting solution, was added a solution obtained by dissolving 333 g of a dispersion of 30% silica sol in methyl ethyl ketone (MEK-ST, trade name, manufactured by Nissan Chemical Industries, Ltd., average particle diameter 15 nm) 7.5 g of a photopolymerization initiator (trade name: Irgacure 907, manufacture by Ciba Geigy Co.) and 5.0 g of a photosensitizer (trade name: KAYACURE DETX, manufactured by Nippon Kayaku Co., Ltd.) in 49 g of methyl ethyl ketone.

(Preparation of Coating Solution B for a Hard Coat Layer)

347 g of a commercially available silica-containing UV curing type hard coat solution (DeSolite Z7526 (trade name, manufactured by JSR Corporation), having a solid content of 72%, a silica content of 38% and an average particle diameter of about 20 nm) was diluted with 403 g of a mixed solvent of methyl ethyl ketone/cyclohexanone=50/50(%).

(Preparation of Coating Solution C for a Hard Coat Layer)

500 g of a commercially available alumina-containing UV curing type hard coat solution (DeSolite Z7526 (trade name, manufactured by JSR Corporation) of which the inorganic fine-particles contained were modified, having a solid content of 50%, an alumina content of 50% and an average particle diameter of about 20 nm) was diluted with 250 g of a mixed solvent of methyl ethyl ketone/cyclohexanone=50/50(%).

(Preparation of Coating Solution D for a Hardcoat Layer)

250 g of a mixture of dipentaerythritol pentaacrylate and dipentaerythritol hexaacrylate (trade name: DPHA, manufactured by Nippon Kayaku Co., Ltd.) was dissolved in 439 g of a mixed solvent of methyl ethyl ketone/cyclohexanone (50/50%). To the resulting solution, was added a solution obtained by dissolving 7.5 g of a photopolymerization initiator (trade name: Irgacure 907, manufacture by Ciba Geigy Co.) and 5.0 g of a photosensitizer (trade name: KAYACURE DETX, manufactured by Nippon Kayaku Co., Ltd.) in 49 g of methyl ethyl ketone.

(Preparation of Coating Solution E for a Hard Coat Layer)

To 450 g of a commercially available silica-containing UV curing type hard coat solution (DeSolite Z7526 (trade name, manufactured by JSR corporation) having a solid content of 72%, a silica content of 38% and an average particle diameter of about 20 nm), was added 36 g of a-1. The resultant solution was diluted with 264 g of a mixed solvent of methyl ethyl ketone/cyclohexanone=50/50(%).

(Preparation of Coating Solution F for a Hard Coat Layer)

To 375 g of a commercially available alumina-containing UV curing type hard coat solution (DeSolite Z7526 (trade name, manufactured by JSR Corporation) of which the inorganic fine-particles contained were modified, having a solid content of 50%, an alumina content of 50% and an average particle diameter of about 20 nm), was added 47 g of a-1. The resultant solution was diluted with 328 g of a mixed solvent of methyl ethyl ketone/cyclohexanone=50/50 (%).

(Preparation of Coating Solution G for a Hard Coat Layer)

135 g of a mixture of dipentaerythritol pentaacrylate and dipentaerythritol hexaacrylate (DPHA, manufactured by Nippon Kayaku Co., Ltd.) was dissolved in 196 g of a mixed solvent of methyl ethyl ketone/cyclohexanone=50/50(%). To the obtained solution, were added 300 g of a dispersion of 30% silica sol in methyl ethyl ketone (MEK-ST, trade name, manufactured by Nissan Chemical Industries, Ltd., average particle diameter 15 nm) and 25 g of a-1. Then, was added thereto, a solution of 7.5 g of a photopolymerization initiator (Irgacure 907 (trade name), manufactured by Ciba-Geigy) and 5.0 g of a photosensitizer (Kayacure-DETX, manufactured by Nippon Kayaku Co., Ltd.) dissolved in 82 g of methyl ethyl ketone.

(Preparation of Coating Solution A for an Antiglare Hard Coat Layer)

278 g of a commercially available zirconia-containing UV curing type hard coat solution (DeSolite Z7401, trade name, manufactured by JSR Corporation, having a solid content of 48%, a zirconia content of 71% and an average particle diameter of about 20 nm), 117 g of a mixture of dipentaerythritol pentaacrylate and dipentaerythritol hexaacrylate (DPHA, manufactured by Nippon Kayaku Co., Ltd.), and 7.5 g of a photopolymerization initiator (Irgacure 907 (trade name), Ciba-Geigy) were diluted with 355 g of a mixed solvent of methyl ethyl ketone/cyclohexanone=50/50(%). This solution was coated on a substrate and cured with UV irradiation, to obtain a coating having a refractive index of 1.61.

To this solution, was further added 10 g of crosslinkable polystyrene particles (trade name: SX-200H, manufactured by Soken Chemical & Engineering Co., Ltd.) having an average particle diameter of 2 μm, and the mixture was stirred for one hour using a high speed disperser at 5000 rpm to disperse, followed by filtration using a polypropylene filter having a pore diameter of 30 μm, to prepare Coating Solution A for an anti-glare hardcoat layer.

(Preparation of Coating Solution B for an Antiglare Hard Coat Layer)

521 g of a commercially available zirconia-containing UV curing type hard coat solution (DeSolite Z7401, manufactured by JSR Corporation, having a solid content of 48%, a zirconia content of 71% and an average particle diameter of about 20 nm), and 7.5 g of a photopolymerization initiator (Irgacure 907 (trade name), Ciba-Geigy) were diluted with 229 g of a mixed solvent of methyl ethyl ketone/cyclohexanone=50/50(%). This solution was coated on a substrate and cured with UV irradiation, to obtain a coating having a refractive index of 1.73.

To this solution, was further added 10 g of benzoguanamine-formaldehyde resin particles having an average particle diameter of 2 μm (trade name: Epostar MS, manufactured by Nippon Shokubai Co., Ltd.), and the mixture was stirred in a high speed Disper at 5,000 rpm for 1 hour. After the dispersion, the resultant dispersion was filtered through a polypropylene filter having a pore diameter of 30 μm, to prepare Coating solution B for an antiglare hard coat layer.

(Preparation of Coating Solution C for an Antiglare Hard Coat Layer)

75 g of a mixture of dipentaerythritol pentaacrylate and dipentaerythritol hexaacrylate (DPHA, manufactured by Nippon Kayaku Co., Ltd.), 75 g of bis(4-methacryloylthiophenyl)sulfide (MPSMA, trade name, manufactured by Sumitomo Seika Chemicals Co., Ltd.), and 100 g of alumina particles having an average particle diameter of 33 nm (manufactured by C.I. Kasei Co., Ltd.) were dissolved in 439 g of a mixed solvent of methyl ethyl ketone/cyclohexanone=50/50(%). To the obtained solution was added a solution of 5.0 g of a photopolymerization initiator (Irgacure 907 (trade name), Ciba-Geigy) and 3.0 g of a photosensitizer (Kayacure-DETX (trade name), manufactured by Nippon Kayaku Co., Ltd.) dissolved in 61 g of methyl ethyl ketone. This solution was coated on a substrate and cured with UV irradiation, to obtain a coating having a refractive index of 1.60.

To this solution, was further added 10 g of crosslinkable polystyrene particles (trade name: SX-200H, manufactured by Soken Chemical & Engineering Co., Ltd.) having an average particle diameter of 2 µm, and the mixture was stirred for one hour using a high speed disperser at 5000 rpm to disperse, followed by filtration using a polypropylene filter having a pore diameter of 30 µm, to prepare Coating solution C for an anti-glare hardcoat layer.

(Preparation of Coating Solution D for an Antiglare Hard Coat Layer)

75 g of a mixture of dipentaerythritol pentaacrylate and dipentaerythritol hexaacrylate (DPHA, manufactured by Nippon Kayaku Co., Ltd.), 75 g of bis(4-methacryloylthiophenyl)sulfide (MPSMA, trade name, manufactured by Sumitomo Seika Chemicals Co., Ltd.), and 100 g of alumina particles having an average particle diameter of 33 nm (manufactured by C.I. Kasei Co., Ltd.) were dissolved in 439 g of a mixed solvent of methyl ethyl ketone/cyclohexanone=50/50(%). To the obtained solution was added a solution of 28.7 g of a-1, 5.0 g of a photopolymerization initiator (Irgacure 907 (trade name), Ciba-Geigy) and 3.0 g of a photosensitizer (Kayacure-DETX (trade name), manufactured by Nippon Kayaku Co., Ltd.) dissolved in 33 g of methyl ethyl ketone. This solution was coated on a substrate and cured with UV irradiation, to obtain a coating having a refractive index of 1.60.

To this solution was further added 10 g of crosslinked polystyrene particles having an average particle diameter of 2 µm (trade name: SX-200H, manufactured by Soken Chemical & Engineering Co., Ltd.) and the mixture was stirred in a high speed Disper at 5,000 rpm for 1 hour. After the dispersion, the resultant dispersion was filtered through a polypropylene filter having a pore diameter of 30 µm, to prepare Coating solution D for an antiglare hard coat layer.

(Preparation of Coating Solution E for an Anti-glare Hardcoat Layer)

125 g of a mixture of dipentaerythritol pentaacrylate and dipentaerythritol hexaacrylate (trade name: DPHA, manufactured by Nippon Kayaku Co., Ltd.) and 125 g of bis(4-methacryloylthiophenyl)sulfide (trade name: MPSMA, manufactured by Sumitomo Seika Chemicals Co., Ltd.) were dissolved in 439 g of a mixed solvent of methyl ethyl ketone/cyclohexanone (50/50%). To the resulting solution was added a solution obtained by dissolving 5.0 g of a photopolymerization initiator (trade name: Irgacure 907 (trade name), manufacture by Ciba Geigy Co.) and 3.0 g of a photosensitizer (trade name: KAYACURE DETX (trade name), manufactured by Nippon Kayaku Co., Ltd.) in 49 g of methyl ethyl ketone. The coating film obtained by applying this solution, and then curing the applied solution using ultraviolet rays, had a refractive index of 1.60.

Was further added to this solution, 10 g of crosslinkable polystyrene particles (trade name: SX-200H, manufactured by Soken Chemical & Engineering Co., Ltd.) having an average particle diameter of 2 µm, and the mixture was stirred for one hour using a high speed disperser at 5000 rpm to disperse, followed by filtration using a polypropylene filter having a pore diameter of 30 µm, to prepare Coating solution E for an anti-glare hardcoat layer.

(Preparation of Coating Solution F for an Antiglare Hard Coat Layer)

195 g of a commercially available zirconia-containing UV curing type hard coat solution (DeSolite Z7401, trade name, manufactured by JSR Corporation, having a solid content of 48%, a zirconia content of 71% and an average particle diameter of about 20 nm), 82 g of a mixture of dipentaerythritol pentaacrylate and dipentaerythritol hexaacrylate (DPHA, manufactured by Nippon Kayaku Co., Ltd.), 25.8 g of a-1, and 7.5 g of a photopolymerization initiator (Irgacure 907 (trade name), Ciba-Geigy) were diluted with 368 g of a mixed solvent of methyl ethyl ketone/cyclohexanone=50/50 (%). This solution was coated on a substrate and cured with UV irradiation, to obtain a coating having a refractive index of 1.59.

Was further added to this solution, 10 g of crosslinkable polystyrene particles (trade name: SX-200H, manufactured by Soken Chemical & Engineering Co., Ltd.) having an average particle diameter of 2 µm, and the mixture was stirred for one hour using a high speed disperser at 5000 rpm to disperse, followed by filtration using a polypropylene filter having a pore diameter of 30 µm, to prepare Coating solution F for an anti-glare hardcoat layer.

(Preparation of Coating Solution G for an Antiglare Hard Coat Layer)

250 g of a commercially available zirconia-containing UV curing type hard coat solution (DeSolite Z7401, trade name, manufactured by JSR Corporation, having a solid content of 48%, a zirconia content of 71% and an average particle diameter of about 20 nm), 105 g of a mixture of dipentaerythritol pentaacrylate and dipentaerythritol hexaacrylate (DPHA (trade name), manufactured by Nippon Kayaku Co., Ltd.), 25.8 g of a-1, and 7.5 g of a photopolymerization initiator (Irgacure 907 (trade name), Ciba-Geigy) were diluted with 384 g of a mixed solvent of methyl ethyl ketone/cyclohexanone=50/50(%). This solution was coated on a substrate and cured with UV irradiation, to obtain a coating having a refractive index of 1.61.

Was further added to this solution, 10 g of crosslinkable polystyrene particles (trade name: SX-200H, manufactured by Soken Chemical & Engineering Co., Ltd.) having an average particle diameter of 2 µm, and the mixture was stirred for one hour using a high speed disperser at 5000 rpm to disperse, followed by filtration using a polypropylene filter having a pore diameter of 30 µm, to prepare Coating Solution G for an anti-glare hardcoat layer.

(Preparation of Coating Solution H for an Anti-glare Hardcoat Layer)

Coating Solution H for an anti-glare hardcoat layer was prepared in the same manner as the above Coating solution G for an anti-glare hardcoat layer, except that a-1 was changed to a-2 in the same addition amount.

(Preparation of Coating Solution I for an Anti-glare Hardcoat Layer)

Coating Solution I for an anti-glare hardcoat layer was prepared in the same manner as the above Coating solution G for an anti-glare hardcoat layer, except that a-1 was changed to a-3 in the same addition amount.

(Preparation of Coating Solution J for an Anti-glare Hardcoat Layer)

Coating solution J for an anti-glare hardcoat layer was prepared in the same manner as the above Coating solution G for an anti-glare hardcoat layer, except that a-1 was changed to a-4 in the same addition amount.

(Preparation of Coating Solution K for an Antiglare Hard Coat Layer)

91 g of a mixture of dipentaerythritol pentaacrylate and dipentaerythritol hexaacrylate (DPHA, trade name, manufactured by Nippon Kayaku Co., Ltd.) and 218 g of a zirconium oxide superfine-particle (particle diameter: about 30 nm) dispersion-containing hard coat solution (DeSolite Z-7401, trade name, manufactured by JSR Corporation) were dissolved in 52 g of a mixed solvent of methyl ethyl ketone/cyclohexanone=54/46(%). To the obtained solution was added 10 g of a photopolymerization initiator (Irgacure 907 (trade name), manufactured by Ciba Fine Chemical Co., Ltd.) and the mixed solution was stirred until dissolution. Then, 0.93 g of a fluorine-containing surfactant composed of a methyl ethyl ketone solution of 20 mass % fluorine-containing oligomer (Megafac F-176, trade name, manufactured by Dai-Nippon Ink and Chemicals, Ltd.) was added thereto. This solution was coated on a substrate and cured with UV irradiation, to obtain a coating having a refractive index of 1.61.

20 g of crosslinkable polystyrene particles (trade name: SX-200HS, manufactured by Soken Chemical & Engineering Co., Ltd.) having a number average particle diameter of 1.99 µm and a standard deviation of particle diameter of 0.32 µm (16% of the number average particle diameter) was added to 80 g of a mixed solvent of methyl ethyl ketone/cyclohexanone (54/46% by mass), and the resultant mixture was stirred for one hour using a high speed disperser at 5000 rpm for dispersing. Thereafter, the thus-obtained dispersion was subjected to filtration using polypropylene filters having a pore diameter of 10 µm, 3 µm, and 1 µm, (respectively, PPE-10, PPE-03, and PPE-01, trade names, manufactured by Fuji Photo Film Co., Ltd.). 29 g of the resulted dispersion was added to the above-prepared solution. After stirring, this mixture was filtrated with a polypropylene filter having a pore diameter of 30 µm, to obtain Coating solution K for an anti-glare hardcoat layer.

(Preparation of Coating Solution L for an Antiglare Hard Coat Layer)

82 g of a mixture of dipentaerythritol pentaacrylate and dipentaerythritol hexaacrylate (DPHA, manufactured by Nippon Kayaku Co., Ltd.), 196 g of a zirconium oxide superfine-particle (particle diameter: about 30 nm) dispersion-containing hard coat solution (DeSolite Z-7401, trade name, manufactured by JSR Corporation) and 20.7 g of a-1 were dissolved in 64.5 g of a mixed solvent of methyl ethyl ketone/cyclohexanone=54/46(%). To the obtained solution was added 10 g of a photopolymerization initiator (Irgacure 907 (trade name), manufactured by Ciba Fine Chemical Co., Ltd.) and the mixed solution was stirred until dissolution. Then, 0.93 g of a fluorine-containing surfactant composed of a methyl ethyl ketone solution of 20 mass % fluorine-containing oligomer (Megafac F-176, trade name, manufactured by Dai-Nippon Ink and Chemicals, Ltd.) was added thereto. This solution was coated on a substrate and cured with UV irradiation, to obtain a coating having a refractive index of 1.61.

20 g of crosslinkable polystyrene particles (trade name: SX-200HS, manufactured by Soken Chemical & Engineering Co., Ltd.) having a number average particle diameter of 1.99 µm and a standard deviation of particle diameter of 0.32 µm (16% of the number average particle diameter) was added to 80 g of a mixed solvent of methyl ethyl ketone/cyclohexanone (54/46% by mass), and the resultant mixture was stirred for one hour using a high speed disperser at 5000 rpm for dispersing. Thereafter, the thus-obtained dispersion was subjected to filtration using polypropylene filters having a pore diameter of 10 µm, 3 µm, and 1 µm, (respectively, PPE-10, PPE-03, and PPE-01, trade names, manufactured by Fuji Photo Film Co., Ltd.). 29 g of the resulted dispersion was added to the above-prepared solution. After stirring, this mixture was filtrated with a polypropylene filter having a pore diameter of 30 µm, to obtain Coating solution L for an anti-glare hardcoat layer.

(Preparation of Coating Solution M for an Anti-glare Hardcoat Layer)

Coating solution M for an anti-glare hardcoat layer was prepared in the same manner as the Coating solution K for an anti-glare hardcoat layer, except that fluorine-containing surfactant was changed to silicone-containing surfactant (Silicone X-22-945, trade name, manufactured by Shin-Etsu Chemical Co., Ltd.).

(Preparation of Coating Solution N for an Anti-glare Hardcoat Layer)

Coating solution N for an anti-glare hardcoat layer was prepared in the same manner as the Coating solution L for an anti-glare hardcoat layer, except that fluorine-containing surfactant was changed to silicone-containing surfactant (Silicone X-22-945, trade name, manufactured by Shin-Etsu Chemical Co., Ltd.).

(Preparation of Coating Solution 1A for an Antiglare Hard Coat Layer)

272 g of a solvent composition modified product of a commercially available silica-containing UV curing type hard coat solution (DeSolite Z-7526 (trade name, manufactured by JSR Corporation), having a solid content of about 72%, a $SiO_2$ content in the solids of about 38%, containing polymerization monomer and polymerization initiator) was diluted with 26.2 g of methyl isobutyl ketone. This solution was coated on a substrate and cured with UV irradiation, to obtain a coating having a refractive index of 1.51.

To this solution, were further added 44 g of a dispersion obtained by dispersing a 25% methyl isobutyl ketone dispersion of crosslinked polystyrene particles having an average particle diameter of 3.5 µm (trade name: SX-350H, manufactured by Soken Chemical & Engineering Co., Ltd.) in a Polytron disperser at 10,000 rpm for 30 minutes, and then 57.8 g of a dispersion obtained by dispersing a 25% methyl isobutyl ketone dispersion of crosslinked polystyrene particles having an average particle diameter of 5 µm (trade name: SX-500H, manufactured by Soken Chemical & Engineering Co., Ltd.) in a Polytron disperser at 10,000 rpm for 30 minutes.

The above-mentioned mixture was filtered through a polypropylene filter having a pore diameter of 30 µm, to prepare Coating solution 1A for an antiglare hard coat layer.

(Preparation of Coating Solution 1B for an Antiglare Hard Coat Layer)

19.6 g of a-1 was added to 245 g of a solvent composition modified product of a commercially available silica-containing UV curing type hard coat solution (DeSolite Z-7526 (trade name, manufactured by JSR Corporation), having a solid content of about 72%, a $SiO_2$ content in the solids of about 38%, containing polymerization monomer and polymerization initiator), and the mixture was diluted with 33.6 g of methyl isobutyl ketone. This solution was coated on a substrate and cured with UV irradiation, to obtain a coating having a refractive index of 1.51.

To this solution, were further added 44 g of a dispersion obtained by dispersing a 25% methyl isobutyl ketone dispersion of crosslinked polystyrene particles having an average particle diameter of 3.5 μm (trade name: SX-350H, manufactured by Soken Chemical & Engineering Co., Ltd.) in a Polytron disperser at 10,000 rpm for 30 minutes, and then 57.8 g of a dispersion obtained by dispersing a 25% methyl isobutyl ketone dispersion of crosslinked polystyrene particles having an average particle diameter of 5 μm (trade name: SX-500H, manufactured by Soken Chemical & Engineering Co., Ltd.) in a Polytron disperser at 10,000 rpm for 30 minutes.

The above-mentioned mixture was filtered through a polypropylene filter having a pore diameter of 30 μm, to prepare Coating solution 1B for an antiglare hard coat layer.

(Preparation of Coating Solution 1C for an Anti-glare Hardcoat Layer)

Coating solution 1C for an anti-glare hardcoat layer was prepared in the same manner as the Coating solution 1B for an anti-glare hardcoat layer, except that a-1 was changed to a-2 in the same addition amount.

(Preparation of Coating Solution 1D for an Anti-glare Hardcoat Layer)

Coating solution 1D for an anti-glare hardcoat layer was prepared in the same manner as the Coating solution 1B for an anti-glare hardcoat layer, except that a-1 was changed to a-4 in the same addition amount.

(Preparation of Coating Solution 1E for Anti-glare Hardcoat Layer)

Coating solution 1E for an anti-glare hardcoat layer was prepared in the same manner as the Coating solution 1B for an anti-glare hardcoat layer, except that a-1 was changed to a-3 in the same addition amount.

(Preparation of Coating Solution 1F for an Antiglare Hard Coat Layer)

To 272 g of a solvent-composition modified product of a commercially available silica-containing UV curing type hard coat solution (DeSolite Z-7526 (trade name), manufactured by JSR Corporation, having a solid content of about 72%, a $SiO_2$ content in the solids of about 38%, containing a polymerizable monomer and a polymerization initiator) were added 91 g of a mixture of dipentaerythritol pentaacrylate and dipentaerythritol hexaacrylate (DPHA, manufactured by Nippon Kayaku Co., Ltd.) and 19.6 of the above organosilane sol composition a-1 and further, the mixture was diluted with 26.2 g of methyl isobutyl ketone. This solution was coated on a substrate and cured with UV irradiation, to obtain a coating having a refractive index of 1.52.

To this solution were further added 44 g of a dispersion obtained by dispersing a 30% methyl isobutyl ketone dispersion of classified reinforced crosslinked polystyrene particles having an average particle diameter of 3.5 μm (trade name: SXS-350H, manufactured by Soken Chemical & Engineering Co., Ltd.) in a Polytron disperser at 10,000 rpm for 20 minutes, and then 57.8 g of a dispersion obtained by dispersing a 30% methyl isobutyl ketone dispersion of classified reinforced crosslinked polystyrene particles having an average particle diameter of 5 μm (trade name: SXS-500H, manufactured by Soken Chemical & Engineering Co., Ltd.) in a Polytron disperser at 10,000 rpm for 30 minutes.

The above-mentioned mixture was filtered through a polypropylene filter having a pore diameter of 30 μm, to prepare Coating solution 1F for an antiglare hard coat layer.

(Preparation of Coating Solution 1G for an Antiglare Hard Coat Layer)

To 95.2 g of a commercially available zirconia-containing UV curing type hard coat solution (DeSolite Z-7404 (trade name), manufactured by JSR Corporation, having a solid content of about 61.2%, a $ZrO_2$ content in the solids of about 69.6%, containing a polymerizable monomer and a polymerization initiator) were added 28.8 g of a mixture of dipentaerythritol pentaacrylate and dipentaerythritol hexaacrylate (DPHA, manufactured by Nippon Kayaku Co., Ltd.) and 9.6 of 3-acryloyloxypropyltrimethoxysilane (KBM 5103 (trade name), manufactured by Shin-Etsu Chemical Co., Ltd.) and further, the mixture was diluted with 20.1 g of methyl isobutyl ketone and 5.4 g of methyl ethyl ketone. This solution was coated on a substrate and cured with UV irradiation, to obtain a coating having a refractive index of 1.62.

To this solution, were further added 29.5 g of a dispersion obtained by dispersing a 30% methyl isobutyl ketone dispersion of silica particles having an average particle diameter of 1.5 μm (trade name: Sea Hoster KE-P150, manufactured by Nippon Shokubai Co., Ltd.) in a Polytron disperser at 10,000 rpm for 20 minutes, and then 11.3 g of a dispersion obtained by dispersing a 30% methyl isobutyl ketone dispersion of classified reinforced crosslinked polymethyl methacrylate particles having an average particle diameter of 3 μm (trade name: MXS-300, manufactured by Soken Chemical & Engineering Co., Ltd.) in a Polytron disperser at 10,000 rpm for 30 minutes and standing for 1 week.

The above-mentioned mixture was filtered through a polypropylene filter having a pore diameter of 30 μm, to prepare Coating solution 1G for an antiglare hard coat layer.

(Preparation of Coating Solution 1H for an Anti-glare Hardcoat Layer)

Coating solution 1H for an anti-glare hardcoat layer was prepared in the same manner as the Coating solution 1G for an anti-glare hardcoat layer, except that 9.6 g of 3-acryloyloxypropyltrimethoxysilane was changed to 5.0 g of a-1 in the same addition amount.

(Preparation of Coating Solution 1I for an Anti-glare Hardcoat Layer)

Coating solution 1I for an anti-glare hardcoat layer was prepared in the same manner as the Coating solution 1G for an anti-glare hardcoat layer, except that 9.6 g of 3-acryloyloxypropyltrimethoxysilane was changed to 0.48 g of a-8, which means a-1 in the above Coating solution 1H for an anti-glare hard coat layer was changed to a-8 in the same addition amount.

(Preparation of Coating Solution 1J for an Anti-glare Hardcoat Layer)

Coating solution 1J for an anti-glare hardcoat layer was prepared in the same manner as the Coating solution 1G for an anti-glare hardcoat layer, except that 9.6 g of 3-acryloyloxypropyltrimethoxysilane was changed to 0.48 g of c-1, which means a-1 in the above Coating solution 1H for an anti-glare hard coat layer was changed to C-1 in the same addition amount.

(Preparation of Coating Solution 1K for an Antiglare Hard Coat Layer)

To 80 g of EO-added trimethylolpropane triacrylate (trade name: Viskote #360, manufactured by Osaka Organic Chemical Industry Co., Ltd.), 21 g of a mixture of dipentaerythritol pentaacrylate and dipentaerythritol hexaacrylate (DPHA, manufactured by Nippon Kayaku Co., Ltd.), and 327 g of a commercially available zirconia-containing UV curing type hard coat solution (DeSolite Z-7404 (trade name, manufactured by JSR Corporation), having a solid content of 61%, a zirconia content in the solids of 68%, an average particle diameter of 20 nm, containing a polymerizable monomer and a polymerization initiator), were added 16.0 g of methyl isobutyl ketone and 19.8 g of methyl ethyl ketone, and the resultant mixture was stirred. This solution was coated on a substrate and cured with UV irradiation, to obtain a coating having a refractive index of 1.70.

To this solution, were further added 30.4 g of a dispersion obtained by dispersing a 30% methyl isobutyl ketone dispersion of classified reinforced crosslinked polymethyl methacrylate particles having an average particle diameter of 3 μm (trade name: MSX-300, manufactured by Soken Chemical & Engineering Co., Ltd.) in a Polytron disperser at 10,000 rpm for 30 minutes, and then 48.5 g of a dispersion obtained by dispersing a 30% methyl isobutyl ketone dispersion of classified reinforced crosslinked polymethyl methacrylate particles having an average particle diameter of 5 μm (trade name: MXS-500, manufactured by Soken Chemical & Engineering Co., Ltd.) in a Polytron disperser at 10,000 rpm for 20 minutes. Finally, 9.8 g of the organosilane sol composition a-1 was added to the mixture, and the resultant mixture was stirred in a Disper for 20 minutes and then filtered through a polypropylene filter having a pore diameter of 30 μm, to prepare Coating solution 1K for an antiglare hard coat layer.

(Preparation of Coating Solution 1L for an Anti-glare Hardcoat Layer)

Coating solution 1L for an anti-glare hardcoat layer was prepared in the same manner as the Coating solution 1K for an anti-glare hardcoat layer, except that a-1 was changed to a-8 in the same addition amount.

(Preparation of Coating Solution 1M for an Antiglare Hard Coat Layer)

To 127 g of EO-added trimethylolpropane triacrylate (trade name: Viskote #360, manufactured by Osaka Organic Chemical Industry Co., Ltd.) were added 76.4 g of a mixture of dipentaerythritol pentaacrylate and dipentaerythritol hexaacrylate (DPHA, trade name, manufactured by Nippon Kayaku Co., Ltd.) and further 10.8 g of a photopolymerization initiator (Irgacure 184 (trade name), manufactured by Ciba Fine Chemical Co., Ltd.), and these were mixed and stirred. To the mixture were added 60.0 g of methyl isobutyl ketone and 33.0 g of methyl ethyl ketone and the resultant mixture was stirred. This solution was coated on a substrate and cured with UV irradiation, to obtain a coating having a refractive index of 1.53.

To this solution, were further added 102 g of a dispersion obtained by dispersing a 30% methyl isobutyl ketone dispersion of classified reinforced crosslinked polymethyl methacrylate particles having an average particle diameter of 5 μm (trade name: MXS-500, manufactured by Soken Chemical & Engineering Co., Ltd.) in a Polytron disperser at 10,000 rpm for 20 minutes, and then 95 g of a dispersion obtained by dispersing a 30% methyl isobutyl ketone dispersion of silica particles having an average particle diameter of 2.5 μm (trade name: Sea Hoster KE-P250, manufactured by Nippon Shokubai Co., Ltd.) in a Polytron disperser at 10,000 rpm for 30 minutes. Finally, 6.1 g of the organosilane sol composition a-1 was added to the mixture, and the resultant mixture was stirred in a Disper for 20 minutes, and then filtered through a polypropylene filter having a pore diameter of 30 μm, to prepare Coating solution 1M for an antiglare hard coat layer.

(Preparation of Coating Solution 1N for an Anti-glare Hardcoat Layer)

Coating solution 1N for an anti-glare hardcoat layer was prepared in the same manner as the Coating solution 1M for an anti-glare hardcoat layer, except that a-1 was changed to a-8 in the same addition amount.

(Preparation of Coating Solution A for a Low-refractive-index Layer)

To 177 g of a thermally crosslinkable fluorine-containing polymer having a refractive index of 1.42 (JN-7228, trade name, solid content: 6%, manufactured by JSR Corporation) were added 15.2 g of silica sol (MEK-ST, average particle diameter: 10 to 20 nm, solid content: 30%, manufactured by Nissan Chemical Industries, Ltd.), 116 g of methyl ethyl ketone, and 9.0 g of cyclohexanone. After stirring, the mixture was filtered through a polypropylene filter having a pore diameter of 1 μm, to prepare Coating solution A for a low-refractive-index layer.

(Preparation of Coating Solution B for a Low-refractive-index Layer)

To 15.2 g of the Perfluoroolefin copolymer (1), were added 0.3 g of a reactive silicone X-22-164B (trade name, manufactured by Shin-Etsu Chemical Co., Ltd.), 0.76 g of a photopolymerization initiator (Irgacure 907, trade name, manufactured by Ciba-Geigy), 293 g of methyl ethyl ketone, and 9.0 g of cyclohexanone. After stirring, the mixture was filtered through a polypropylene filter having a pore diameter of 5 μm, to prepare Coating solution B for a low-refractive-index layer.

(Preparation of Coating Solution C for a Low-refractive-index Layer)

To 15.2 g of the Perfluoroolefin copolymer (2), were added 0.3 g of a reactive silicone X-22-169AS (trade name, manufactured by Shin-Etsu Chemical Co., Ltd.), 1.52 g of a photopolymerization initiator (UVI6990, trade name, manufactured by Union Carbide Corporation), 293 g of methyl ethyl ketone, and 9.0 g of cyclohexanone. After stirring, the mixture was filtered through a polypropylene filter having a pore diameter of 5 μm, to prepare Coating solution C for a low-refractive-index layer.

(Preparation of Coating Solution D for a Low-refractive-index Layer)

To 177 g of a thermally crosslinkable fluorine-containing polymer having a refractive index of 1.42 (JN-7228, trade name, solid content: 6%, manufactured by JSR Corporation), were added 15.2 g of silica sol (MEK-ST, average particle diameter: 10 to 20 nm, solid content: 30%, manufactured by Nissan Chemical Industries, Ltd.), 7.3 g of a-1, 90 g of methyl ethyl ketone, and 9.0 g of cyclohexanone. After stirring, the mixture was filtered through a polypropylene filter having a pore diameter of 1 μm, to prepare Coating solution D for a low-refractive-index layer.

(Preparation of Coating Solution E for a Low-refractive-index Layer)

Coating solution E for a low-refractive-index layer was prepared in the same manner as the Coating solution D for a low-refractive-index layer, except that a-1 was changed to a-2 in the same addition amounts.

(Preparation of Coating Solution F for a Low-refractive-index Layer)

Coating solution F for a low-refractive-index layer was prepared in the same manner as the Coating solution D for a low-refractive-index layer, except that a-1 was changed to a-3 in the same addition amount.

(Preparation of Coating Solution G for a Low-refractive-index Layer)

Coating solution G for a low-refractive-index layer was prepared in the same manner as the coating solution D for a low-refractive-index layer, except that a-1 was changed to a-4 in the same addition amount.

(Preparation of Coating Solution H for a Low-refractive-index Layer)

To 15.2 g of the Perfluoroolefin copolymer (1), were added 0.3 g of a reactive silicone X-22-164B (trade name, manufactured by Shin-Etsu Chemical Co., Ltd.), 7.3 g of a-1, 0.76 g of a photopolymerization initiator (Irgacure 907, trade name, manufactured by Ciba-Geigy), 301 g of methyl ethyl ketone, and 9.0 g of cyclohexanone. After stirring, the mixture was filtered through a polypropylene filter having a pore diameter of 5 µm, to prepare Coating solution H for a low-refractive-index layer.

(Preparation of Coating Solution I for a Low-refractive-index Layer)

To 15.2 g of the Perfluoroolefin copolymer (2), were added 0.3 g of a reactive silicone X-22-169AS (trade name, manufactured by Shin-Etsu Chemical Co., Ltd.), 7.3 g of a-2, 1.52 g of a photopolymerization initiator (UVI6990, trade name, manufactured by Union Carbide Corporation), 288 g of methyl ethyl ketone, and 9.0 g of cyclohexanone. 10 After stirring, the mixture was filtered through a polypropylene filter having a pore diameter of 5 µm, to prepare Coating solution I for a low-refractive-index layer.

(Preparation of Coating Solution J for a Low-refractive-index Layer)

Coating solution J for a low-refractive-index layer was prepared in the same manner as the Coating solution H for a low-refractive-index layer, except that a-1 was changed to a-8 in the same addition amount.

(Preparation of Coating Solution K for a Low-refractive-index Layer)

To 177 g of a thermally crosslinkable fluorine-containing polymer having a refractive index of 1.42 (JN-7228, trade name, solid content: 6%, manufactured by JSR Corporation), were added 6.9 g of silica sol (MEK-ST, average particle diameter: 10 to 20 nm, solid content: 30%, manufactured by Nissan Chemical Industries, Ltd.), 8.3 g of silica sol with a different average particle diameter (MEK-ST-L, average particle diameter: about 50 nm, solid content: 30%, manufactured by Nissan Chemical Industries, Ltd.), 7.3 g of a-1, 90 g of methyl ethyl ketone, and 9.0 g of cyclohexanone. After stirring, the mixture was filtered through a polypropylene filter having a pore diameter of 1 µm, to prepare Coating solution K for a low-refractive-index layer.

(Preparation of Coating Solution L for a Low-refractive-index Layer)

Coating solution L for a low-refractive-index layer was prepared in the same manner as the Coating solution K for a low-refractive-index layer, except that a-1 was changed to a-8 in the same addition amount.

(Preparation of Coating Solution M for a Low-refractive-index Layer)

Coating solution M for a low-refractive-index layer was prepared in the same manner as the Coating solution K for a low-refractive-index layer, except that a-1 was changed to c-1 in the same addition amount.

(Preparation of Coating Solution N for a Low-refractive-index Layer)

Coating solution N for a low-refractive-index layer was prepared in the same manner as the Coating solution K for a low-refractive-index layer, except that a-1 was changed to c-2 in the same addition amount.

(Preparation of Coating Solution O for a Low-refractive-index Layer)

Coating solution O for a low-refractive-index layer was prepared in the same manner as the Coating solution K for a low-refractive-index layer, except that a-1 was changed to c-3 in the same addition amount.

The low-refractive-index layers formed from the above-mentioned Coating solutions A to O for low-refractive-index layers each had a refractive index in the range of 1.38 to 1.49.

Example 1

Hard coat layers A to G, antiglare hard coat layers A to N, and low-refractive-index layers A to I were coated on substrates as described below, to obtain antireflection film samples. Combinations of layers to be laminated were performed as described in Tables 1 and 2.

(1) Coating of a Hard Coat Layer

A 80-µm thick triacetylcellulose film (TD80U, trade name, manufactured by Fuji Photo Film Co., Ltd.) in the form of a roll was unwound, on which any of the above-mentioned coating solutions for hard coat layers was coated by use of a micro gravure roll of 50 mm in diameter having a gravure pattern with a line number of 180 lines/inch and a depth of 40 µm and a doctor blade, under the conditions of a gravure roll rotation number of 30 rpm and a conveying speed of 10 m/minute, and the resultant coating was dried at 120° C. for 2 minutes. Thereafter, UV of an illuminance of 400 mW/cm$^2$ and a dose of 300 mJ/cm$^2$ was irradiated by use of an air-cooled metal halide lamp of 160 W/cm (manufactured by Eyegraphics Co., Ltd.) under nitrogen purge to an oxygen concentration of 0.1% or less, to cure the coating layer. Thus, a hard coat layer with a thickness of 2.5 µm was formed on the film, which was then wound up.

(2) Coating of an Antiglare Hard Coat Layer

The triacetylcellulose film on which the hard coat layer was coated was unwound again, and any of the above-mentioned coating solutions for antiglare hard coat layers was coated by use of a micro gravure roll of 50 mm in diameter having a gravure pattern with a line number of 180 lines/inch and a depth of 40 µm and a doctor blade, under the conditions of a gravure roll rotation number of 30 rpm and a conveying speed of 5 m/minute, and the resultant coating was dried at 120° C. for 4 minutes. Thereafter, UV of an illuminance of 400 mW/cm$^2$ and dose of 300 mJ/cm$^2$ was irradiated by use of an air-cooled metal halide lamp of 160 W/cm (manufactured by Eyegraphics Co., Ltd.) under nitrogen purge, to cure the coating layer. Thus, an antiglare hard coat layer with a thickness of 1.5 to 4.5 µm was formed on the film, which was then wound up.

(3) Coating of a Low-refractive-index Layer

The triacetylcellulose film on which the hard coat layer and the antiglare hard coat layer were coated was unwound again, and any of the above-mentioned coating solutions for low-refractive-index layers was coated by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 10 m/minute, and the resultant coating was dried at 80° C. for 2 minutes. Thereafter, UV of an illuminance of 400 mW/cm$^2$ and dose of 600 mJ/cm$^2$ was irradiated by use of an air-cooled metal halide lamp of 240 W/cm (manufactured by Eyegraphics Co., Ltd.) under nitrogen purge. After the resultant coating was dried at 120° C. for 2.5 minutes, it was further dried at 140° C. for 10 to 20 minutes, to form a low-refractive-index layer with a thickness of 0.096 μm on the film, which was then wound up.

TABLE 1

| Sample No. (Remarks) | Coating solution for hard coat layer | Coating solution for antiglare hard coat layer | Coating solution for low refractive index layer |
|---|---|---|---|
| 101 (Comparative Example) | None | A | A |
| 102 (Comparative Example) | None | B | A |
| 103 (Comparative Example) | None | C | A |
| 104 (This invention) | None | D | A |
| 105 (Comparative Example) | None | E | A |
| 106 (This invention) | None | F | A |
| 107 (This invention) | None | G | A |
| 108 (This invention) | None | H | A |
| 109 (This invention) | None | I | A |
| 110 (This invention) | None | J | A |
| 111 (Comparative Example) | None | K | A |
| 112 (This invention) | None | L | A |
| 113 (Comparative Example) | None | M | A |
| 114 (This invention) | None | N | A |
| 115 (Comparative Example) | A | A | A |
| 116 (Comparative Example) | B | A | A |
| 117 (Comparative Example) | C | A | A |
| 118 (Comparative Example) | D | A | A |
| 119 (This invention) | E | A | A |
| 120 (This invention) | F | A | A |
| 121 (This invention) | G | A | A |
| 122 (Comparative Example) | B | A | B |
| 123 (Comparative Example) | B | A | C |
| 124 (This invention) | B | A | D |
| 125 (This invention) | B | A | E |
| 126 (This invention) | B | A | F |

TABLE 2

(continued from Table 1)

| Sample No. (Remarks) | Coating solution for hard coat layer | Coating solution for antiglare hard coat layer | Coating solution for low refractive index layer |
|---|---|---|---|
| 127 (This invention) | B | A | G |
| 128 (This invention) | B | A | H |
| 129 (This invention) | B | A | I |
| 130 (This invention) | E | A | D |
| 131 (This invention) | E | A | E |
| 132 (This invention) | E | A | F |
| 133 (This invention) | E | F | A |
| 134 (This invention) | E | G | A |
| 135 (This invention) | E | H | A |
| 136 (This invention) | E | G | D |
| 137 (This invention) | E | G | E |
| 138 (This invention) | B | F | D |
| 139 (This invention) | B | G | D |
| 140 (This invention) | B | G | E |
| 141 (This invention) | B | H | F |
| 142 (This invention) | B | J | H |
| 143 (Comparative Example) | B | K | A |
| 144 (This invention) | B | L | A |
| 145 (Comparative Example) | B | M | A |
| 146 (This invention) | B | N | A |
| 147 (This invention) | None | G | D |
| 148 (This invention) | None | G | E |
| 149 (This invention) | None | G | H |
| 150 (Comparative Example) | D | E | C |
| 151 (This invention) | E | G | D |
| 152 (This invention) | E | J | H |

For those samples extracted from among the above-mentioned samples and coated with up to the antiglare hard coat layer, surface energy, peak ratio F/C, i.e., a ratio of the peak attributed to a fluorine atom to the peak attributed to a carbon atom, and peak ratio Si/C, i.e., a ratio of the peak attributed to silicone atom to the peak attributed to a carbon atom, measured by X-ray photoelectron spectroscopy, are shown below. Note that the surface energy of the antiglare hard coat layers was obtained by measuring the contact angles to pure water and of diiodomethane and making calculation by introducing the measured values into the Owens surface energy calculation equations.

Sample 116 Surface energy: 22 mN·m$^{-1}$, F/C: 0.53

Sample 143 Surface energy: 31 mN·m$^{-1}$, F/C: 0.28

Sample 144 Surface energy: 33 mN·m$^{-1}$, F/C: 0.27

Sample 145 Surface energy: 29 mN·m$^{-1}$, Si/C: 0.12

Sample 146 Surface energy: 30 mN·m$^{-1}$, Si/C: 0.11

(Evaluation of the Anti-reflection Films)

As for the resultant films, the following items were evaluated:

(1) Average Specular Reflectance

Using a spectrophotometer (made by JASCO Corp.), spectral reflectance, based on an incident angle of 50°, in the wavelength range of 380 to 780 nm, was measured. The result was represented by the integrated sphere average specular reflectance in 450 to 650 nm.

(2) Haze

A haze of the resultant films was measured by the use of a haze meter Model 1001DP (trade name, manufactured by Nihon Denshoku Kogyo KK).

(3) Evaluation of Pencil Scratching (Pencil Hardness) Test

The evaluation of pencil scratching test disclosed in JIS K 5400 was carried out, as an index of scratch-resistance. After adjusting moisture of the anti-reflection film at 25° C. and a relative humidity of 60% RH for 2 hours, a scratch test was carried out according to JIS S 6006 by using test pencil of 3H, under a load of 1 kg. Scratch formation was evaluated according to the following criteria.

In the evaluation of n=5, no scratch was detected: ◯
In the evaluation of n=5, 1 or 2 scratch marks were detected: Δ
In the evaluation of n=5, at least 3 scratch marks were detected: x (4) Contact Angle and Evaluation of Fingerprint Adhesion As an index of stain-proofing property of the surface of an optical material, the moisture of the anti-reflection film was adjusted at a temperature of 25° C. and a humidity of 60% RH for 2 hours. Thereafter, its contact angle with water was measured. In addition, fingerprints were caused to adhere onto the surface of this sample, and then they were wiped out with a cleaning cloth. The state thereof was observed with the naked eye, to evaluate fingerprint adhesion according to the following ranks.

The fingerprints were completely wiped out: ◯
The fingerprints were somewhat observed after wiping out: Δ
The fingerprints were hardly wiped out: x (5) Measurement of Dynamic Friction Coefficient The measurement of dynamic friction coefficient was carried out as an index of a surface-sliding property. The sample film was adjusted in humidity at 25° C. and a relative humidity of 60% RH for 2 hours, and then measured by a HEIDON-14 (trade name) dynamic friction tester under conditions of employing stainless steel balls having a diameter of 5 mmφ, a load of 100 g, at a velocity of 60 cm/min, and the measured value was used as a dynamic friction coefficient.

(6) Evaluation of Anti-glare Property

A fluorescent lamp (8000 cd/m$^2$) without any louver was allowed to reflect on the produced anti-glare film, and then the degree of the blur of the reflection image was evaluated according to the following criteria.
The outline of the fluorescent lamp was not recognized at all: ⊚
The outline of the fluorescent lamp was slightly recognized: ◯
The fluorescent lamp was blurred, but the outline thereof was able to be recognized: Δ
The fluorescent lamp was hardly blurred: x (7) Evaluation for Glistening Diffused light from a fluorescent lamp with a louver was allowed to reflect on the manufactured anti-glare film, to evaluate the glistening of the surface, according to the following criteria.
Almost no glistening was observed: ◯
Slight glistening was observed: Δ
Glistening with a discriminating size with the naked eye was observed: x (8) Evaluation of Steel Wool Scratch Resistance Using a rubbing tester, rubbing tests were carried out under the following conditions.
Sample conditioning conditions: 25° C., 60% RH, 2 hours or more.
Rubbing material: On a rubbing top portion (1 cm×1 cm) of a tester in contact with a sample was wound steel wool (manufactured by Nippon Steel Wool Co., Ltd., Grade No. 0000) and fixed with a band so that no dislocation could occur.
Distance of travel (one-way): 13 cm;
Rubbing speed: 13 cm/second;
Load: 200 g/cm$^2$;
Contact area of top portion: 1 cm×1 cm; and
Rubbing number: 20 strokes.
On the backside of the rubbed sample was coated oily black ink and the surface was observed in reflected light with the naked eye. The scratches on the rubbed portion were evaluated based on the following criteria.
No scratch was visible upon very careful visual examination: ⊚
Soft scratches were slightly visible upon very careful visual examination: ◯
Soft scratches were visible: ◯Δ
Moderate scratches were visible: Δ
Hard scratches were visible at first glance: x (9) Evaluation of Wet-swab Rubbing Resistance To the rubbing top portion of a rubbing tester was fixed a cotton swab. In a flat dish a sample was fixed at the upper and lower ends each with a clip. The sample and the swab were immersed in water of 25° C. at the room temperature of 25° C. Under a load of 500 g on the swab, rubbing tests were performed in various rubbing numbers. The rubbing conditions were as follows.
Rubbing distance (one-way): 1 cm; and
Rubbing speed: about 2 strokes/second.
The rubbed sample was visually observed, and the rubbing resistance of the sample was evaluated by the number of rubbing in which film was separated off for the first time, based on the following criteria.
Separation (pealing-off) of the film occurred in 0 to 10 strokes: x
Separation of the film occurred in more than 10 to 30 strokes: xΔ
Separation of the film occurred in more than 30 to 50 strokes: Δ
Separation of the film occurred in more than 50 to 100 strokes: ◯Δ
Separation of the film occurred in more than 100 to 150 strokes: ◯
No separation of the film occurred in more than 150 strokes: ⊚

(10) Coating Surface Unevenness

Under conditions that a film sample was placed with its coated side up and light form the above-mentioned fluorescent lamp was irradiated on the film sample from the back side, frequencies of occurrences of spot defects such as cissing and comet with nucleus, and of surface unevenness such as coating unevenness and drying unevenness, were checked by examination with the naked eye on the surface with transmitted light for only 10 m$^2$ portion of the surface. The obtained value was divided by 10, to calculate the number of surface unevennesses per m$^2$ For all the samples according to the present invention among the above-mentioned samples, fingerprint adherence was ◯, the antiglare property was ⊚, and the glistening was ◯. In addition, the antireflection property and pencil hardness (resistance to pencil scratching) were also above the performance levels higher than those required for anti-glare anti-reflection films.

Further, the number(s) of surface unevennesses were counted for Samples 116, 143 to 146.

| | |
|---|---|
| Sample 116 | 9/m$^2$ |
| Sample 143 | 3/m$^2$ |
| Sample 144 | 0/m$^2$ |
| Sample 145 | 3/m$^2$ |
| Sample 146 | 1/m$^2$ |

As a result, it was confirmed that having the fluorine-based surfactant contained in the antiglare hard coat layer resulted in the effect of reducing coating surface unevenness.

Results of other evaluations are shown in Tables 3 and 4.

It can be seen that Samples 104, 106 to 110, 112, 114, 119 to 121, 124 to 142, 144, 146 to 149, 151 and 152 according to the present invention exhibited excellent steel wool scratch resistance and excellent cotton swab rubbing resistance performance, as compared with Samples 101 to 103, 105, 111, 113, 115 to 118, 122, 123, 143, 145, and 150 of Comparative Examples. In particular, it can be seen that systems containing the compound according to the present invention in both the antiglare hard coat layer and the low-refractive-index layer had excellent scratch resistance performance. It is apparent that these results are attributable to the silane-based compounds according to the present invention contained in the system.

TABLE 3

| Sample No. (Remarks) | Average specular reflectance (%) | Haze (%) | Pencil scratching test | Contact angle [°] | Dynamic friction coefficient | Steel wool scratch resistance | Wet-swab rubbing resistance |
|---|---|---|---|---|---|---|---|
| 101 (Comparative Example) | 2.1 | 12.2 | ○ | 102 | 0.08 | X | X |
| 102 (Comparative Example) | 2.1 | 12.6 | ○ | 102 | 0.07 | X | X |
| 103 (Comparative Example) | 2.1 | 13.2 | ○ | 103 | 0.08 | X | X |
| 104 (This invention) | 2.0 | 12.0 | ○ | 102 | 0.08 | ○Δ | ○ |
| 105 (Comparative Example) | 2.2 | 12.8 | Δ | 102 | 0.08 | X | X |
| 106 (This invention) | 2.0 | 13.0 | ○ | 102 | 0.08 | ○Δ | ○Δ |
| 107 (This invention) | 2.1 | 13.2 | ○ | 102 | 0.08 | ○ | ○ |
| 108 (This invention) | 1.9 | 13.3 | ○ | 101 | 0.08 | ○Δ | ○Δ |
| 109 (This invention) | 2.1 | 12.2 | ○ | 102 | 0.08 | ○Δ | ○ |
| 110 (This invention) | 1.9 | 13.1 | ○ | 102 | 0.08 | ○ | ○Δ |
| 111 (Comparative Example) | 2.1 | 12.8 | ○ | 102 | 0.08 | X | X |
| 112 (This invention) | 2.0 | 13.0 | ○ | 101 | 0.08 | ○ | ○ |
| 113 (Comparative Example) | 2.1 | 12.2 | ○ | 100 | 0.08 | X | X |
| 114 (This invention) | 2.1 | 12.5 | ○ | 100 | 0.08 | ○ | ○ |
| 115 (Comparative Example) | 2.1 | 16.2 | ○ | 102 | 0.08 | X | X |
| 116 (Comparative Example) | 2.0 | 15.1 | ○ | 102 | 0.08 | X | X |
| 117 (Comparative Example) | 2.1 | 15.8 | ○ | 102 | 0.08 | X | X |
| 118 (Comparative Example) | 2.2 | 14.0 | Δ | 102 | 0.07 | X | X |
| 119 (This invention) | 2.1 | 15.0 | ○ | 102 | 0.08 | ○ | ○Δ |
| 120 (This invention) | 2.1 | 15.2 | ○ | 101 | 0.08 | ○ | ○Δ |
| 121 (This invention) | 2.1 | 16.2 | ○ | 102 | 0.08 | ○ | ○Δ |
| 122 (Comparative Example) | 2.2 | 15.1 | ○ | 102 | 0.08 | Δ | ○ |
| 123 (Comparative Example) | 2.1 | 14.6 | ○ | 102 | 0.08 | Δ | Δ |
| 124 (This invention) | 2.0 | 16.0 | Δ | 102 | 0.08 | ○ | ○Δ |
| 125 (This invention) | 2.1 | 15.2 | Δ | 103 | 0.08 | ○ | ○Δ |
| 126 (This invention) | 1.9 | 15.6 | Δ | 012 | 0.08 | ○Δ | ○Δ |

TABLE 4

(continued from Table 3)

| Sample No. (Remarks) | Average specular reflectance (%) | Haze (%) | Pencil scratching test | Contact angle [°] | Dynamic friction coefficient | Steel wool scratch resistance | Wet-swab rubbing resistance |
|---|---|---|---|---|---|---|---|
| 127 (This invention) | 2.1 | 16.2 | Δ | 101 | 0.08 | ○Δ | ○Δ |
| 128 (This invention) | 2.0 | 15.5 | ○ | 102 | 0.08 | ⊙ | ⊙ |
| 129 (This invention) | 2.1 | 15.4 | ○ | 102 | 0.08 | ⊙ | ⊙ |
| 130 (This invention) | 2.0 | 16.0 | ○ | 102 | 0.07 | ○ | ○ |
| 131 (This invention) | 1.9 | 15.4 | ○ | 102 | 0.08 | ○ | ○ |
| 132 (This invention) | 2.1 | 15.5 | ○ | 101 | 0.08 | ○Δ | ○Δ |
| 133 (This invention) | 2.1 | 16.2 | ○ | 102 | 0.08 | ○ | ○ |
| 134 (This invention) | 2.0 | 15.1 | ○ | 101 | 0.08 | ○ | ○ |
| 135 (This invention) | 2.1 | 15.8 | ○ | 102 | 0.08 | ○ | ○ |
| 136 (This invention) | 2.2 | 15.9 | ○ | 102 | 0.08 | ○ | ⊙ |
| 137 (This invention) | 2.1 | 15.2 | ○ | 102 | 0.08 | ○ | ⊙ |
| 138 (This invention) | 2.1 | 15.6 | ○ | 102 | 0.09 | ○ | ⊙ |
| 139 (This invention) | 1.9 | 16.1 | ○ | 103 | 0.08 | ○ | ⊙ |
| 140 (This invention) | 2.1 | 15.2 | ○ | 102 | 0.08 | ○ | ⊙ |
| 141 (This invention) | 2.1 | 15.6 | ○ | 101 | 0.08 | ○ | ⊙ |
| 142 (This invention) | 2.0 | 16.0 | ○ | 102 | 0.08 | ○ | ⊙ |
| 143 (Comparative Example) | 2.1 | 15.3 | ○ | 103 | 0.08 | X | X |
| 144 (This invention) | 2.1 | 15.6 | ○ | 102 | 0.08 | ○ | ○ |
| 145 (Comparative Example) | 2.1 | 16.3 | ○ | 102 | 0.08 | X | X |
| 146 (This invention) | 1.9 | 15.3 | ○ | 103 | 0.07 | ○ | ○ |
| 147 (This invention) | 2.1 | 15.8 | ○ | 102 | 0.08 | ○ | ⊙ |
| 148 (This invention) | 2.0 | 16.0 | ○ | 102 | 0.08 | ○ | ⊙ |
| 149 (This invention) | 2.1 | 16.20 | ○ | 101 | 0.08 | ⊙ | ⊙ |
| 150 (Comparative Example) | 2.2 | 7.10 | Δ | 102 | 0.08 | Δ | Δ |
| 151 (This invention) | 2.1 | 16.0 | ○ | 102 | 0.08 | ○ | ⊙ |
| 152 (This invention) | 2.1 | 15.7 | ○ | 101 | 0.08 | ⊙ | ⊙ |

Next, antiglare antireflection polarizing plates were fabricated using the films of Samples 104, 106 to 110, 112, 114, 119 to 121, 124 to 142, 144, 146 to 149, 151 and 152 according to the present invention, as protective films for the polarizing layers in the polarizing plates. Then, liquid crystal display devices were fabricated using the polarizing plates in which the low refractive index layers in the antireflection films were arranged so as to be the outermost layers. The liquid crystal display devices each exhibited an excellent contrast because of less reflection of external light and gave less obtrusive reflected image due to antiglareness, so that they had excellent visibility.

Similarly, liquid crystal display devices were fabricated by assembling any of the above-mentioned samples according to the present invention, in combination with an optically compensatory film constituted by a polarizer, a transparent support and an optical anisotropic layer in which the orientation of a discotic liquid crystal was fixed, and a polarizing plate composed of a light scattering layer, and visibility of the resultant devices was evaluated. As a result, each device had excellent performance. That is, no reflection of external light was observed, excellent contrast was obtained, and the reflected image was not obtrusive due to antiglareness.

(Saponification Treatment of the Anti-reflection Films)

The above Samples 101 to 152 were subjected to the following processing.

A 1.5-mol/l aqueous solution of sodium hydroxide was prepared and kept at 50° C. Separately, a 0.005-mol/L diluted sulfuric acid aq. solution was prepared.

The previously-prepared anti-reflection film was soaked in the above-mentioned aqueous sodium hydroxide solution for 2 minutes, and then it was soaked in water to thoroughly wash away the aqueous sodium hydroxide solution. Subsequently, the film was soaked in the aqueous solution of dilute sulfuric acid for 1 minute, and then it was soaked in water to thoroughly wash away the dilute sulfuric acid aqueous solution. Thereafter, the anti-reflection film was sufficiently dried at 100° C.

In the above-mentioned manner, anti-reflection films subjected to sponification were prepared.

(11) Evaluation of Film Separation by Saponification Treatment

Separation of films during the saponification treatment was evaluated. 100 antireflection films were subjected to the saponification treatment. Whether there was separation of the films before and after the saponification treatment or not was observed with the naked eye, and the following 3-level evaluation was performed.

○: No separation was observed for all of 100 films.

Δ: Separation was observed for 5 or less films.

x: Separation was observed for more than 5 films.

(12) Evaluation of Crosscut Adhesion

A protective film (antireflection film) for a polarizing plate was moisture-conditioned under the conditions of a temperature of 25° C. and a relative humidity of 60% for 2 hours. On a surface on the side having the outermost layer of the protective film for a polarizing plate, 11 vertical lines and 11 horizontal lines were crosscut in a checkerboard-like manner with a cutter knife. Adhesion test on this surface was repeated three times on the same spot with a polyester pressure-sensitive tape (No. 31B) manufactured by Nitto Denko Corporation. Whether there was separation of the film or not was observed with the naked eye, and the following 3-level evaluation was performed.

○: No separation was observed for all of 100 squares.

Δ: Separation was observed for 2 or less squares.

x: Separation was observed for more than 2 squares.

Results of evaluations of separation and adhesion on the films subjected to the saponification are described.

In each sample according to the present invention, the evaluation of separation of the film by the saponification treatment was ○ and the evaluation of crosscut adhesion was also ○. In both evaluation tests, no separation of the film was observed.

Further, the samples according to the present invention were measured for the contact angle to water to the side opposite to the antiglare hard coat layer and the low-refractive-index layer via the support. As a result, the contact angle of water was in the range of 40° to 30° for each sample.

Example 2

Coating solutions 1A to 1N for antiglare hard coat layers and coating solutions A to O for low-refractive-index layers were coated in the same manner as in Example 1. The combinations of lamination were as described in Table 5.

TABLE 5

| Sample No. (Remarks) | Coating solution for antiglare hard coat layer | Coating solution for low refractive index layer |
|---|---|---|
| 201 (Comparative Example) | 1A | A |
| 202 (This invention) | 1B | A |
| 203 (This invention) | 1C | A |
| 204 (This invention) | 1D | A |
| 205 (This invention) | 1E | A |
| 206 (This invention) | 1B | B |
| 207 (This invention) | 1B | C |
| 208 (This invention) | 1B | D |
| 209 (This invention) | 1B | E |
| 210 (This invention) | 1B | F |
| 211 (This invention) | 1B | G |
| 212 (This invention) | 1B | H |
| 213 (This invention) | 1B | I |
| 214 (This invention) | 1C | D |
| 215 (This invention) | 1C | E |
| 216 (This invention) | 1C | F |
| 217 (This invention) | 1C | G |
| 218 (This invention) | 1C | H |
| 219 (This invention) | 1D | D |
| 220 (This invention) | 1D | E |
| 221 (This invention) | 1D | F |
| 222 (This invention) | 1D | G |
| 223 (This invention) | 1D | H |
| 224 (This invention) | 1E | D |
| 225 (This invention) | 1E | E |
| 226 (This invention) | 1E | F |
| 227 (This invention) | 1E | G |
| 228 (This invention) | 1E | H |
| 229 (This invention) | 1F | K |
| 230 (This invention) | 1G | K |
| 231 (This invention) | 1H | K |
| 232 (This invention) | 1I | K |
| 233 (This invention) | 1J | K |
| 234 (This invention) | 1K | K |
| 235 (This invention) | 1L | K |
| 236 (This invention) | 1M | K |
| 237 (This invention) | 1N | K |
| 238 (This invention) | 1G | H |
| 239 (This invention) | 1K | H |
| 240 (This invention) | 1M | H |
| 241 (This invention) | 1G | J |
| 242 (This invention) | 1K | J |
| 243 (This invention) | 1M | J |
| 244 (This invention) | 1G | L |
| 245 (This invention) | 1K | L |
| 246 (This invention) | 1M | L |
| 247 (This invention) | 1G | M |
| 248 (This invention) | 1K | M |
| 249 (This invention) | 1M | M |

TABLE 5-continued

| Sample No. (Remarks) | Coating solution for antiglare hard coat layer | Coating solution for low refractive index layer |
|---|---|---|
| 250 (This invention) | 1G | N |
| 251 (This invention) | 1G | O |

(Evaluation of the anti-refletion Films)

Samples 201 to 251 obtained were evaluated in the same manner as in Example 1.

In each of Samples 202 to 251 according to the present invention, the fingerprint adhesion was ◯, the anti-glare property was ◯, and the glistening was ◉, and the antireflection performance and pencil hardness (pencil scratching resistance) were also above the performance levels that are required for antiglare antireflection films.

The results of other evaluations are shown in Table 6.

It can be seen that Samples 202 to 251 according to the present invention had excellent steel wool scratch resistance and excellent cotton swab rubbing resistance, as compared with Sample 201 of Comparative Example, which is similar to Example 1. In particular, it can be seen that systems containing the compound according to the present invention in both the antiglare hard coat layer and the low-refractive-index layer had excellent scratch resistance performance. It is apparent that these results are attributable to the silane-based compounds according to the present invention contained in the system.

TABLE 6

| Sample No. (Remarks) | Average specular reflectance (%) | Haze (%) | Pencil scratching test | Contact angle [°] | Dynamic friction coefficient | Steel wool scratch resistance | Wet-swab rubbing resistance |
|---|---|---|---|---|---|---|---|
| 201 (Comparative Example) | 2.1 | 42.9 | △ | 102 | 0.08 | X | X |
| 202 (This invention) | 2.1 | 41.9 | ◯ | 101 | 0.08 | ◯ | ◯△ |
| 203 (This invention) | 2.0 | 43.1 | ◯ | 103 | 0.08 | ◯ | ◯△ |
| 204 (This invention) | 2.0 | 43.0 | ◯ | 102 | 0.08 | ◯ | ◯△ |
| 205 (This invention) | 1.9 | 42.6 | ◯ | 102 | 0.08 | ◯ | ◯△ |
| 206 (This invention) | 2.0 | 42.4 | ◯ | 103 | 0.08 | ◉ | ◉ |
| 207 (This invention) | 2.0 | 42.3 | ◯ | 102 | 0.08 | ◉ | ◉ |
| 208 (This invention) | 2.1 | 41.1 | ◯ | 101 | 0.08 | ◯ | ◯ |
| 209 (This invention) | 2.1 | 43.1 | ◯ | 102 | 0.08 | ◯ | ◯ |
| 210 (This invention) | 1.9 | 42.3 | ◯ | 102 | 0.08 | ◯ | ◯ |
| 211 (This invention) | 2.0 | 42.6 | ◯ | 103 | 0.07 | ◯ | ◯ |
| 212 (This invention) | 1.9 | 43.5 | ◯ | 101 | 0.08 | ◉ | ◉ |
| 213 (This invention) | 2.0 | 42.6 | ◯ | 100 | 0.08 | ◉ | ◉ |
| 214 (This invention) | 2.0 | 43.7 | ◯ | 100 | 0.08 | ◯ | ◯ |
| 215 (This invention) | 2.1 | 43.0 | ◯ | 102 | 0.08 | ◯ | ◯ |
| 216 (This invention) | 2.0 | 42.9 | ◯ | 101 | 0.08 | ◯ | ◯ |
| 217 (This invention) | 1.9 | 42.7 | ◯ | 102 | 0.07 | ◯ | ◯ |
| 218 (This invention) | 1.9 | 42.9 | ◯ | 102 | 0.08 | ◉ | ◉ |
| 219 (This invention) | 2.1 | 42.9 | ◯ | 102 | 0.08 | ◯ | ◯ |
| 220 (This invention) | 2.0 | 42.5 | ◯ | 101 | 0.07 | ◯ | ◯ |
| 221 (This invention) | 2.0 | 43.3 | ◯ | 103 | 0.08 | ◯ | ◯ |
| 222 (This invention) | 1.9 | 43.1 | ◯ | 102 | 0.08 | ◯ | ◯ |
| 223 (This invention) | 2.1 | 42.2 | ◯ | 102 | 0.08 | ◯ | ◯ |
| 224 (This invention) | 2.0 | 42.3 | ◯ | 103 | 0.08 | ◯△ | ◯△ |
| 225 (This invention) | 2.0 | 42.3 | ◯ | 102 | 0.08 | ◯△ | ◯△ |
| 226 (This invention) | 1.9 | 43.1 | ◯ | 103 | 0.08 | ◯△ | ◯△ |
| 227 (This invention) | 2.0 | 41.6 | ◯ | 101 | 0.08 | ◯△ | ◯△ |
| 228 (This invention) | 2.0 | 42.4 | ◯ | 101 | 0.07 | ◉ | ◉ |
| 229 (This invention) | 2.2 | 43.0 | ◯ | 102 | 0.08 | ◉ | ◉ |
| 230 (This invention) | 1.9 | 55.0 | ◯ | 101 | 0.08 | ◯ | ◯ |
| 231 (This invention) | 1.9 | 54.0 | ◯ | 101 | 0.08 | ◯ | ◯ |
| 232 (This invention) | 1.9 | 54.2 | ◯ | 101 | 0.08 | ◯ | ◯ |
| 233 (This invention) | 1.9 | 54.5 | ◯ | 102 | 0.08 | ◯ | ◯ |
| 234 (This invention) | 2.1 | 53.0 | ◯ | 103 | 0.08 | ◉ | ◉ |
| 235 (This invention) | 2.1 | 52.0 | ◯ | 101 | 0.08 | ◉ | ◉ |
| 236 (This invention) | 2.1 | 53.5 | ◯ | 103 | 0.08 | ◉ | ◉ |
| 237 (This invention) | 2.1 | 53.4 | ◯ | 102 | 0.08 | ◉ | ◉ |
| 238 (This invention) | 1.8 | 56.0 | ◯ | 102 | 0.07 | ◯ | ◯ |
| 239 (This invention) | 2.0 | 52.2 | ◯ | 101 | 0.07 | ◯△ | ◯△ |
| 240 (This invention) | 2.0 | 51.3 | ◯ | 101 | 0.07 | ◯△ | ◯△ |
| 241 (This invention) | 1.8 | 53.0 | ◯ | 103 | 0.08 | ◯ | ◯ |
| 242 (This invention) | 2.0 | 54.2 | ◯ | 103 | 0.08 | ◯△ | ◯△ |
| 243 (This invention) | 2.0 | 53.7 | ◯ | 102 | 0.08 | ◯△ | ◯△ |
| 244 (This invention) | 1.9 | 56.0 | ◯ | 102 | 0.08 | ◯ | ◯ |
| 245 (This invention) | 2.1 | 56.2 | ◯ | 102 | 0.08 | ◯ | ◯ |
| 246 (This invention) | 2.1 | 54.0 | ◯ | 102 | 0.08 | ◯ | ◯ |
| 247 (This invention) | 1.9 | 55.0 | ◯ | 103 | 0.08 | ◯ | ◯ |
| 248 (This invention) | 2.1 | 54.7 | ◯ | 102 | 0.08 | ◯△ | ◯△ |
| 249 (This invention) | 2.1 | 53.9 | ◯ | 101 | 0.07 | ◯△ | ◯△ |
| 250 (This invention) | 1.9 | 54.3 | ◯ | 102 | 0.08 | ◯ | ◯ |
| 251 (This invention) | 1.9 | 53.5 | ◯ | 102 | 0.08 | ◯ | ◯ |

Next, antiglare antireflection polarizing plates were fabricated using the films of Samples 202 to 251 according to the present invention in the same manner as in Example 1. Then, liquid crystal display devices were fabricated using the thus-prepared polarizing plates in which the low refractive index layers in the antireflection films were arranged so as to be the outermost layers. The liquid crystal display devices each exhibited an excellent contrast because of less reflection of external light and gave less obtrusive reflected image due to antiglareness, so that they had excellent visibility.

Similarly, liquid crystal display devices were fabricated, by using an elliptically polarizing plate utilizing a polarizer whose one side was adhered any of the above-mentioned samples according to the present invention and whose opposite side was adhered an optically compensatory film constituted by a transparent support and an optical anisotropic layer in which the orientation of a discotic liquid crystal was fixed. Then, the visibilities of the devices were evaluated. As a result, each device had excellent performance. That is, no reflection of external light was observed, excellent contrast was obtained, and the reflected image was not obtrusive due to antiglareness.

(Saponification Treatment of Antireflection Film)

Samples 202 to 251 as described above were subjected to the saponification treatment in the same manner as in Example 1.

Samples 202 to 251 subjected to the saponification treatment were evaluated for separation of the film due to the saponification treatment and crosscut adhesion in the same manner as in Example 1.

As a result, for each sample, neither separation of the film due to the saponification treatment nor separation of crosscut squares was observed.

Further, Samples 202 to 251 according to the present invention were measured for the contact angle of water to the side opposite to the antiglare hard coat layer and the low-refractive-index layer via the support. As a result, the contact angle of water was in the range of 40° to 30° for each sample.

Example 3

A PVA film was immersed in an aqueous solution of 2.0 g/l of iodine, and 4.0 g/l of potassium iodide at 25° C. for 240 seconds, and then in an aqueous solution of 10 g/l of boric acid at 25° C. for 60 seconds. Thereafter, this was introduced into a tenter stretching machine, in the form as shown in FIG. 2, from (Y), and stretched 5.3 times, and then the tenter was bent with respect to the stretching direction, as shown in FIG. 2, and from then the width was kept constant. The film was dried in an atmosphere at 80° C. and then it left the tenter. The difference in transportation speed between both horizontal tenter clips was less than 0.05%, and the angle between the center line 21 of the introduced film and the center line 22 of the film to be sent to a subsequent step was 46°. Here, |L1−L2| was 0.7 m, and W was 0.7 m. Thus, a relationship |L2−L1|=W was established. The substantial stretching direction Ax-Cx at the exit of the tenter was inclined at 45° with respect to the center line 22 of the film to be sent to a subsequent step. Neither wrinkle nor film deformation was observed at the exit of the tenter.

Figure 3:
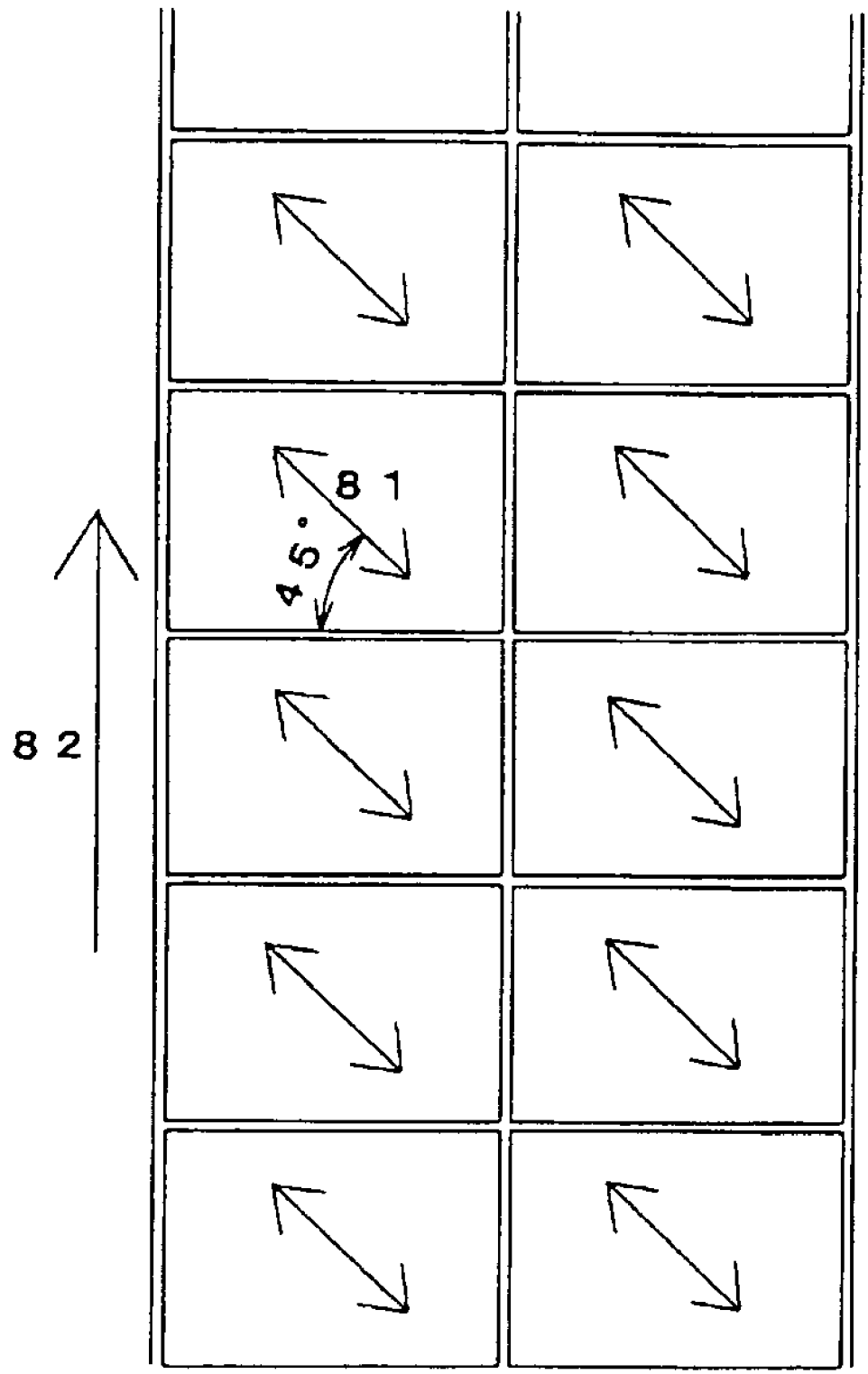
FIG. 3 is an explanatory diagram illustrating a method for cutting the polarizing plate according to Examples 3 and 13.

Further, the stretched PVA film thus obtained was laminated on a triacetylcellulose film (TD80U, trade name, manufactured by Fuji Photo Film Co., Ltd.) which was saponified with 3% aqueous solution of PVA (PVA-117H, trade name, manufactured by Kuraray Co., Ltd.) as an adhesive, and the resultant laminate was dried at 80° C., to obtain a polarizing plate having an effective width of 650 mm. The absorption axis direction of the obtained polarizing plate was inclined at 45° with respect to the longitudinal direction. The polarizing plate had a transmittance of 43.7% and a degree of polarization of 99.97% at 550 nm. Further, the polarizing plate was cut to a size of 310×233 mm as shown in FIG. 3, thus giving a polarizing plate having an area efficiency of 91.5% with the absorption axis being inclined at 45° with respect to the side. In FIG. 3, reference numeral 81 designates absorption axis (stretching axis), and reference numeral 82 designates the longitudinal direction of the film.

Next, polarizing plates with an antiglare antireflection film were fabricated by bonding the above polarizing plate to the saponification-treated film of one of Samples 104, 106 to 110, 112, 114, 119 to 121, 124 to 142, 144, 146 to 149, 151 and 152 according to the present invention prepared in Example 1 or one of Samples 202 to 251 according to the present invention prepared in Example 2. Then, liquid crystal display devices were fabricated using the polarizing plates in which the low refractive index layers in the antireflection films were arranged so as to be the outermost layers. The liquid crystal display devices each exhibited an excellent contrast because of less reflection of external light and gave less obtrusive reflected image due to antiglareness, so that they had excellent visibility.

Example 4

Polarizing plates with an antiglare antireflection film were fabricated in the same manner as in Example 3 described above, except that in the fabrication of the polarizing plate the absorption axis of which was inclined at 45°, the triacetyl cellulose film (TD80U, trade name, manufactured by Fuji Photo Film Co., Ltd.) was changed to any of the saponification-treated films of Samples 104, 106 to 110, 112, 114, 119 to 121, 124 to 142, 144, 146 to 149, 151 and 152 according to the present invention prepared in Example 1 or Samples 202 to 251 according to the present invention prepared in Example 2, to make the laminate. Then, liquid crystal display devices were fabricated using the polarizing plates in which the low refractive index layers in the antireflection films were arranged so as to be the outermost layers. The liquid crystal display devices, like those in Example 3, each exhibited an excellent contrast because of less reflection of external light and gave less obtrusive reflected image due to antiglareness, so that they had excellent visibility.

Example 5

Samples 104, 106 to 110, 112, 114, 119 to 121, 124 to 142, 144, 146 to 149, 151 and 152 according to the present invention prepared in Example 1 and Samples 202 to 251 according to the present invention prepared in Example 2 were immersed in an aqueous solution of 1.5 mol/l NaOH at 55° C. for 2 minutes, and then neutralized and washed with water, to perform saponification treatment of the triacetylcellulose surface on the back side of the film. Separately, an 80-μm thick triacetylcellulose film (TD80U, trade name, manufactured by Fuji Photo Film Co., Ltd.) was subjected to saponification treatment on the same condition as described above. Separately, polyvinyl alcohol was made to absorb iodine, followed by stretching, to fabricate a polarizer. Both surfaces of the thus-obtained polarizer were bonded with either any of the saponified sample films or the saponified triacetylcellulose film, respectively to protect the polarizer, thereby fabricating each polarizing plate. Using any of the polarizing plates thus fabricated, was changed a polarizing plate on the viewer side of a liquid crystal display device (having a polarization split film with a polarization screening layer D-BEF (trade name, manufactured by Sumitomo 3M Co., Ltd.) between a back light and liquid crystal cells) in a note-type personal computer having mounted thereon a transmission-type TN liquid crystal display device such that the low-refractive-index layer-side of the anti-reflection film would be outermost. As a result, the liquid crystal display devices each showed extremely low reflection of the background, thus providing display devices having a very high display quality.

Example 6

Any of Samples 104, 106 to 110, 112, 114, 119 to 121, 124 to 142, 144, 146 to 149, 151 and 152 according to the present invention prepared in Example 1 or any of Samples 202 to 251 according to the present invention prepared in Example 2 was bonded to a transmission-type TN liquid crystal cell, so that the low-refractive-index layer was positioned as the outermost layer. The liquid crystal cell had been provided, as a liquid-crystal-cell side protective film of a viewer side polarizing plate, and as a liquid-crystal-cell side protective film of a back-light side polarizing plate, with a view-angle-broadening film (wide View Film A 12B, trade name, manufactured by Fuji Photo Film Co., Ltd.) having an optical compensation layer. In the optical compensation layer, the disk plane of discotic structure units was inclined with respect to the plane of a transparent support of the optical compensation layer, and the angles between the disk plane of discotic structure units and the plane of the transparent support were varied in the direction of the depth of the optical anisotropic layer. Accordingly, liquid crystal display devices each having the above components were produced. The thus-produced liquid crystal display devices each had an excellent contrast in a light room, a very wide view angle in all directions, a very excellent visibility, and a high display quality.

Example 7

Any one of Samples 104, 106 to 110, 112, 114, 119 to 121, 124 to 142, 144, 146 to 149, 151 and 152 according to the present invention prepared in Example 1 and Samples 202 to 251 according to the present invention prepared in Example 2 was bonded, respectively, to a glass sheet on the surface of an organic EL display device with a pressure-sensitive adhesive such that the low-refractive-index layer was positioned as the outermost layer. The thus-provided display devices each exhibited suppressed reflection on the surface of the glass and had a high visibility.

Example 8

Using any of Samples 104, 106 to 110, 112, 114, 119 to 121, 124 to 142, 144, 146 to 149, 151 and 152 according to the present invention prepared in Example 1 and Samples 202 to 251 according to the present invention prepared in Example 2, polarizing plates having the antireflection film on one side were fabricated such that the low-refractive-index layer was positioned as the outermost layer. Each of the polarizing plates was laminated with a λ/4 sheet (PURE-ACE WR, trade name, manufactured by TEIJIN Ltd.) on the side opposite to the side having the antireflection film. Any one of the thus-obtained polarizing plates was bonded to a glass sheet on the surface of an organic EL display device such that the low-refractive-index layer was positioned as the outermost layer. The thus-provided display devices each had a reduced surface reflection and reflection from the inside of the surface glass and an extremely excellent visibility.

Example 9

10 g of any one of the sol solutions a-1 to a-7 and b-1 were charged in a 20-ml sample bottle, and stored at 40° C. for 2 months, respectively. The organosilane sol compositions a-1 to a-7 that can be preferably used in the present invention showed almost no change in viscosity and each remained transparent in the form of solution containing no precipitates. In contrast, the sol composition b-1 was entirely gelled, showing that the storage stability of the liquid was poor.

Example 10

40 parts by mass of a silica sol (MEK-ST, trade name, produced by Nissan Chemical Industries, Ltd., average particle diameter: 10 to 20 nm, solids content: 30%), 20 parts by mass of a monomer (KAYARAD DPCA-60, trade name, manufactured by Nippon Kayaku Co., Ltd.), 20 parts by mass of a sol solution (any one of sol solutions a-1 to a-8, b-1 to b-2, and c-1 to c-3), 2 parts by mass of a photopolymerization initiator (Irgacure 907, trade name, manufactured by Ciba-Geigy), and 0.2 part by mass of a photosensitizer (Kayacure-DETX, manufactured by Nippon Kayaku Co., Ltd.) were mixed, and the resultant mixture was coated on a glass sheet by a wire-bar coating method such that a dry thickness would be 20 μm.

After drying at 50° C. for 5 minutes, UV of an illuminance of 800 mW/cm$^2$ and a dose of 300 mJ/cm$^2$ was irradiated, by use of an air-cooled metal halide lamp of 160 W/cm (manufactured by Eyegraphics Co., Ltd.), to cure the coated layer.

The samples obtained were evaluated on the following items.

(1) Transparency

A transparent film is designated as "○", and a turbid film is designated as "x".

(2) Adhesion

Whether there was separation or not was observed with the naked eye, by a crosscut method, and the following 3-level evaluation was performed.

○: Substantially no separation was observed.

Δ: More than 10% but less than 50% separation was observed.

x: 50% or more separation was observed.

The results of evaluation are shown in Table 7.

TABLE 7

| Sample No. | Sol solution to be used | Transparency | Adhesion |
|---|---|---|---|
| 301 | a-1 | ○ | ○ |
| 302 | a-2 | ○ | ○ |
| 303 | a-3 | ○ | ○ |
| 304 | a-4 | ○ | ○ |
| 305 | a-5 | ○ | ○ |
| 306 | a-6 | ○ | ○ |
| 307 | a-7 | ○ | ○ |

TABLE 7-continued

| Sample No. | Sol solution to be used | Transparency | Adhesion |
|---|---|---|---|
| 308 | a-8 | ○ | ○ |
| 309 | b-1 | x | x |
| 310 | b-2 | ○ | Δ |
| 311 | c-1 | ○ | ○ |
| 312 | c-2 | ○ | ○ |
| 313 | c-3 | ○ | ○ |

It can be seen that Samples 301 to 308 and 311 to 313 are particularly excellent in both transparency and adhesion as compared with Samples 309 and 310.

Next, the materials that were used in the following examples are described.

(Preparation of Composition Including (a), (b) and (c) Contents)

In a reactor equipped with a stirrer and a reflux condenser, 100 mass parts of 3-acryloyloxypropyltrimethoxysilane (KBM 5103 (trade name); Shin-Etsu Chemical Co., Ltd.), 6 mass parts of diisopropoxyaluminum ethyl acetoacetate and 12 mass parts of i-propanol were charged and mixed. Then, 30 mass parts of ion-exchanged water was added thereto and the mixture was allowed to react at 60° C. for 4 hours. Thereafter, the reaction mixture was cooled to room temperature and 6 mass parts of acetylacetone was added thereto, to obtain d-1.

In the same manner as in the preparation of d-1, except that 3-acryloyloxypropyltrimethoxysilane was replaced by 3-glycidoxypropyltrimethoxysilane, d-2 was obtained.

In the same manner as in the preparation of d-1, except that 3-acryloyloxypropyltrimethoxysilane was replaced by 3-methacryloyloxypropyltrimethoxysilane, d-3 was obtained.

In the same manner as in the preparation of d-1, except that 3-acryloyloxypropyltrimethoxysilane was replaced by tetraethoxysilane, d-4 was obtained.

(Preparation of Coating Solution 2A for a Hardcoat Layer)

150 g of a mixture of dipentaerythritol pentaacrylate and dipentaerythritol hexaacrylate (trade name: DPHA, manufactured by Nippon Kayaku Co., Ltd.) was dissolved in 206 g of a mixed solvent of methyl ethyl ketone/cyclohexanone (50/50%). To the resulting solution were added 333 g of a dispersion of 30% silica sol in methyl ethyl ketone (MEK-ST (trade name), manufactured by Nissan Chemical Industries, Ltd.; average particle diameter, about 15 nm) and a solution obtained by dissolving 7.5 g of a photopolymerization initiator (trade name: Irgacure 907, manufactured by Ciba Geigy Co.) and 5.0 g of a photosensitizer (trade name: KAYACURE DETX, manufactured by Nippon Kayaku Co., Ltd.) in 49 g of methyl ethyl ketone.

(Preparation of Coating Solution 2B for a Hard Coat Layer)

347 g of a commercially available silica-containing UV curing type hard coat solution (DeSolite Z7526 (trade name, manufactured by JSR Corporation), having a solid content of 72%, a silica content of 38% and an average particle diameter of about 20 nm) was diluted with 403 g of a mixed solvent of methyl ethyl ketone/cyclohexanone=50/50(%).

(Preparation of Coating Solution 2C for a Hard Coat Layer)

500 g of a commercially available alumina-containing UV curing type hard coat solution (DeSolite Z7526 (trade name, manufactured by JSR Corporation) of which the inorganic fine-particles contained were modified; having a solid content of 50%, an alumina content of 50% and an average particle diameter of about 20 nm) was diluted with 250 g of a mixed solvent of methyl ethyl ketone/cyclohexanone=50/50(%).

(Preparation of Coating Solution 2D for a Hardcoat Layer)

250 g of a mixture of dipentaerythritol pentaacrylate and dipentaerythritol hexaacrylate (trade name: DPHA, manufactured by Nippon Kayaku Co., Ltd.) was dissolved in 439 g of a mixed solvent of methyl ethyl ketone/cyclohexanone (50/50%). To the resulting solution was added a solution obtained by dissolving 7.5 g of a photopolymerization initiator (trade name: Irgacure 907, manufacture by Ciba Geigy Co.) and 5.0 g of a photosensitizer (trade name: KAYACURE DETX, manufactured by Nippon Kayaku Co., Ltd.) in 49 g of methyl ethyl ketone.

(Preparation of Coating Solution 2E for a Hard Coat Layer)

To 330 g of a commercially available silica-containing UV curing type hard coat solution (DeSolite Z7526 (trade name, manufactured by JSR Corporation) having a solid content of 72%, a silica content of 38% and an average particle diameter of about 20 nm) was added 24 g of d-1. The resultant solution was diluted with 396 g of a mixed solvent of methyl ethyl ketone/cyclohexanone=50/50(%).

(Preparation of Coating Solution 2F for a Hard Coat Layer)

To 476 g of a commercially available alumina-containing UV curing type hard coat solution (DeSolite Z7526 (trade name, manufactured by JSR Corporation) of which the inorganic fine-particles contained were modified; having a solid content of 50%, an alumina content of 50% and an average particle diameter of about 20 nm) was added 24 g of d-1. The resultant solution was diluted with 250 g of a mixed solvent of methyl ethyl ketone/cyclohexanone=50/50 (%).

(Preparation of Coating Solution 2G for a Hard Coat Layer)

166 g of a mixture of dipentaerythritol pentaacrylate and dipentaerythritol hexaacrylate (DPHA (trade name), manufactured by Nippon Kayaku Co., Ltd.) was dissolved in 196 g of a mixed solvent of methyl ethyl ketone/cyclohexanone=50/50(%). To the obtained solution were added 238 g of a dispersion of 30% silica sol in methyl ethyl ketone (MEK-ST (trade name), manufactured by Nissan Chemical Industries, Ltd.; average particle diameter, about 15 nm) and 24 g of d-1. Then, a solution of 7.5 g of a photopolymerization initiator (Irgacure 907 (trade name), manufactured by Ciba-Geigy) and 5.0 g of a photosensitizer (Kayacure-DETX (trade name), manufactured by Nippon Kayaku Co., Ltd.) in 113 g of methyl ethyl ketone was added thereto.

(Preparation of Coating Solution 2A for an Antiglare Hard Coat Layer)

278 g of a commercially available zirconia-containing UV curing type hard coat solution (DeSolite Z7401, trade name, manufactured by JSR Corporation, having a solid content of 48%, a zirconia content of 71% and an average particle diameter of about 20 nm), 117 g of a mixture of dipentaerythritol pentaacrylate and dipentaerythritol hexaacrylate (DPHA (trade name), manufactured by Nippon Kayaku Co., Ltd.), and 7.5 g of a photopolymerization initiator (Irgacure 907 (trade name), manufactured by Ciba-Geigy) were diluted with 355 g of a mixed solvent of methyl ethyl ketone/cyclohexanone=50/50(%). A coating film obtained by applying this solution, and then curing the solution with UV irradiation, had a refractive index of 1.61.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare Coating solution 2A for an anti-glare hardcoat layer.

(Preparation of Coating Solution 2B for an Antiglare Hard Coat Layer)

521 g of a commercially available zirconia-containing UV curing type hard coat solution (DeSolite Z7401 (trade name), manufactured by JSR Corporation, having a solid content of 48%, a zirconia content of 71% and an average particle diameter of about 20 nm), and 7.5 g of a photopolymerization initiator (Irgacure 907 (trade name), manufactured by Ciba-Geigy) were diluted with 229 g of a mixed solvent of methyl ethyl ketone/cyclohexanone=50/50(%). A coating film obtained by applying this solution, and then curing the applied solution with UV irradiation, had a refractive index of 1.73.

To this solution was further added 10 g of benzoguanamine-formaldehyde resin particles having an average particle diameter of 2 μm (trade name: Epostar MS, manufactured by Nippon Shokubai Co., Ltd.) and the mixture was stirred with a high speed Disper at 5,000 rpm for 1 hour. After the dispersion, the resultant was filtered through a polypropylene filter having a pore diameter of 30 μm, to prepare Coating solution 2B for an antiglare hard coat layer.

(Preparation of Coating Solution 2C for an Antiglare Hard Coat Layer)

75 g of a mixture of dipentaerythritol pentaacrylate and dipentaerythritol hexaacrylate (DPHA (trade name), manufactured by Nippon Kayaku Co., Ltd.), 75 g of bis(4-methacryloylthiophenyl) sulfide (MPSMA, trade name, manufactured by Sumitomo Seika Chemicals Co., Ltd.), and 100 g of alumina particles having an average particle diameter of 33 nm (manufactured by C.I. Kasei Co., Ltd.) were dissolved in 439 g of a mixed solvent of methyl ethyl ketone/cyclohexanone=50/50(%). To the obtained solution was added a solution of 5.0 g of a photopolymerization initiator (Irgacure 907 (trade name), manufactured by Ciba-Geigy) and 3.0 g of a photosensitizer (Kayacure-DETX (trade name), manufactured by Nippon Kayaku Co., Ltd.) in 61 g of methyl ethyl ketone. A coating film obtained by applying this solution, and then curing the applied solution with UV irradiation, had a refractive index of 1.60.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare Coating solution 2C for an anti-glare hardcoat layer.

(Preparation of Coating Solution 2D for an Antiglare Hard Coat Layer)

75 g of a mixture of dipentaerythritol pentaacrylate and dipentaerythritol hexaacrylate (DPHA (trade name), manufactured by Nippon Kayaku Co., Ltd.), 75 g of bis(4-methacryloylthiophenyl) sulfide (MPSMA, trade name, manufactured by Sumitomo Seika Chemicals Co., Ltd.), and 100 g of alumina particles having an average particle diameter of 33 nm (manufactured by C.I. Kasei Co., Ltd.) were dissolved in 516 g of a mixed solvent of methyl ethyl ketone/cyclohexanone=50/50(%). To the obtained solution was added a solution of 25 g of d-1, 5.0 g of a photopolymerization initiator (Irgacure 907 (trade name), manufactured by Ciba-Geigy) and 3.0 g of a photosensitizer (Kayacure-DETX (trade name), manufactured by Nippon Kayaku Co., Ltd.) in 33 g of methyl ethyl ketone. A coating film obtained by applying this solution, and then curing the applied solution with UV irradiation, had a refractive index of 1.60.

To this solution was further added 10 g of crosslinkable polystyrene particles having an average particle diameter of 2 μm (trade name: SX-200H, manufactured by Soken Chemical & Engineering Co., Ltd.) and the mixture was stirred in a high speed Disper at 5,000 rpm for 1 hour. After the dispersion, the resultant was filtered through a polypropylene filter having a pore diameter of 30 μm, to prepare Coating solution 2D for an antiglare hard coat layer.

(Preparation of Coating Solution 2E for an Anti-glare Hardcoat Layer)

125 g of a mixture of dipentaerythritol pentaacrylate and dipentaerythritol hexaacrylate (trade name: DPHA, manufactured by Nippon Kayaku Co., Ltd.) and 125 g of bis(4-methacryloylthiophenyl)sulfide (trade name: MPSMA, manufactured by Sumitomo Seika Chemicals Co., Ltd.) were dissolved in 439 g of a mixed solvent of methyl ethyl ketone/cyclohexanone (50/50%). To the resulting solution was added a solution obtained by dissolving 5.0 g of a photopolymerization initiator (trade name: Irgacure 907, manufacture by Ciba Geigy Co.) and 3.0 g of a photosensitizer (trade name: KAYACURE DETX, manufactured by Nippon Kayaku Co., Ltd.) in 49 g of methyl ethyl ketone. A coating film obtained by applying this solution, and then curing the applied solution using ultraviolet rays, had a refractive index of 1.60.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare Coating solution 2E for an anti-glare hardcoat layer.

(Preparation of Coating Solution 2F for an Antiglare Hard Coat Layer)

195 g of a commercially available zirconia-containing UV curing type hard coat solution (DeSolite Z7401 (trade name, manufactured by JSR Corporation, having a solid content of 48%, a zirconia content of 71% and an average particle diameter of about 20 nm), 82 g of a mixture of dipentaerythritol pentaacrylate and dipentaerythritol hexaacrylate (DPHA (trade name), manufactured by Nippon Kayaku Co., Ltd.), 17.56 g of d-1, and 9.22 g of a photopolymerization initiator (Irgacure 907 (trade name), manufactured by Ciba-Geigy) were diluted with 297 g of a mixed solvent of methyl ethyl ketone/cyclohexanone=50/50(%). A coating film obtained by applying this solution, and then curing the solution with UV irradiation, had a refractive index of 1.59.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare Coating solution 2F for an anti-glare hardcoat layer.

(Preparation of Coating Solution 2G for an Antiglare Hard Coat Layer) 195 g of a commercially available zirconia-containing UV curing type hard coat solution (DeSolite Z7401, trade name, manufactured by JSR Corporation, having a solid content of 48%, a zirconia content of 71% and an average particle diameter of about 20 nm), 82 g of a mixture of dipentaerythritol pentaacrylate and dipentaerythritol hexaacrylate (DPHA (trade name), manufactured by Nippon Kayaku Co., Ltd.), 8.78 g of d-1, and 9 g of a photopolymerization initiator (Irgacure 907 (trade name), manufactured by Ciba-Geigy) were diluted with 292 g of a mixed solvent of methyl ethyl ketone/cyclohexanone=50/50 (%). A coating film obtained by applying this solution, and then curing the applied solution with UV irradiation, had a refractive index of 1.61.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare Coating solution 2G for an anti-glare hardcoat layer.

(Preparation of Coating Solution 2H for Anti-glare Hardcoat Layer)

Coating solution 2H for an anti-glare hardcoat layer was prepared in the same manner (including addition amounts) as the Coating solution 2G for an anti-glare hardcoat layer, except that d-1 was changed to d-2.

(Preparation of Coating Solution 2I for an Anti-glare Hardcoat Layer)

Coating solution 2I for an anti-glare hardcoat layer was prepared in the same manner (including addition amounts) as the Coating solution 2G for an anti-glare hardcoat layer, except that d-1 was changed to d-3.

(Preparation of Coating Solution 2J for an Anti-glare Hardcoat Layer)

Coating solution 2J for an anti-glare hardcoat layer was prepared in the same manner (including addition amounts) as the Coating solution 2G for an anti-glare hardcoat layer, except that d-1 was changed to d-4.

(Preparation of Coating Solution 2K for an Antiglare Hard Coat Layer)

91 g of a mixture of dipentaerythritol pentaacrylate and dipentaerythritol hexaacrylate (DPHA (trade name), manufactured by Nippon Kayaku Co., Ltd.) and 218 g of a zirconium oxide superfine particle (particle diameter: about 30 nm) dispersion-containing hard coat solution (DeSolite Z-7401 (trade name, manufactured by JSR Corporation) were dissolved in 52 g of a mixed solvent of methyl ethyl ketone/cyclohexanone=54/46 mass (%). To the obtained solution was added 10 g of a photopolymerization initiator (Irgacure 907 (trade name), manufactured by Ciba Fine Chemical Co., Ltd.) and the mixed solution was stirred until dissolution. Then, 0.93 g of a fluorine-containing surfactant composed of a methyl ethyl ketone solution of 20 mass % fluorine-containing oligomer (Megafac F-176, trade name, manufactured by Dai-Nippon Ink and Chemicals, Ltd.) was added thereto. A coating film obtained by applying this solution, and then curing the applied solution with UV irradiation, had a refractive index of 1.61.

20 g of crosslinkable polystyrene particles (trade name: SX-200HS, manufactured by Soken Chemical & Engineering Co., Ltd.) having a number average particle diameter of 1.99 μm and a standard deviation of particle diameter of 0.32 μm (16% of the number average particle diameter) was added to 80 g of a mixed solvent of methyl ethyl ketone/cyclohexanone (54/46% by mass), and the resultant mixture was stirred for one hour using a high speed disperser at 5000 rpm for dispersing. Thereafter, the thus-obtained dispersion was subjected to filtration using polypropylene filters having a pore diameter of 10 μm, 3 μm, and 1 μm, (respectively, PPE-10, PPE-03, and PPE-01, trade names, manufactured by Fuji Photo Film Co., Ltd.). 29 g of the resulted dispersion was added to the above-prepared solution. After stirring, this mixture was filtrated with a polypropylene filter having a pore diameter of 30 μm, to obtain Coating solution 2K for an anti-glare hardcoat layer.

(Preparation of Coating Solution 2L for an Antiglare Hard Coat Layer)

82 g of a mixture of dipentaerythritol pentaacrylate and dipentaerythritol hexaacrylate (DPHA (trade name), manufactured by Nippon Kayaku Co., Ltd.), 196 g of a zirconium oxide superfine particle (particle diameter: about 30 nm) dispersion-containing hard coat solution (DeSolite Z-7401, trade name, manufactured by JSR Corporation) and 17.6 g of d-1 were dissolved in 262 g of a mixed solvent of methyl ethyl ketone/cyclohexanone=54/46 mass %. To the obtained solution was added 10 g of a photopolymerization initiator (Irgacure 907 (trade name), manufactured by Ciba Fine Chemical Co., Ltd.) and the mixed solution was stirred until dissolution. Then, 0.93 g of a fluorine-containing surfactant composed of a methyl ethyl ketone solution of 20 mass % fluorine-containing oligomer (Megafac F-176, trade name, manufactured by Dai-Nippon Ink and Chemicals, Ltd.) was added thereto. A coating film obtained by applying this solution, and then curing the applied solution with UV irradiation, had a refractive index of 1.61.

20 g of crosslinkable polystyrene particles (trade name: SX-200HS, manufactured by Soken Chemical & Engineering Co., Ltd.) having a number average particle diameter of 1.99 μm and a standard deviation of particle diameter of 0.32 μm (16% of the number average particle diameter) was added to 80 g of a mixed solvent of methyl ethyl ketone/cyclohexanone (54/46% by mass), and the resultant mixture was stirred for one hour using a high speed disperser at 5000 rpm for dispersing. Thereafter, the thus-obtained dispersion was subjected to filtration using polypropylene filters having a pore diameter of 10 μm, 3 μm, and 1 μm, (respectively, PPE-10, PPE-03, and PPE-01, trade names, manufactured by Fuji Photo Film Co., Ltd.). 29 g of the resulted dispersion was added to the above-prepared solution. After stirring, this mixture was filtrated with a polypropylene filter having a pore diameter of 30 μm, to obtain Coating solution 2L for an anti-glare hardcoat layer.

(Preparation of Coating Solution 2M for an Anti-glare Hardcoat Layer)

Coating solution 2M for an anti-glare hardcoat layer was prepared in the same manner as the Coating solution 2K for an anti-glare hardcoat layer, except that the fluorine-containing surfactant was changed to a silicon-series surfactant (Silicon X-22-945, trade name, manufactured by Shin-Etsu Chemical Co., Ltd.).

(Preparation of Coating Solution 2N for an Anti-glare Hardcoat Layer)

Coating solution 2N for an anti-glare hardcoat layer was prepared in the same manner as the Coating solution 2L for an anti-glare hardcoat layer, except that the fluorine-containing surfactant was changed to a silicon-series surfactant (Silicon X-22-945, trade name, manufactured by Shin-Etsu Chemical Co., Ltd.).

(Preparation of Coating Solution 3A for an Antiglare Hard Coat Layer)

272 g of a solvent composition modified product of a commercially available silica-containing UV curing type hard coat solution (DeSolite Z7526 (trade name, manufactured by JSR Corporation), having a solid content of about 72%, a $SiO_2$ content in the solids of about 38%, containing polymerization monomer and polymerization initiator) was diluted with 26.2 g of methyl isobutyl ketone. A coating film obtained by applying this solution and then curing the applied solution with UV irradiation, had a refractive index of 1.51.

To this solution were further added 44 g of a dispersion obtained by dispersing a 25% methyl isobutyl ketone dispersion of crosslinkable polystyrene particles having an average particle diameter of 3.5 μm (trade name: SX-350H, manufactured by Soken Chemical & Engineering Co., Ltd.) with a Polytron disperser at 10,000 rpm for 30 minutes and then 57.8 g of a dispersion obtained by dispersing a 25% methyl isobutyl ketone dispersion of crosslinkable polystyrene particles having an average particle diameter of 5 μm (trade name: SX-500H, manufactured by Soken Chemical & Engineering Co., Ltd.) with a Polytron disperser at 10,000 rpm for 30 minutes.

The above-mentioned mixture was filtered through a polypropylene filter having a pore diameter of 30 μm, to prepare Coating solution 3A for an antiglare hard coat layer.

(Preparation of Coating Solution 3B for an Antiglare Hard Coat Layer)

17.64 g of d-1 was added to 245 g of a solvent composition modified product of a commercially available silica-containing UV curing type hard coat solution (DeSolite Z7526 (trade name, manufactured by JSR Corporation), having a solid content of about 72%, a $SiO_2$ content in the solids of about 38%, containing polymerization monomer and polymerization initiator), and the mixture was diluted with 235 g of methyl isobutyl ketone. A coating film obtained by applying this solution and then curing the applied solution with UV irradiation, had a refractive index of 1.51.

To this solution were further added 44 g of a dispersion obtained by dispersing a 25% methyl isobutyl ketone dispersion of crosslinkable polystyrene particles having an average particle diameter of 3.5 μm (trade name: SX-350H, manufactured by Soken Chemical & Engineering Co., Ltd.) with a Polytron disperser at 10,000 rpm for 30 minutes and then 57.8 g of a dispersion obtained by dispersing a 25% methyl isobutyl ketone dispersion of crosslinkable polystyrene particles having an average particle diameter of 5 μm (trade name: SX-500H, manufactured by Soken Chemical & Engineering Co., Ltd.) with a Polytron disperser at 10,000 rpm for 30 minutes.

The above-mentioned mixture was filtered through a polypropylene filter having a pore diameter of 30 μm, to prepare Coating solution 3B for an antiglare hard coat layer.

(Preparation of Coating Solution 3C for an Anti-glare Hardcoat Layer)

Coating solution 3C for an anti-glare hardcoat layer was prepared in the same manner (including addition amounts) as the Coating solution 3B for an anti-glare hardcoat layer, except that d-1 was changed to d-2.

(Preparation of Coating Solution 3D for an Anti-glare Hardcoat Layer)

Coating solution 3D for an anti-glare hardcoat layer was prepared in the same manner (including addition amounts) as the Coating solution 3B for an anti-glare hardcoat layer, except that d-1 was changed to d-4.

(Preparation of Coating Solution 3E for an Anti-glare Hardcoat Layer)

Coating solution 3E for an anti-glare hardcoat layer was prepared in the same manner (including addition amounts) as the Coating solution 3B for an anti-glare hardcoat layer, except that d-1 was changed to d-3.

(Preparation of Coating Solution 2A for a Low-refractive-index Layer)

To 177 g of a thermally crosslinkable fluorine-containing polymer having a refractive index of 1.42 (JN-7228, trade name, solids content: 6%, manufactured by JSR Corporation) were added 15.2 g of silica sol (MEK-ST (trade name), average particle diameter: 10 to 20 nm, solids content: 30%, manufactured by Nissan Chemical Industries, Ltd.), 116 g of methyl ethyl ketone, and 9.0 g of cyclohexanone. After stirring, the mixture was filtered through a polypropylene filter having a pore diameter of 1 μm, to prepare Coating solution 2A for a low-refractive-index layer.

(Preparation of Coating Solution 2B for a Low-refractive-index Layer)

To 15.2 g of the perfluoroolefin copolymer (1) were added 0.3 g of a reactive silicone X-22-164B (trade name; manufactured by Shin-Etsu Chemical Co., Ltd.), 0.76 g of a photopolymerization initiator (Irgacure 907, trade name, manufactured by Chiba-Geigy), 293 g of methyl ethyl ketone, and 9.0 g of cyclohexanone. After stirring, the mixture was filtered through a polypropylene filter having a pore diameter of 5 μm, to prepare Coating solution 2B for a low-refractive-index layer.

(Preparation of Coating Solution 2C for a Low-refractive-index Layer)

To 15.2 g of the perfluoroolefin copolymer (2) were added 0.3 g of a reactive silicone X-22-169AS (trade name; manufactured by Shin-Etsu Chemical Co., Ltd.), 1.52 g of a photopolymerization initiator (UVI6990, trade name, manufactured by Union Carbide Corporation), 293 g of methyl ethyl ketone, and 9.0 g of cyclohexanone. After stirring, the mixture was filtered through a polypropylene filter having a pore diameter of 5 μm, to prepare Coating solution 2C for a low-refractive-index layer.

(Preparation of Coating Solution 2D for a Low-refractive-index Layer)

To 177 g of a thermally crosslinkable fluorine-containing polymer having a refractive index of 1.42 (JN-7228, trade name, solids content: 6%, manufactured by JSR Corporation) were added 15.2 g of silica sol (MEK-ST (trade name), average particle diameter: 10 to 20 nm, solids content: 30%, manufactured by Nissan Chemical Industries, Ltd.), 1.45 g of d-1, 95 g of methyl ethyl ketone, and 9.0 g of cyclohexanone. After stirring, the mixture was filtered through a polypropylene filter having a pore diameter of 1 μm, to prepare Coating solution 2D for a low-refractive-index layer.

(Preparation of Coating Solution 2E for a Low-refractive-index Layer)

Coating solution 2E for a low-refractive-index layer was prepared in the same manner (including addition amounts) as the Coating solution 2D for a low-refractive-index layer, except that d-1 was changed to d-2.

(Preparation of Coating Solution 2F for a Low-refractive-index Layer)

Coating solution 2F for a low-refractive-index layer was prepared in the same manner (including addition amounts) as the Coating solution 2D for a low-refractive-index layer, except that d-1 was changed to d-3.

(Preparation of Coating Solution 2G for a Low-refractive-index Layer)

Coating solution 2G for a low-refractive-index layer was prepared in the same manner (including addition amounts) as the Coating solution 2D for a low-refractive-index layer, except that d-1 was changed to d-4.

(Preparation of Coating Solution 2H for a Low-refractive-index Layer)

To 15.2 g of the perfluoroolefin copolymer (1) were added 0.3 g of a reactive silicone X-22-164B (trade name; manufactured by Shin-Etsu Chemical Co., Ltd.), 1.45 g of d-1, 0.76 g of a photopolymerization initiator (Irgacure 907, trade name, manufactured by Ciba-Geigy), 306 g of methyl ethyl ketone, and 9.0 g of cyclohexanone. After stirring, the mixture was filtered through a polypropylene filter having a pore diameter of 5 μm, to prepare Coating solution 2H for a low-refractive-index layer.

(Preparation of Coating Solution 2I for a Low-refractive-index Layer)

To 15.2 g of the perfluoroolefin copolymer (2) were added 0.3 g of a reactive silicone X-22-169AS (trade name; manufactured by Shin-Etsu Chemical Co., Ltd.), 1.45 g of d-2, 1.52 g of a photopolymerization initiator (UVI6990, trade name, manufactured by Union Carbide Corporation), 293 g of methyl ethyl ketone, and 9.0 g of cyclohexanone. After stirring, the mixture was filtered through a polypropylene filter having a pore diameter of 5 μm, to prepare Coating solution 2I for a low-refractive-index layer.

The low-refractive-index layers formed from the above-mentioned coating solutions 2A to 2I for low-refractive-index layers had refractive indices in the range of 1.38 to 1.49.

Example 11

Hard coat layers 2A to 2G, antiglare hard coat layers 2A to 2N, and low-refractive-index layers 2A to 2I were coated on substrates as described below, to obtain antireflection film samples. Combinations of layers laminated were as described in Tables 8 and 9.

(1) Coating of a Hard Coat Layer

A 80-μm thick triacetylcellulose film (TD80U, trade name, manufactured by Fuji Photo Film Co., Ltd.) in the form of a roll was unwound, on which any of the above-mentioned coating solutions for hard coat layers was coated by use of a micro gravure roll of 50 mm in diameter having a gravure pattern with a line number of 180 lines/inch and a depth of 40 μm and a doctor blade under the conditions of a gravure roll rotation number of 30 rpm and a conveying speed of 10 m/minute, and dried at 120° C. for 2 minutes. Thereafter, UV of an illuminance of 400 mW/cm$^2$ and a dose of 300 mJ/cm$^2$ was irradiated by use of an air-cooled metal halide lamp of 160 W/cm (manufactured by Eyegraphics Co., Ltd.) under nitrogen purge to an oxygen concentration of 0.1% or less, to cure the coating layer. Thus, a hard coat layer with a thickness of 2.5 μm was formed on the film, which was then wound up.

(2) Coating of an Antiglare Hard Coat Layer

The triacetylcellulose film on which the hard coat layer was coated was unwound again and any of the above-mentioned coating solutions for antiglare hard coat layers was coated by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 5 m/minute, and dried at 120° C. for 4 minutes. Thereafter, UV of an illuminance of 400 mW/cm$^2$ and dose of 300 mJ/cm$^2$ was irradiated by use of an air-cooled metal halide lamp of 160 W/cm (manufactured by Eyegraphics Co., Ltd.) under nitrogen purge, to cure the coating layer. Thus, an antiglare hard coat layer with a thickness of 2.5 μm was formed on the film, which was then wound up.

(3) Coating of a Low-refractive-index Layer

The triacetylcellulose film on which the hard coat layer and the antiglare hard coat layer were coated was unwound again and any of the above-mentioned coating solutions for low-refractive-index layers was coated by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 10 m/minute, and dried at 80° C. for 2 minutes. Thereafter, UV of an illuminance of 400 mW/cm$^2$ and dose of 600 mJ/cm$^2$ was irradiated by use of an air-cooled metal halide lamp of 240 W/cm (manufactured by Eyegraphics Co., Ltd.) under nitrogen purge. The coating was dried at 140° C. for 10 minutes, to form a low-refractive-index layer with a thickness of 0.096 μm on the film, which was then wound up.

TABLE 8

| Sample No. (Remarks) | Coating solution for hard coat layer | Coating solution for antiglare hard coat layer | Coating solution for low refractive index layer |
|---|---|---|---|
| 1101 (Comparative Example) | None | 2A | 2A |
| 1102 (Comparative Example) | None | 2B | 2A |
| 1103 (Comparative Example) | None | 2C | 2A |
| 1104 (This invention) | None | 2D | 2A |
| 1105 (Comparative Example) | None | 2E | 2A |
| 1106 (This invention) | None | 2F | 2A |
| 1107 (This invention) | None | 2G | 2A |
| 1108 (This invention) | None | 2H | 2A |
| 1109 (This invention) | None | 2I | 2A |
| 1110 (This invention) | None | 2J | 2A |
| 1111 (Comparative Example) | None | 2K | 2A |
| 1112 (This invention) | None | 2L | 2A |
| 1113 (Comparative Example) | None | 2M | 2A |
| 1114 (This invention) | None | 2N | 2A |
| 1115 (Comparative Example) | 2A | 2A | 2A |
| 1116 (Comparative Example) | 2B | 2A | 2A |
| 1117 (Comparative Example) | 2C | 2A | 2A |
| 1118 (Comparative Example) | 2D | 2A | 2A |
| 1119 (This invention) | 2E | 2A | 2A |
| 1120 (This invention) | 2F | 2A | 2A |
| 1121 (This invention) | 2G | 2A | 2A |
| 1122 (Comparative Example) | 2B | 2A | 2B |
| 1123 (Comparative Example) | 2B | 2A | 2C |
| 1124 (This invention) | 2B | 2A | 2D |
| 1125 (This invention) | 2B | 2A | 2E |
| 1126 (This invention) | 2B | 2A | 2F |

TABLE 9

(continued from Table 8)

| Sample No. (Remarks) | Coating solution for hard coat layer | Coating solution for antiglare hard coat layer | Coating solution for low refractive index layer |
|---|---|---|---|
| 1127 (This invention) | 2B | 2A | 2G |
| 1128 (This invention) | 2B | 2A | 2H |
| 1129 (This invention) | 2B | 2A | 2I |
| 1130 (This invention) | 2E | 2A | 2D |
| 1131 (This invention) | 2E | 2A | 2E |
| 1132 (This invention) | 2E | 2A | 2F |
| 1133 (This invention) | 2E | 2F | 2A |
| 1134 (This invention) | 2E | 2G | 2A |
| 1135 (This invention) | 2E | 2H | 2A |
| 1136 (This invention) | 2E | 2G | 2D |
| 1137 (This invention) | 2E | 2G | 2E |
| 1138 (This invention) | 2B | 2F | 2D |
| 1139 (This invention) | 2B | 2G | 2D |
| 1140 (This invention) | 2B | 2G | 2E |
| 1141 (This invention) | 2B | 2H | 2F |
| 1142 (This invention) | 2B | 2J | 2H |
| 1143 (Comparative Example) | 2B | 2K | 2A |
| 1144 (This invention) | 2B | 2L | 2A |
| 1145 (Comparative Example) | 2B | 2M | 2A |
| 1146 (This invention) | 2B | 2N | 2A |
| 1147 (This invention) | None | 2G | 2D |
| 1148 (This invention) | None | 2G | 2E |
| 1149 (This invention) | None | 2G | 2H |
| 1150 (Comparative Example) | 2D | 2E | 2C |
| 1151 (This invention) | 2E | 2G | 2D |
| 1152 (This invention) | 2E | 2J | 2H |

For samples extracted from among the above-mentioned samples and were at the step coated with up to the antiglare hard coat layer, surface energy, and peak ratio F/C, i.e., a ratio of the peak originated from a fluorine atom to the peak originated from a carbon atom, or peak ratio Si/C, i.e., a ratio of the peak originated from silicon atom to the peak originated from a carbon atom, as measured by X-ray photoelectron spectroscopy are shown below. Note that the surface energy of the antiglare hard coat layers was obtained by measuring the contact angles to pure water and of diiodomethane and making calculation by introducing the measured values into the Owens surface energy calculation equations.

Sample 1116 Surface energy: 22 mN·m$^{-1}$, F/C: 0.53

Sample 1143 Surface energy: 31 mN·m$^{-1}$, F/C: 0.28

Sample 1144 Surface energy: 33 mN·m$^{-1}$, F/C: 0.27

Sample 1145 Surface energy: 29 mN·m$^{-1}$, Si/C: 0.12

Sample 1146 Surface energy: 30 mN·m$^{-1}$, Si/C: 0.11

(Evaluation of Anti-reflection Films)

The resultant films were evaluated on the following items, in the same manner as in Example 1. The items were: (1) average reflectance, (2) haze, (3) pencil hardness, (4) contact angle and fingerprint adhesion, (5) dynamic friction coefficient, (6) antiglare property, (7) glistening, (8) steel wool scratch resistance, (9) wet-swab rubbing resistance, and (10) coating surface unevenness.

For all the samples according to the present invention among the above-mentioned samples, fingerprint adhesion was ◯, the antiglare property was ⊚, and the glistening was ◯. The antireflection property and pencil hardness were above the performance levels required for antiglare antireflection films.

Further, the number(s) of surface unevennesses were counted for Samples 1116, 1143 to 1146.

| Sample | |
|---|---|
| Sample 1116 | 9/m$^2$ |
| Sample 1143 | 3/m$^2$ |
| Sample 1144 | 0/m$^2$ |
| Sample 1145 | 3/m$^2$ |
| Sample 1146 | 1/m$^2$ |

As a result, it was confirmed that inclusion of the fluorine-series surfactant in the antiglare hard coat layer resulted in the effect of reducing coating surface unevenness.

Results of the other evaluations are shown in Tables 10 and 11.

It can be seen that Samples 1104, 1106 to 1110, 1112, 1114, 1119 to 1121, 1124 to 1142, 1144, 1146 to 1149, 1151 and 1152 according to the present invention exhibited excellent steel wool scratch resistance and excellent cotton swab rubbing resistance performance, as compared with Comparative Samples 1101 to 1103, 1105, 1111, 1113, 1115 to 1118, 1122, 1123, 1143 1145, and 1150. In particular, it can be seen that systems containing the compound according to the present invention in both the antiglare hard coat layer and the low-refractive-index layer had excellent scratch resistance performance. It is apparent that these results are attributable to the silane-series compounds according to the present invention contained in the system.

TABLE 10

| Sample No. (Remarks) | Average reflectance (%) | Haze (%) | Pencil hardness | Contact angle (°) | Dynamic friction coefficient | Steel wool scratch resistance | Swab rubbing resistance |
|---|---|---|---|---|---|---|---|
| 1101 (Comparative Example) | 2.1 | 12.2 | ◯ | 102 | 0.08 | X | X |
| 1102 (Comparative Example) | 2.1 | 12.6 | ◯ | 102 | 0.07 | X | X |
| 1103 (Comparative Example) | 2.1 | 13.2 | ◯ | 103 | 0.08 | X | X |
| 1104 (This invention) | 2.0 | 11.6 | ◯ | 102 | 0.08 | ◯ | ◯ |
| 1105 (Comparative Example) | 2.2 | 12.8 | Δ | 102 | 0.08 | X | X |
| 1106 (This invention) | 2.0 | 13.0 | ◯ | 102 | 0.08 | ◯ | ◯ |
| 1107 (This invention) | 2.1 | 13.2 | ◯ | 102 | 0.08 | ◯ | ◯ |
| 1108 (This invention) | 1.9 | 13.3 | ◯ | 101 | 0.08 | ◯Δ | ◯Δ |
| 1109 (This invention) | 2.1 | 12.2 | ◯ | 102 | 0.08 | ◯Δ | ◯ |
| 1110 (This invention) | 1.9 | 13.1 | ◯ | 102 | 0.08 | ◯ | ◯Δ |
| 1111 (Comparative Example) | 2.1 | 12.8 | ◯ | 102 | 0.08 | X | X |
| 1112 (This invention) | 2.0 | 13.0 | ◯ | 101 | 0.08 | ◯ | ◯ |
| 1113 (Comparative Example) | 2.1 | 12.2 | ◯ | 100 | 0.08 | X | X |
| 1114 (This invention) | 2.1 | 12.5 | ◯ | 100 | 0.08 | ◯ | ◯ |

TABLE 10-continued

| Sample No. (Remarks) | Average reflectance (%) | Haze (%) | Pencil hardness | Contact angle (°) | Dynamic friction coefficient | Steel wool scratch resistance | Swab rubbing resistance |
|---|---|---|---|---|---|---|---|
| 1115 (Comparative Example) | 2.1 | 16.2 | ○ | 102 | 0.08 | X | X |
| 1116 (Comparative Example) | 2.0 | 15.1 | ○ | 102 | 0.08 | X | X |
| 1117 (Comparative Example) | 2.1 | 15.8 | ○ | 102 | 0.08 | X | X |
| 1118 (Comparative Example) | 2.2 | 14.0 | △ | 102 | 0.07 | X | X |
| 1119 (This invention) | 2.1 | 15.2 | ○ | 102 | 0.08 | ○ | ○ |
| 1120 (This invention) | 2.1 | 15.6 | ○ | 101 | 0.08 | ○ | ○ |
| 1121 (This invention) | 2.1 | 16.2 | ○ | 102 | 0.08 | ○ | ○ |
| 1122 (Comparative Example) | 2.2 | 15.1 | ○ | 102 | 0.08 | △ | ○ |
| 1123 (Comparative Example) | 2.1 | 14.6 | ○ | 102 | 0.08 | △ | X△ |
| 1124 (This invention) | 2.0 | 16.2 | △ | 102 | 0.08 | ○ | ○ |
| 1125 (This invention) | 2.1 | 15.2 | △ | 103 | 0.08 | ○ | ○△ |
| 1126 (This invention) | 1.9 | 15.6 | △ | 012 | 0.08 | ○△ | ○△ |

TABLE 11

(continued from Table 10)

| Sample No. (Remarks) | Average reflectance (%) | Haze (%) | Pencil hardness | Contact angle (°) | Dynamic friction coefficient | Steel wool scratch resistance | Swab rubbing resistance |
|---|---|---|---|---|---|---|---|
| 1127 (This invention) | 2.1 | 16.2 | △ | 101 | 0.08 | ○△ | ○△ |
| 1128 (This invention) | 2.0 | 15.5 | ○ | 102 | 0.08 | ⊚ | ⊚ |
| 1129 (This invention) | 2.1 | 15.8 | ○ | 102 | 0.08 | ⊚ | ⊚ |
| 1130 (This invention) | 2.0 | 16.0 | ○ | 102 | 0.07 | ○ | ○ |
| 1131 (This invention) | 1.9 | 15.2 | ○ | 102 | 0.08 | ○ | ○ |
| 1132 (This invention) | 2.1 | 15.5 | ○ | 101 | 0.08 | ○△ | ○△ |
| 1133 (This invention) | 2.1 | 16.2 | ○ | 102 | 0.08 | ○ | ○ |
| 1134 (This invention) | 2.0 | 15.1 | ○ | 101 | 0.08 | ○ | ○ |
| 1135 (This invention) | 2.1 | 15.8 | ○ | 102 | 0.08 | ○ | ○ |
| 1136 (This invention) | 2.2 | 16.1 | ○ | 102 | 0.08 | ⊚ | ⊚ |
| 1137 (This invention) | 2.1 | 15.2 | ○ | 102 | 0.08 | ⊚ | ⊚ |
| 1138 (This invention) | 2.1 | 15.6 | ○ | 102 | 0.09 | ⊚ | ⊚ |
| 1139 (This invention) | 1.9 | 16.2 | ○ | 103 | 0.08 | ⊚ | ⊚ |
| 1140 (This invention) | 2.1 | 15.2 | ○ | 102 | 0.08 | ⊚ | ⊚ |
| 1141 (This invention) | 2.1 | 15.8 | ○ | 101 | 0.08 | ⊚ | ⊚ |
| 1142 (This invention) | 2.0 | 16.0 | ○ | 102 | 0.08 | ⊚ | ⊚ |
| 1143 (Comparative Example) | 2.1 | 15.4 | ○ | 103 | 0.08 | X | X |
| 1144 (This invention) | 2.1 | 15.6 | ○ | 102 | 0.08 | ○ | ○ |
| 1145 (Comparative Example) | 2.1 | 16.3 | ○ | 102 | 0.08 | X | X |
| 1146 (This invention) | 1.9 | 15.1 | ○ | 103 | 0.07 | ○ | ○ |
| 1147 (This invention) | 2.1 | 15.8 | ○ | 102 | 0.08 | ⊚ | ⊚ |
| 1148 (This invention) | 2.0 | 16.0 | ○ | 102 | 0.08 | ⊚ | ⊚ |
| 1149 (This invention) | 2.1 | 16.2 | ○ | 101 | 0.08 | ⊚ | ⊚ |
| 1150 (Comparative Example) | 2.2 | 7.1 | △ | 102 | 0.08 | △ | △ |
| 1151 (This invention) | 2.1 | 16.0 | ○ | 102 | 0.08 | ⊚ | ⊚ |
| 1152 (This invention) | 2.1 | 15.9 | ○ | 101 | 0.08 | ⊚ | ⊚ |

Next, antiglare and antireflection polarizing plates were fabricated using the films of Samples 1104, 1106 to 1110, 1112, 1114, 1119 to 1121, 1124 to 1142, 1144, 1146 to 1149, 1151 and 1152 according to the present invention, as protective films for the polarizing layers in the polarizing plates. Then, liquid crystal display devices were fabricated using the polarizing plates in which the low-refractive-index layers in the antireflection films were arranged so as to be the outermost layers. The liquid crystal display devices each exhibited an excellent contrast because of less reflection of external light and exhibited excellent visibility with giving less obtrusive reflected image because of antiglareness.

Similarly, liquid crystal display devices were fabricated by assembling any of the above-mentioned samples according to the present invention, with a polarizer, an optical compensation film constituted by a transparent support and an optical anisotropic layer in which the orientation of a discotic liquid crystal was fixed, and a polarizing plate composed of a light scattering layer, and visibility of the devices was evaluated. As a result, each device had excellent performance. That is, no reflection of external light was observed, excellent contrast was obtained, and the reflected image was not obtrusive due to antiglareness.

(Saponification Treatment of Anti-reflection Films)

The thus-obtained Samples 1101 to 1152 were subjected to the same saponification treatment as in Example 1, to obtain saponified anti-reflection films. The thus-obtained saponified samples were tested and evaluated in the same manner as in Example 1, for the following items: (11) film separation by saponification treatment and (12) crosscut adhesion.

Results of evaluations of separation and adhesion are described.

In each sample according to the present invention, the evaluation of separation of the film by the saponification treatment was ○, and the evaluation of crosscut adhesion was also ○. In both evaluation tests, no separation of the film was observed.

Further, the samples according to the present invention were measured for the contact angle to water to the surface at the side opposite to the antiglare hard coat layer and the low-refractive-index layer via the support. As a result, the contact angle of water was in the range of 40° to 30° for each sample.

Example 12

Coating solutions 3A to 3E for antiglare hard coat layers and coating solutions 2A to 2I for low-refractive-index layers were coated in the same manner as in Example 11. The combinations of lamination were as described in Table 12.

TABLE 12

| Sample No. (Remarks) | Coating solution for antiglare hard coat layer | Coating solution for low refractive index layer |
|---|---|---|
| 1201 (Comparative Example) | 3A | 2A |
| 1202 (This invention) | 3B | 2A |
| 1203 (This invention) | 3C | 2A |
| 1204 (This invention) | 3D | 2A |
| 1205 (This invention) | 3E | 2A |
| 1206 (This invention) | 3B | 2B |
| 1207 (This invention) | 3B | 2C |
| 1208 (This invention) | 3B | 2D |
| 1209 (This invention) | 3B | 2E |
| 1210 (This invention) | 3B | 2F |
| 1211 (This invention) | 3B | 2G |
| 1212 (This invention) | 3B | 2H |
| 1213 (This invention) | 3B | 2I |
| 1214 (This invention) | 3C | 2D |
| 1215 (This invention) | 3C | 2E |
| 1216 (This invention) | 3C | 2F |
| 1217 (This invention) | 3C | 2G |
| 1218 (This invention) | 3C | 2H |
| 1219 (This invention) | 3D | 2D |
| 1220 (This invention) | 3D | 2E |
| 1221 (This invention) | 3D | 2F |
| 1222 (This invention) | 3D | 2G |
| 1223 (This invention) | 3D | 2H |
| 1224 (This invention) | 3E | 2D |
| 1225 (This invention) | 3E | 2E |
| 1226 (This invention) | 3E | 2F |
| 1227 (This invention) | 3E | 2G |
| 1228 (This invention) | 3E | 2H |

(Evaluation of Anti-reflection Films)

Samples 1201 to 1228 obtained were evaluated in the same manner as in Example 11.

In each of Samples 1202 to 1228 according to the present invention, the fingerprint adhesion was ◯, the antiglare property was ⊚, and the glistening was ◯, and the antireflection performance and pencil hardness were above the performance levels required for antiglare antireflection films.

The results of other evaluations are shown in Table 13.

It can be seen that Samples 1202 to 1228 according to the present invention had excellent steel wool scratch resistance and excellent cotton swab rubbing resistance, as compared with Comparative Sample 1201, as in Example 11. In particular, it can be seen that systems containing the compound according to the present invention in both the antiglare hard coat layer and the low-refractive-index layer had excellent scratch resistance performance. It is apparent that these results are attributable to the silane-series compounds according to the present invention contained in the system.

TABLE 13

| Sample No. (Remarks) | Average reflectance (%) | Haze (%) | Pencil hardness | Contact angle (°) | Dynamic friction coefficient | Steel wool scratch resistance | Swab rubbing resistance |
|---|---|---|---|---|---|---|---|
| 1201 (Comparative Example) | 2.1 | 42.9 | Δ | 102 | 0.08 | X | X |
| 1202 (This invention) | 2.1 | 41.7 | ◯ | 101 | 0.08 | ◯ | ◯Δ |
| 1203 (This invention) | 2.0 | 43.1 | ◯ | 103 | 0.08 | ◯ | ◯Δ |
| 1204 (This invention) | 2.0 | 43.2 | ◯ | 102 | 0.08 | ◯ | ◯Δ |
| 1205 (This invention) | 1.9 | 42.6 | ◯ | 102 | 0.08 | ◯ | ◯Δ |
| 1206 (This invention) | 2.0 | 42.7 | ◯ | 103 | 0.08 | ⊚ | ⊚ |
| 1207 (This invention) | 2.0 | 42.6 | ◯ | 102 | 0.08 | ⊚ | ⊚ |
| 1208 (This invention) | 2.1 | 41.4 | ◯ | 101 | 0.08 | ⊚ | ⊚ |
| 1209 (This invention) | 2.1 | 43.1 | ◯ | 102 | 0.08 | ⊚ | ⊚ |
| 1210 (This invention) | 1.9 | 42.3 | ◯ | 102 | 0.08 | ⊚ | ⊚ |
| 1211 (This invention) | 2.0 | 42.6 | ◯ | 103 | 0.08 | ⊚ | ◯ |
| 1212 (This invention) | 1.9 | 43.9 | ◯ | 101 | 0.07 | ⊚ | ⊚ |
| 1213 (This invention) | 2.0 | 42.6 | ◯ | 100 | 0.08 | ⊚ | ⊚ |
| 1214 (This invention) | 2.0 | 43.7 | ◯ | 100 | 0.08 | ◯ | ◯ |
| 1215 (This invention) | 2.1 | 43.0 | ◯ | 102 | 0.08 | ◯ | ◯ |
| 1216 (This invention) | 2.0 | 42.9 | ◯ | 101 | 0.08 | ◯ | ◯ |
| 1217 (This invention) | 1.9 | 42.8 | ◯ | 102 | 0.08 | ◯ | ◯ |
| 1218 (This invention) | 1.9 | 42.9 | ◯ | 102 | 0.07 | ⊚ | ⊚ |
| 1219 (This invention) | 2.1 | 42.6 | ◯ | 102 | 0.08 | ◯ | ◯ |
| 1220 (This invention) | 2.0 | 42.5 | ◯ | 101 | 0.08 | ◯ | ◯ |
| 1221 (This invention) | 2.0 | 43.1 | ◯ | 103 | 0.07 | ◯ | ◯ |
| 1222 (This invention) | 1.9 | 43.1 | ◯ | 102 | 0.08 | ◯ | ◯ |
| 1223 (This invention) | 2.1 | 42.6 | ◯ | 102 | 0.08 | ⊚ | ⊚ |
| 1224 (This invention) | 2.0 | 42.3 | ◯ | 103 | 0.08 | ◯Δ | ◯Δ |
| 1225 (This invention) | 2.0 | 42.5 | ◯ | 102 | 0.08 | ◯Δ | ◯Δ |
| 1226 (This invention) | 1.9 | 43.1 | ◯ | 103 | 0.08 | ◯Δ | ◯Δ |
| 1227 (This invention) | 2.0 | 41.6 | ◯ | 101 | 0.08 | ◯Δ | ◯Δ |
| 1228 (This invention) | 2.0 | 42.4 | ◯ | 101 | 0.07 | ⊚ | ⊚ |

Next, antiglare and antireflection polarizing plates were fabricated using Sample films 1202 to 1228 according to the present invention in the same manner as in Example 11. Then, liquid crystal display devices were fabricated using the polarizing plates in which the low-refractive-index layers in the antireflection films were arranged so as to be the outermost layers. The liquid crystal display devices each exhibited an excellent contrast because of less reflection of external light and gave less obtrusive reflected image due to antiglareness, so that they had excellent visibility.

Similarly, liquid crystal display devices were fabricated, by using an elliptically polarizing plate including a polarizer whose one side was adhered any of the above-mentioned samples according to the present invention and whose opposite side was adhered an optical compensation film constituted by a transparent support and an optical anisotropic layer in which the orientation of a discotic liquid crystal was fixed. Then, the visibilities of the devices were evaluated. As a result, each device had excellent performance. That is, no reflection of external light was observed, excellent contrast was obtained, and the reflected image was not obtrusive due to antiglareness.

(Saponification Treatment of Antireflection Film)

Samples 1202 to 1228 as described above were subjected to the saponification treatment in the same manner as in Example 11.

Samples 1202 to 1228 subjected to the saponification treatment were evaluated for separation of the film due to the saponification treatment and crosscut adhesion in the same manner as in Example 11.

As a result, for each sample, neither separation of the film due to the saponification treatment nor separation of crosscut squares was observed.

Further, Samples 1202 to 1228 according to the present invention were measured for the contact angle to water to the surface at the side opposite to the antiglare hard coat layer and the low-refractive-index layer via the support. As a result, the contact angle of water was in the range of 40° to 30° for each sample.

Example 13

A polarizing plate was prepared in the same manner as in Example 3.

Then, polarizing plates with an antiglare and antireflection film were fabricated by bonding the above polarizing plate to the saponification-treated film of one of Samples 1104, 1106 to 1110, 1112, 1114, 1119 to 1121, 1124 to 1142, 1144, 1146 to 1149, 1151 and 1152 according to the present invention prepared in Example 11. Then, liquid crystal display devices were fabricated using the polarizing plates, so that the low-refractive-index layers in the antireflection films were arranged to be the outermost layers. The liquid crystal display devices each exhibited an excellent contrast because of less reflection of external light and gave less obtrusive reflected image due to antiglareness, so that they had excellent visibility.

Example 14

Polarizing plates with an antiglare and antireflection film were fabricated in the same manner as in Example 13 described above, except that in the fabrication of the polarizing plate the absorption axis of which was inclined at 45°, the triacetyl cellulose film (TD80U, trade name, manufactured by Fuji Photo Film Co., Ltd.) was changed to any of the saponification-treated films of Samples 1104, 1106 to 1110, 1112, 1114, 1119 to 1121, 1124 to 1142, 1144, 1146 to 1149, 1151 and 1152 according to the present invention prepared in Example 11. Then, liquid crystal display devices were fabricated using the polarizing plates so that the low-refractive-index layers in the antireflection films were arranged to be the outermost layers. The liquid crystal display devices, like those in Example 13, each exhibited an excellent contrast because of less reflection of external light and gave less obtrusive reflected image due to antiglareness, so that they had excellent visibility.

Example 15

Samples 1104, 1106 to 1110, 1112, 1114, 1119 to 1121, 1124 to 1142, 1144, 1146 to 1149, 1151 and 1152 according to the present invention prepared in Example 11 were immersed in an aqueous solution of 1.5 mol/l NaOH at 55° C. for 2 minutes, and then neutralized and washed with water, to perform saponification treatment of the triacetylcellulose surface on the back side of the film. Separately, an 80-μm thick triacetylcellulose film (TD80U, trade name, manufactured by Fuji Photo Film Co., Ltd.) was subjected to saponification treatment on the same condition as described above. Separately, polyvinyl alcohol was made to absorb iodine, followed by stretching, to fabricate a polarizer. One of the above-mentioned samples prepared in Example 11 was bonded to one side of the obtained polarizer to protect it, and the above triacetylcellulose film was bonded to the other side, thereby fabricating polarizing plates. The polarizing plates thus fabricated were each replaced for a polarizing plate on the viewer side of the liquid crystal display device (having a polarization split film with a polarization screening layer D-BEF (trade name, manufactured by Sumitomo 3M Co., Ltd.) between a back light and liquid crystal cells) in a note-type personal computer having mounted thereon a transmission-type TN liquid crystal display device, such that the low-refractive-index layer side of the anti-reflection film became the outermost surface. As a result, the liquid crystal display devices each showed extremely low reflection of the external light, thus display devices with a very high display quality were obtained.

Example 16

Any of Samples 1104, 1106 to 1110, 1112, 1114, 1119 to 1121, 1124 to 1142, 1144, 1146 to 1149, 1151 and 1152 according to the present invention prepared in Example 11 was bonded to a transmission-type TN liquid crystal cell, so that the low-refractive-index layer was positioned as the outermost layer. The liquid crystal cell had been provided, as a liquid-crystal-cell side protective film of a viewer side polarizing plate, and as a liquid-crystal-cell side protective film of a back-light side polarizing plate, with a view-angle-broadening film (Wide View Film A 12B, trade name, manufactured by Fuji Photo Film Co., Ltd.) having an optical compensation layer. In the optical compensation layer, the disk plane of discotic structure units was inclined with respect to the plane of a transparent support of the optical compensation layer and the angles between the disk plane of discotic structure units and the plane of the transparent support were varied in the direction of the depth of the optical anisotropic layer. Accordingly, liquid crystal display devices each having the above components were produced. The thus-produced liquid crystal display devices each had an excellent contrast in a light room, a very wide view angle in all directions, a very excellent visibility, and a high display quality.

Example 17

Any of Samples 1104, 1106 to 1110, 1112, 1114, 1119 to 1121, 1124 to 1142, 1144, 1146 to 1149, 1151 and 1152 according to the present invention prepared in Example 11 was bonded to a glass plate on the surface of an organic EL display device with an adhesive, such that the low-refractive-index layer was positioned as the outermost layer. The thus-obtained display devices each had suppressed reflection on the surface of the glass and had a high visibility.

Example 18

Using any of Samples 1104, 1106 to 1110, 1112, 1114, 1119 to 1121, 1124 to 1142, 1144, 1146 to 1149, 1151 and 1152 according to the present invention prepared in Example 11, polarizing plates having the antireflection film on one side were fabricated such that the low-refractive-index layer was outermost. Each of the polarizing plates was laminated with a λ/4 plate (PURE-ACE (trade name), manufactured by TEIJIN Ltd.) on the side opposite to the side having the antireflection film. Any one of the obtained polarizing plates was applied to a glass plate on the surface of an organic EL display device such that the low-refractive-index layer was positioned as the outermost layer. The thus-obtained display devices each had a reduced surface reflection and reflection from the inside the surface glass and an extremely excellent visibility.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An anti-reflection film that is an optical film, comprising, at least, a hard coat layer, and a low-refractive-index layer containing a binder polymer, on a transparent support, wherein said binder polymer in the low-refractive-index layer is a fluorine-containing polymer that is a perfluoroolefin copolymer, and wherein said hard coat layer and/or said low-refractive-index layer contains:
   (a) a hydrolysate of an organosilane in which a hydroxyl group or a hydrolysable group is directly bonded to silicon, and/or a partial condensation product thereof; and
   (b) at least one metal chelate compound of an alcohol represented by formula $R^3OH$, in which $R^3$ represents an alkyl group having 1 to 10 carbon atoms, and a compound represented by formula $R^4COCH_2COR^5$, in which $R^4$ represents an alkyl group having 1 to 10 carbon atoms, and $R^5$ represents an alkyl group having 1 to 10 carbon atoms or an alkoxy group having 1 to 10 carbon atoms, as ligands, and a metal selected from the group consisting of Zr, Ti and Al, as a central metal, and wherein at the surface on said low-refractive-index layer side, a coefficient of dynamic friction is in the range of 0.03 to 0.15, and a contact angle to water is in the range of 90 to 120°.

2. The anti-reflection film according to claim 1, wherein said hard coat layer contains an inorganic filler composed of an oxide of at least one element selected from the group consisting of zirconium, titanium, aluminum, indium, zinc, tin, antimony and silicon.

3. The anti-reflection film according to claim 1, wherein said low-refractive-index layer contains an inorganic filler selected from silica and magnesium fluoride.

4. The anti-reflection film according to claim 1, wherein a surface energy of said hard coat layer is in the range of 25 mN·m⁻ to 70 mN·m⁻.

5. The anti-reflection film according to claim 1, wherein said organosilane of (a) the hydrolysate of an organosilane, in which a hydroxyl group or a hydrolysable group is directly bonded to silicon, and/or the partial condensation product thereof, is an organosilane represented by formula (A):

$$(R^{10})_{m1}-SiX_{n1} \quad \text{Formula (A):}$$

in which $R^{10}$ represents a substituted or unsubstituted alkyl or aryl group; X represents a hydroxyl group or a hydrolysable group; m1 represents an integer of 0 to 3; and n1 represents an integer of 1 to 4, in which the total of m1 and n1 is 4.

6. The anti-reflection film according to claim 5, wherein the group $R^{10}$ of said organosilane in formula (A) is a group containing an epoxy group, or a (meth)acryloyl group.

7. The anti-reflection film according to claim 1, wherein said binder polymer in the low-refractive-index layer is a fluorine-containing polymer that has a recurring unit containing a radical polymerizing group or a cation ring-opening polymerizing group at a side chain of said fluorine-containing polymer.

8. A polarizing plate, comprising a polarizing layer and two sheets of protective films of the polarizing layer,
   wherein at least one of said protective films comprises the anti-reflection film according to claim 1.

9. A display device, having the polarizing plate according to claim 8,
   wherein the low-refractive index layer is arranged on the viewer side.

10. A display device, having the anti-reflection film according to claim 1,
    wherein the low-refractive-index layer is arranged on the viewer side.

11. A method of producing an anti-reflection film according to claim 1, comprising:
    at least, coating a hard coat layer and a low-refractive-index layer containing a binder polymer, on a transparent support, wherein a coating solution of said hard coat layer and/or a coating solution of said low-refractive-index layer comprises:
    the hydrolysate of said organosilane and/or the partial condensation product thereof represented by (a);
    the metal chelate compound represented by (b); and
    (c) a β-diketone compound and/or a β-ketoester compound represented by formula $R^4COCH_2COR^5$, in which $R^4$ and $R^5$ each have the same meanings as those in the (b).

12. A polarizing plate, comprising a polarizing layer and two sheets of protective films of the polarizing layer,
    wherein at least one of said protective films comprises the anti-reflection film produced by the production method according to claim 11.

13. A display device, having the polarizing plate according to claim 12,
    wherein the low-refractive-index layer is arranged on the viewer side.

14. A display device, having the anti-reflection film produced by the production method according to claim 11,
    wherein the low-refractive-index layer is arranged on the viewer side.

* * * * *